United States Patent
Hoshino et al.

(10) Patent No.: US 8,949,109 B2
(45) Date of Patent: *Feb. 3, 2015

(54) DEVICE, METHOD, AND PROGRAM TO DISPLAY, OBTAIN, AND CONTROL ELECTRONIC DATA BASED ON USER INPUT

(75) Inventors: Masaaki Hoshino, Tokyo (JP); Kenichiro Kobayashi, Kanagawa (JP); Shouichi Doi, Kanagawa (JP); Akihiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 404 days.

This patent is subject to a terminal disclaimer.

(21) Appl. No.: 13/183,092

(22) Filed: Jul. 14, 2011

(65) Prior Publication Data

US 2012/0022854 A1    Jan. 26, 2012

(30) Foreign Application Priority Data

Jul. 23, 2010   (JP) ................ P2010-166328

(51) Int. Cl.
| | |
|---|---|
| G06F 17/20 | (2006.01) |
| G06F 17/30 | (2006.01) |
| G06F 17/27 | (2006.01) |
| G06F 3/0488 | (2013.01) |

(52) U.S. Cl.
CPC ...... *G06F 17/30616* (2013.01); *G06F 17/2765* (2013.01); *G06F 3/04883* (2013.01); *G06F 17/2735* (2013.01); *G06F 17/2755* (2013.01)
USPC .......................................................... 704/9

(58) Field of Classification Search
CPC ......... G06F 17/20; G06F 17/21; G06F 17/27; G06F 17/2775; G06F 17/277; G06F 17/30; G06F 17/30867; G06F 17/2735

USPC ........................................................... 704/9
See application file for complete search history.

(56) References Cited

U.S. PATENT DOCUMENTS

| 7,246,118 | B2 * | 7/2007 | Chastain et al. ............... 1/1 |
| 7,542,902 | B2 * | 6/2009 | Scahill et al. ............ 704/251 |
| 7,865,494 | B2 * | 1/2011 | Best et al. ............... 707/707 |
| 8,117,196 | B2 * | 2/2012 | Jones et al. ............. 707/731 |
| 8,359,193 | B2 * | 1/2013 | Chen et al. ................. 704/9 |
| 8,825,770 | B1 * | 9/2014 | Jablokov et al. .......... 709/206 |

(Continued)

FOREIGN PATENT DOCUMENTS

| JP | 10-11457 | 1/1998 |
| WO | WO 2010058753 A1 * | 5/2010 |

OTHER PUBLICATIONS

D. Renzel, R. Klamma, Y. Cao, and D. Kovachev. Virtual Campfire—Collaborative Multimedia Semantization with Mobile Social Software. In Proc. of the 10th International Workshop of the Multimedia Metadata Community on Semantic Multimedia Database Technologies (SeMuDaTe'09), Graz, Austria, Dec. 2009.*

*Primary Examiner* — Paras D Shah
(74) *Attorney, Agent, or Firm* — Finnegan, Henderson, Farabow, Garrett & Dunner, LLP

(57) ABSTRACT

An apparatus and method provide logic for processing information. In one implementation, an apparatus includes a receiving unit configured to receive a selection of displayed content from a user. An obtaining unit is configured to obtain data corresponding to the selection. The data includes text data. An identification unit is configured to identify a keyword within the text data, and a storage unit is configured to generate a command to transmit the keyword to a device.

19 Claims, 44 Drawing Sheets

(56) References Cited

U.S. PATENT DOCUMENTS

| | | |
|---|---|---|
| 2001/0049725 A1* | 12/2001 | Kosuge ........................ 709/206 |
| 2004/0260680 A1* | 12/2004 | Best et al. ........................ 707/3 |
| 2006/0053154 A1* | 3/2006 | Yano ........................... 707/102 |
| 2007/0033179 A1* | 2/2007 | Tenembaum et al. ............. 707/4 |
| 2007/0118794 A1* | 5/2007 | Hollander et al. ............ 715/512 |
| 2008/0005090 A1* | 1/2008 | Khan et al. ....................... 707/4 |
| 2008/0016091 A1* | 1/2008 | Chandra ....................... 707/100 |
| 2008/0133600 A1* | 6/2008 | Uehori et al. .............. 707/104.1 |
| 2008/0177852 A1* | 7/2008 | Chen et al. ................... 709/206 |
| 2008/0189273 A1* | 8/2008 | Kraftsow et al. ................. 707/5 |
| 2009/0077548 A1* | 3/2009 | Kelley et al. .................. 717/171 |
| 2009/0319516 A1* | 12/2009 | Igelman et al. .................... 707/5 |
| 2010/0030647 A1* | 2/2010 | Shahshahani ............. 705/14.66 |
| 2010/0174617 A1* | 7/2010 | Cannon et al. .................. 705/26 |
| 2010/0279667 A1* | 11/2010 | Wehrs et al. ................. 455/414.1 |
| 2010/0299199 A1* | 11/2010 | Kang ........................ 705/14.49 |
| 2011/0015996 A1* | 1/2011 | Kassoway et al. .......... 705/14.49 |
| 2011/0106615 A1* | 5/2011 | Churchill et al. .......... 705/14.49 |
| 2011/0119258 A1* | 5/2011 | Forutanpour et al. ......... 707/723 |
| 2012/0092233 A1* | 4/2012 | Kazamaki ...................... 345/1.1 |

\* cited by examiner

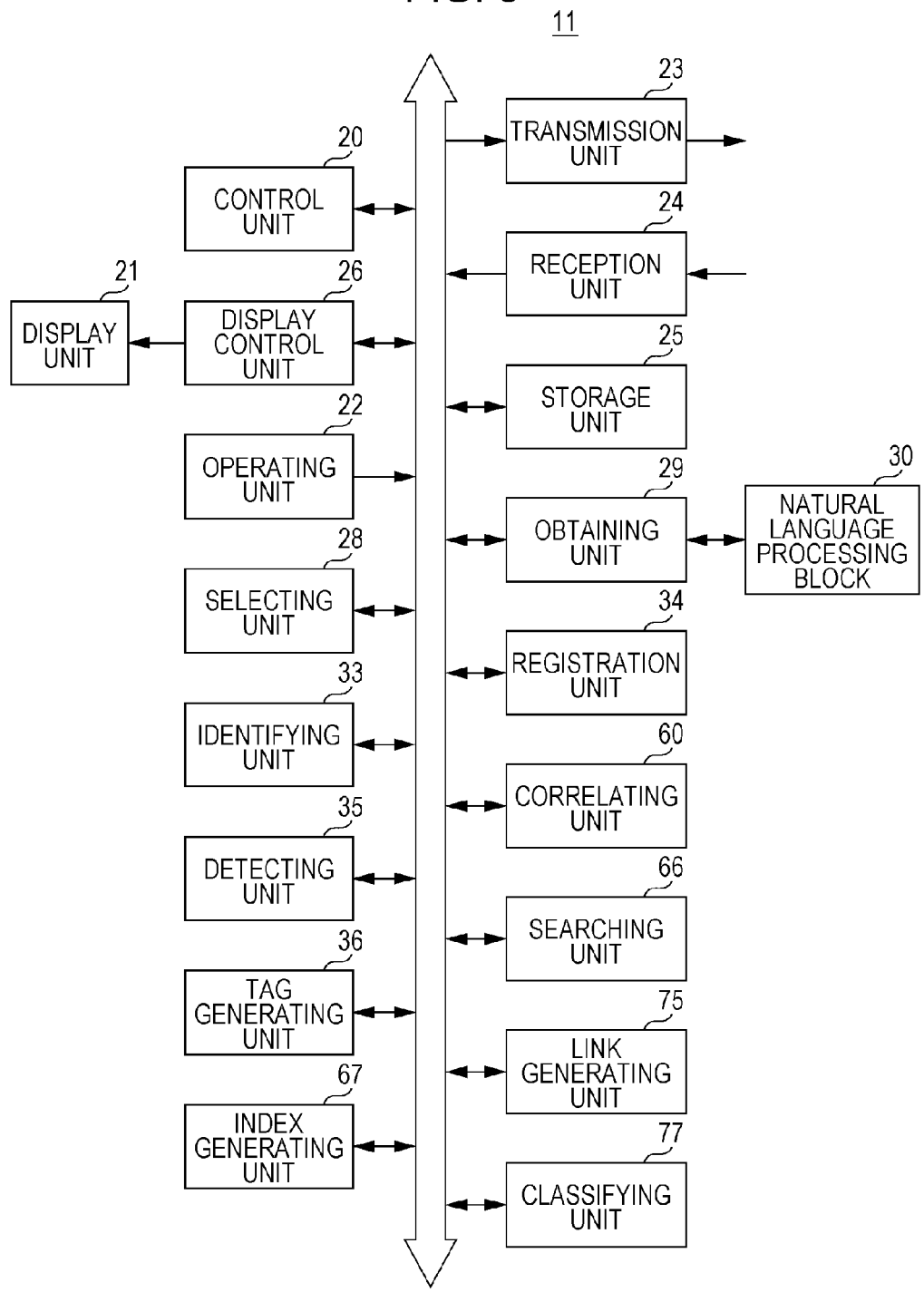

The making of traditional pot-au-feu consists of two stages; the first being cooking meat, usually shank, chuck, ribs, or the like, which is eaten separately later, along with marrowbones, to obtain a rich broth. The second is cooking of the vegetables. The overall process will take the greater part of the day.
  Indispensable to the first stage is the bouquet garni, which is a handmade bundle of herbs added to the pot when cooking the meat. The bouquet garni serves to give the dish an aromatic air while removing undesirable scents due to the marrowbone.
  When removing the meat from the stock in the pot, the bouquet garni, and other seasonings added to the stock with the bouquet garni for aroma, such as peppercorns, cinnamon sticks, and so forth, need to be removed from the stock without fail. This is so these items will not remain in the pot and produce an overpowering smell. Considering this, it might be wise to wrap these ingredients in cheesecloth, as with the marrowbone.
  To make the bouquet garni, prepare 2 sprigs fresh thyme, 2 dried bay leaves, 2 celery stalk tops, and 6 sprigs of fresh parsley. These are firmly tied together in a neat bundle and placed in the pot.

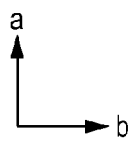

FIG. 7 the meat. The bouquet garni serves to give the dish an aromatic air while removing undesirable scents due to the marrowbone.
  When removing the meat from the stock in the pot, the bouquet garni, and other seasonings added to the stock with the bouquet garni for aroma, such as peppercorns, cinnamon sticks, and so forth, need to be removed from the stock without fail. This is so these items will not remain in the pot and produce an overpowering smell. Considering this, it might be wise to wrap these ingredients in cheesecloth, as with the marrowbone.
  To make the bouquet garni, prepare 2 sprigs fresh thyme, 2 dried

FIG. 13A the meat. The bouquet garni serves to give the dish an aromatic air while removing undesirable scents due to the marrowbone.
  When removing the meat from the stock in the pot, the bouquet garni, and other seasonings added to the stock with the bouquet garni for aroma, such as peppercorns, cinnamon sticks, and so forth, need to be removed from the stock without fail. This is so these items will not remain in the pot and produce an overpowering smell.
Considering this, it might be wise to wrap these ingredients in cheesecloth, as with the marrowbone.
  To make the bouquet garni, prepare 2 sprigs fresh thyme, 2 dried

FIG. 13B the meat. The bouquet garni serves to give the dish an aromatic air while removing undesirable scents due to the marrowbone.
  When removing the meat from the stock in the pot, the bouquet garni, and other seasonings added to the stock with the bouquet garni for aroma, such as peppercorns, cinnamon sticks, and so forth, need to be removed from the stock without fail. This is so these items will not remain in the pot and produce an overpowering smell.
Considering this, it might be wise to wrap these ingredients in cheesecloth, as with the marrowbone.
  To make the bouquet garni, prepare 2 sprigs fresh thyme, 2 dried When removing the meat from the stock in the pot, the bouquet garni, and other seasonings added to the stock with the bouquet garni for aroma, such as peppercorns, cinnamon sticks, and so forth, need to be removed from the stock without fail. ~~This is so.~~

| CONTENT ID 37 | CONTENT TYPE 38 | NAME 39 | PUBLISHER 40 |
|---|---|---|---|
| 1 | BOOK | BASICS OF COOKING | SOMY PUBLISHING |
| ... | ... | ... | ... |

| MARK ID 41 | CONTENT ID 42 | PAGE 43 | LINE 44 | START COL 45 | LENGTH 46 | TEXT 47 |
|---|---|---|---|---|---|---|
| 0 | 1 | 3 | 30 | 5 | 235 | When removing the meat... |
| ... | ... | ... | ... | ... | ... | ... |

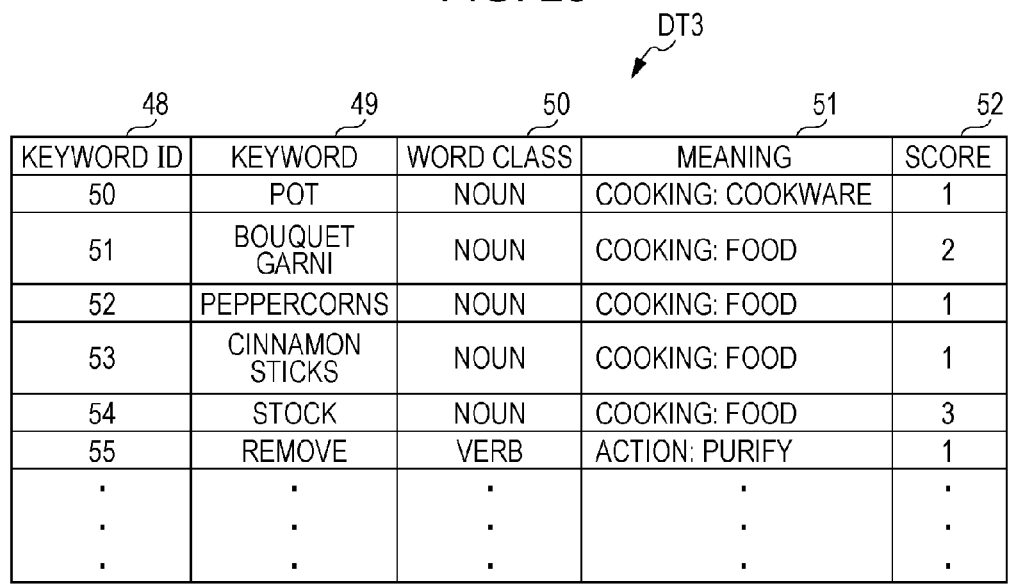

FIG. 20

| KEYWORD ID | KEYWORD | WORD CLASS | MEANING | SCORE |
|---|---|---|---|---|
| 50 | POT | NOUN | COOKING: COOKWARE | 1 |
| 51 | BOUQUET GARNI | NOUN | COOKING: FOOD | 2 |
| 52 | PEPPERCORNS | NOUN | COOKING: FOOD | 1 |
| 53 | CINNAMON STICKS | NOUN | COOKING: FOOD | 1 |
| 54 | STOCK | NOUN | COOKING: FOOD | 3 |
| 55 | REMOVE | VERB | ACTION: PURIFY | 1 |
| . | . | . | . | . |

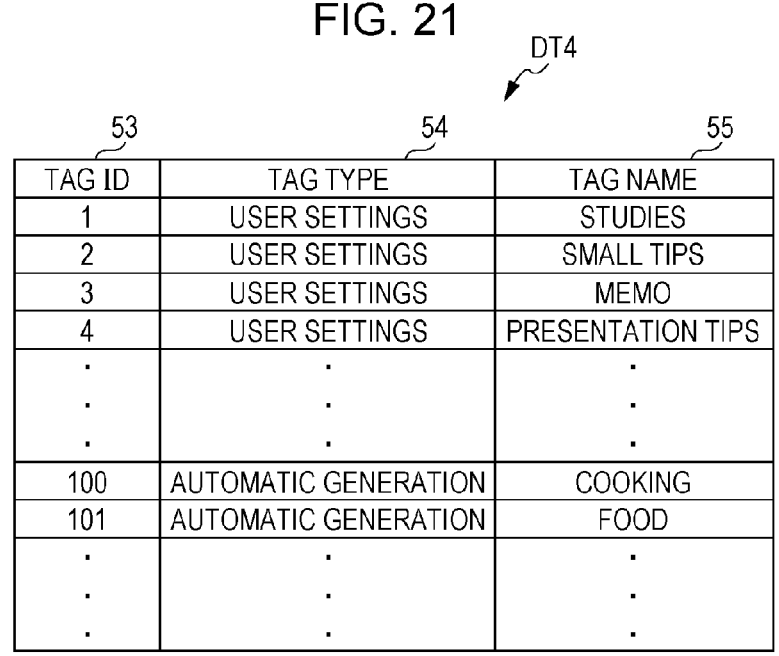

FIG. 21

| TAG ID | TAG TYPE | TAG NAME |
|---|---|---|
| 1 | USER SETTINGS | STUDIES |
| 2 | USER SETTINGS | SMALL TIPS |
| 3 | USER SETTINGS | MEMO |
| 4 | USER SETTINGS | PRESENTATION TIPS |
| . | . | . |
| 100 | AUTOMATIC GENERATION | COOKING |
| 101 | AUTOMATIC GENERATION | FOOD |
| . | . | . |

The making of traditional pot-au-feu consists of two stages; the first being cooking meat, usually shank, chuck, ribs, or the like, which is eaten separately later, along with marrowbones, to obtain a rich broth. The second is cooking of the vegetables. The overall process will take the greater part of the day.

Indispensable to the first stage is the bouquet garni, which is a handmade bundle of herbs added to the pot when cooking the meat. The bouquet garni serves to give the dish an aromatic air while removing undesirable scents due to the marrowbone. When removing the meat from the stock in the pot, the bouquet garni, and other seasonings added to the stock with the bouquet garni for aroma, such as peppercorns, cinnamon sticks, and so forth, need to be removed from the stock without fail. This is so these items will not remain in the pot and produce an overpowering smell. Considering this, it might be wise to wrap these ingredients in cheesecloth, as with the marrowbone.

To make the bouquet garni, prepare 2 sprigs fresh thyme, 2 dried bay leaves, 2 celery stalk tops, and 6 sprigs of fresh parsley. These are firmly tied together in a neat bundle and placed in the pot.

The making of traditional pot-au-feu consists of two stages; the first being cooking meat, usually shank, chuck, ribs, or the like, which is eaten separately later, along with marrowbones, to obtain a rich broth. The second is cooking of the vegetables. The overall process will take the greater part of the day.

Indispensable to the first stage is the bouquet garni, which is a handmade bundle of herbs added to the pot when cooking the meat. The bouquet garni serves to give the dish an aromatic air while removing undesirable scents due to the marrowbone. When removing the meat from the stock in the pot, the bouquet garni, and other seasonings added to the stock with the bouquet garni for aroma, such as peppercorns, cinnamon sticks, and so forth need to be removed from the stock without fail. This is so these items will not remain in the pot and produce an overpowering smell. Considering this, it might be wise to wrap these ingredients in cheesecloth, as with the marrowbone.

To make the bouquet garni, prepare 2 sprigs fresh thyme, 2 dried bay leaves, 2 celery stalk tops, and 6 sprigs of fresh parsley. These are firmly tied together in a neat bundle and placed in the pot.

FIG. 26

The making of traditional pot-au-feu consists of two stages; the first being cooking meat, usually shank, chuck, ribs, or the like, which is eaten separately later, along with marrowbones, to obtain a rich broth. The second is cooking of the vegetables. The overall process will take the greater part of the day.
 Indispensable to the first stage is the bouquet garni, which is a handmade bundle of herbs added to the pot when cooking the meat. The bouquet garni serves to give [COOKING] — TG air while removing undesirable scents due to the marrowbone. When removing the meat from the stock in the pot, the bouquet garni, and other seasonings added to the stock with the bouquet garni for aroma, such as peppercorns, cinnamon sticks, and so forth need to be removed from the stock without fail. This is so these items will not remain in the pot and produce an overpowering smell. Considering this, it might be wise to wrap these ingredients in cheesecloth, as with the marrowbone.
 To make the bouquet garni, prepare 2 sprigs fresh thyme, 2 dried bay leaves, 2 celery stalk tops, and 6 sprigs of fresh parsley. These are firmly tied together in a neat bundle and placed in the pot.

The making of traditional pot-au-feu consists of two stages; the first being cooking meat, usually shank, chuck, ribs, or the like, which is eaten separately later, along with marrowbones, to obtain a rich broth. The second is cooking of the vegetables. The overall process will take the greater part of the day.
Indispensable to the first stage is the bouquet garni, which is a handmade bundle of herbs added to the pot when cooking the meat. The bouquet garni serves to give the air while removing undesirable scents due to
When removing the meat from the stock in the garni, and other seasonings added to the stock garni for aroma, such as peppercorns, cinnamon need to be removed from the stock without fail will not remain in the pot and produce an overpowering smell. Considering this, it might be wise to wrap these ingredients in cheesecloth, as with the marrowbone.
To make the bouquet garni, prepare 2 sprigs fresh thyme, 2 dried bay leaves, 2 celery stalk tops, and 6 sprigs of fresh parsley. These are firmly tied together in a neat bundle and placed in the pot.

TG:
- COOKING
- MAGICAL SEASONING
- TODAY'S BOILED DISH
- <MY COMMENT> IMPORTANT TO REMOVE THE BOUQUET GARNI

<BASICS OF COOKING>
- THE OVERALL PROCESS WILL · · ·
- WHEN REMOVING THE MEAT · · ·
- WRAP THESE INGREDIENTS · · ·
    .
    .
    .

FIG. 29

<WORD>
- POT
- BOUQUET GARNI
- PEPPERCORNS
- CINNAMON STICKS
- STOCK
- REMOVE

<MEANING>
- COOKING: COOKWARE
- COOKING: FOOD
- ACTION: PURIFY

<BOUQUET GARNI>
- PAGE 2   LINE 3    COLUMN 7
- PAGE 2   LINE 32   COLUMN 3
- PAGE 3   LINE 7    COLUMN 8
- PAGE 3   LINE 15   COLUMN 9
- PAGE 3   LINE 28   COLUMN 1
- PAGE 3   LINE 30   COLUMN 8

.
.
.

DEVICE, METHOD, AND PROGRAM TO DISPLAY, OBTAIN, AND CONTROL ELECTRONIC DATA BASED ON USER INPUT

CROSS-REFERENCE TO RELATED APPLICATIONS

This application is based upon and claims the benefit of priority from Japanese Patent Application No. JP 2010-166328, filed on Jul. 23, 2010, the entire contents of which are hereby incorporated by reference.

BACKGROUND

The disclosed exemplary embodiments relate to an information processing device, information processing method, and information processing program, which can be suitably applied to an information display system constructed using an information display terminal which displays electronic books such as novels, magazines, and so forth, that are distributed as digital data.

Heretofore, with portable search devices, upon a word of a source language being input from a keyboard and a search start key being operated, for example, words in a target language which are a translation of the source language word, usages and the like using the target language words, and so forth, are read out of an electronic dictionary database and displayed.

With a portable search device, upon a desired phrase or usage or the like in the dictionary information being selected by a cursor key being operated or by way of a touch panel with an input pen, in a state with the dictionary information displayed, the selected portion is underlined.

In this way, a portable search device has been arranged to enable use of an electronic dictionary in the same way as a case of underlining a desired phrase or usage or the like in a paper dictionary with a pencil (e.g., see Japanese Unexamined Patent Application Publication No. 10-11457 (pp. 3, 5, 6)

SUMMARY

However, with such a portable search device, in the event of a user teaching others the desired phrase or usage or the like which he/she has selected, the user has to go to the trouble of showing the display screen of this device to others.

Accordingly, portable search devices have had a problem in that desired phrases or usages that have been selected are not readily taught to others, and ease-of-use is poor.

It has been found desirable to provide an information processing device, information processing method, and information processing program, whereby ease-of-use can be improved.

Consistent with an exemplary embodiment, an information processing apparatus includes a receiving unit configured to receive a selection of displayed content from a user. An obtaining unit is configured to obtain data corresponding to the selection, the data comprising text data, and an identification unit configured to identify a keyword within the text data. A control unit is configured to generate a command to transmit at least the keyword to a device.

Consistent with an additional exemplary embodiment, a computer-implemented method for processing information includes receiving a selection of displayed content from a user. The method includes obtaining data corresponding to the selection, the data comprising text data. The method includes identifying a keyword within the text data, and generating a command to transmit at least the keyword to a device.

Consistent with a further exemplary embodiment, a non transitory, computer-readable storage medium stores a program that, when executed by a processor, causes the processor to perform a method for processing information. The method includes receiving a selection of displayed content from a user. The method includes obtaining data corresponding to the selection, the data comprising text data. The method includes identifying a keyword within the text data, and generating a command to transmit at least the keyword to a device.

BRIEF DESCRIPTION OF THE DRAWINGS

FIG. 3 is a block diagram illustrating a circuit configuration according to a function circuit block of an information display terminal;

FIG. 4 is a schematic drawing for describing display of an electronic book image;

FIG. 5 is a schematic drawing for describing instruction of a desired portion of text by a sliding operation;

FIG. 6 is a schematic drawing for describing instruction of a desired portion of text by a sliding operation;

FIG. 7 is a schematic drawing for describing instruction of a desired portion of text by a sliding operation;

FIG. 8 is a schematic drawing for describing instruction of a desired portion of text by a sliding operation;

FIGS. 13A and 13B are schematic drawings for describing detection of an instruction range in a case of a desired portion of text having been encircled;

FIG. 18 is a schematic drawing illustrating the configuration of a book registration table;

FIG. 19 is a schematic drawing illustrating the configuration of a desired portion registration table;

FIG. 20 is a schematic drawing illustrating the configuration of a keyword registration table;

FIG. 21 is a schematic drawing illustrating the configuration of a tag registration table;

FIG. 24 is a schematic drawing for describing highlighted display of desired portions;

FIG. 25 is a schematic drawing for describing highlighted display of desired portions;

FIG. 26 is a schematic drawing for describing display of a tag;

FIG. 27 is a schematic drawing for describing display of related information;

FIG. 28 is a schematic drawing illustrating the configuration of a first hierarchical search image;

FIG. 29 is a schematic drawing illustrating the configuration of a second hierarchical search image;

FIG. 30 is a schematic drawing illustrating the configuration of a third hierarchical search image;

DETAILED DESCRIPTION OF EXEMPLARY EMBODIMENTS

Exemplary embodiments of the disclosure will be described with reference to the drawings. Note that description will proceed in the following order.
1. Overview of Exemplary Embodiments
2. First Exemplary Embodiment
3. Second Exemplary Embodiment
4. Modifications 1. Overview of Exemplary Embodiments First, an overview will be described, followed by description of a first exemplary embodiment and second exemplary embodiment which are specific examples of the present disclosure.

Figure 1:
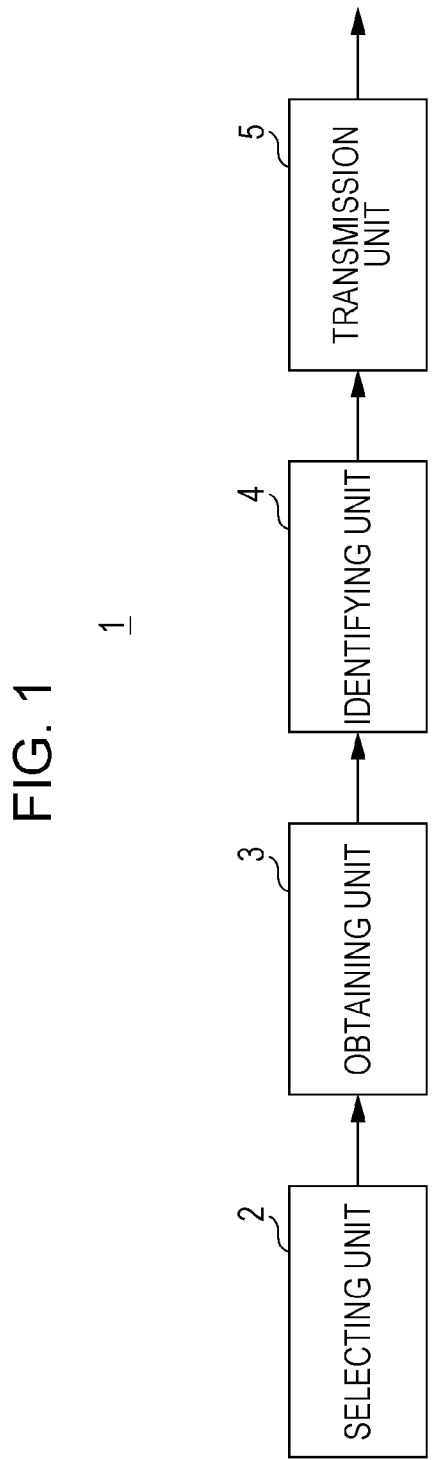
FIG. 1 is a block diagram illustrating the overview of the circuit configuration of an information processing device according to an exemplary embodiment.

In FIG. 1, reference numeral 1 denotes an information processing device. With the information processing device 1, a selecting unit 2 selects at least part of text making up a content. Also, with the information processing device 1, an obtaining unit 3 obtains the processing results of natural language processing performed on part of the text that has been selected by the selecting unit 2.

Further, with the information processing device 1, an identifying unit 4 identifies a predetermined portion of text based on the processing results obtained by the obtaining unit 3. Then, with the information processing device 1, a transmission unit 5 transmits the predetermined portion of text identified by the identifying unit 4 to an external device.

The information processing device 1 configured thus can teach others of a predetermined portion which is a part of selected text itself, or a predetermined portion within the part, by way of an external device. Thus the ease-of-use of the information processing device 1 can be improved.

2. First Exemplary Embodiment 2-1. Configuration of Information Display System

Figure 2:
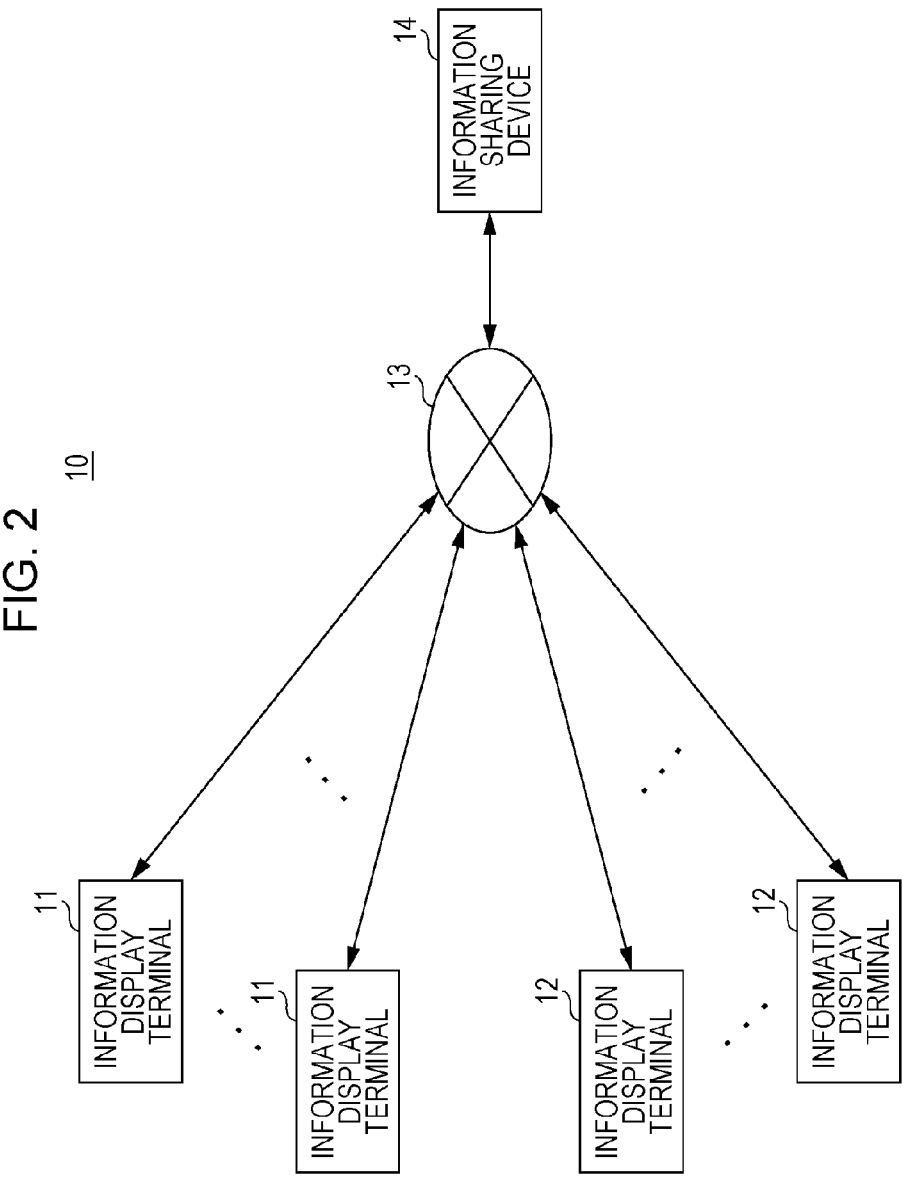
FIG. 2 is a block diagram illustrating the configuration of an information display system according to a first exemplary embodiment.

In FIG. 2, reference numeral 10 denotes overall an information display system 10 according to the first exemplary embodiment. This information display system 10 has two types of information display terminals 11 and 1, which are specific examples of the above-described information processing device 1, communicable with an information sharing device 14 via a network 13.

The information display terminals 11 and 12 take in and store (i.e., obtain) electronic book data of electronic books such as novels, magazines, educational material, and so forth, distributed as digital data, from the information sharing device 14 or an unshown electronic book presenting device via the network 13. Note that electronic books which are learning material are textbooks, study guides, and the like.

Also, the information display terminals 11 and 12 can also take in and store Web pages, reports, and so forth, posted as digital data on the network 13, as electronic book data of electronic books, from an unshown information providing device.

Now, an electronic book is configured or one or multiple pages. Also, the individual pages of an electronic book are each generated with multiple lines of text alone being disposed, or generated with a layout of multiple lines of text and images such as photograph images or illustration images for covers or artwork or the like.

The electronic book data of the electronic book is further configured of book attribute data, text data of text for each page, and image data such as photograph images or illustration images for covers or artwork or the like.

Note that in the book attribute data is stored book identification information whereby electronic books can be individually identified, the type of electronic book such as book or magazine (hereinafter also referred to as "book type"), title of the electronic book (hereinafter also referred to as "book title"), name of the publisher of the electronic book, and so forth.

Text data of each page is configured of text generated over multiple lines of multiple types of characters such as page number, letters, numerals, punctuation, spaces, and so forth, character position information indicating the position of the characters within the text by line number and column number, and so forth. While exemplary embodiments of the present disclosure are described with examples of the English text being handled, any language which can be displayed electronically as a character string can be handled within the same idea, as will be discussed in the following description.

Note that text data of each page has individual characters configuring the text (actually the character code of the characters) correlated with character position information indicating the position of the characters within the text.

Upon display of an electronic book being instructed in the state of the information display terminals 11 and 12 having obtained electronic book data, text of each page of the electronic book is displayed along with the photograph images or illustration images for covers or artwork or the like as appropriate for the electronic book, based on the electronic book data.

The information display terminals 11 and 12 are configured such that, upon displaying the electronic book image, the user can select a predetermined portion such as a desired paragraph, a desired phrase, a desired word, or the like (hereinafter also referred to as "desired portion"), in the text of the displayed content (that is, the electronic book image).

Upon a desired portion in the text of the electronic book image being instructed by the user in the state of the electronic book image being displayed, the information display terminals 11 and 12 identify the desired portion in the text and perform highlighted display thereof, as described later.

Also, in the event of performing highlighted display of the desired portion of text in this way, the information display terminals 11 and 12 generate and store desired portion registration data for registering the desired portion where highlighted display has been performed.

Thus, the information display terminals 11 and 12 can allow the user to select a desired portion in text of an electronic book image being displayed, and save the selected desired portion as desired portion registration data.

Accordingly, in the event of displaying again the electronic book image regarding which the desired portion has been selected from the text, the information display terminals 11 and 12 can perform highlighted display of the desired portion within the text of the electronic book image, so the desired portion selected in the past can be confirmed, based on the desired portion registration data.

Further, the information display terminals 11 and 12 transmit book-related data including various types of information relating to the electronic book regarding which the user has selected the desired portion and to the desired portion to the information sharing device 14 via the network 13.

Upon receiving the book-related data transmitted from the information display terminals 11 and 12, the information sharing device 14 accumulates the book-related data. Also, in the event of receiving a request from, for example, information display terminals 11 and 12, for desired portions selected at other information display terminals 11 and 12, the information sharing device 14 generates desired portion information providing data relating to the desired portion, based on the book-related data.

The information sharing device 14 then transmits the desired portion information providing data to the information display terminals 11 and 12. Accordingly, the information sharing device 14 performs highlighted display of the desired portion selected from the text of the electronic book at the other information display terminals 11 and 12 within the text of the same electronic book image, based on the desired portion information providing data at the information display terminals 11 and 12.

Thus, multiple information display terminals 11 and 12 use the information sharing device 14 to share the desired portion selected at other information display terminals 11 and 12, and in the event of displaying the same electronic book image, the shared desired portion can be displayed highlighted.

2-2. Hardware Configuration According to Function Circuit Block of One Information Display Terminal Next, the hardware configuration according to the function circuit block of one information display terminal 11 of the two types of information display terminals 11 and 12 will be described.

As shown in FIG. 3, the one information display terminal 11 has a control unit 20 for controlling the entire information display terminal 11. The information display terminal 11 also has a display unit 21 for displaying various types of operating images and electronic book images.

Further, the information display terminal 11 also has a touch panel provided so as to cover the display face of the display unit 21, and an operating unit 22 made up of operating keys provided on the face of the casing of the information display terminal 11.

In the event that a key operation such as a pressing operation or rotating operation of an operation key being performed, the operating unit 22 sends an operation command corresponding to the key operation to the control unit 20. Accordingly, the control unit 20 executes processing corresponding to the operation command provided from the operating unit 22.

Now, the touch panel serving as the operating unit 22 is for input of various types of commands and instructions by touching the surface of the touch panel with a finger or stylus pen or the like, as if it were touching the display face of the display unit 21.

As for a touching operation for input of various types of commands and instructions by touching the surface of the touch panel, there is a touching operation wherein the fingertip of one finger or the pen tip of one stylus pen or the like touches approximately one point of the face of the touch panel and is immediately released.

Also, for such a touching operation, there is a touching operation wherein the fingertip of one finger or the pen tip of one stylus pen or the like touches approximately one point of the face of the touch panel, and from that touching position, is quickly moved in an arbitrary surrounding direction while being released.

Also, for such a touching operation, there is a touching operation wherein the fingertip of one finger or the pen tip of one stylus pen or the like touches approximately one point of the face of the touch panel, and in that state, is moved so as to draw a desired line like a straight line or a circle or the like (i.e., the fingertip or the like is slid over the surface).

Note that in the following description, a touching operation wherein the fingertip of one finger or the pen tip of one stylus pen or the like touches approximately one point of the face of the touch panel and is immediately released will also be referred to in particular as a tapping operation.

A tapping operation is an operation performed for instruct an instruction item such as an icon or button situated within an operating screen or within an electronic book image displayed on the display unit 21, for example.

Also, in the following description, a touching operation wherein the fingertip of one finger or the pen tip of one stylus pen or the like touches approximately one point of the face of the touch panel, and from that touching position, is quickly moved in an arbitrary surrounding direction while being released will also be referred to in particular as a flicking operation.

A flicking operation is performed, for example, to switch between electronic book images displayed on the display unit 21 as if it were turning of the pages of a book, or to change (scroll) the display range of an electronic book image on the display unit 21 in the event that the entirety is not displayable therein.

Also, in the following description, a touching operation wherein the fingertip of one finger or the pen tip of one stylus pen or the like touches approximately one point of the face of the touch panel, and in that state, is moved so as to draw a desired line will also be referred to in particular as a sliding operation.

This sliding operation is an operation performed to selectively instruct a desired portion of the text of an electronic book image displayed on the display unit 21, for example.

Note that in the following description, these tapping operation, flicking operation, and sliding operation will collectively be referred to simply as touching operations unless these have to be distinguished.

In the event that the face of the touch panel has been touch operated, the operating unit 22 detects the touch position of the fingertip or pen tip or the like as the coordinates of a pixel position on the display face of the display unit 21, every certain time which is significantly short, such as several milliseconds for example, from the beginning of the touch operation to the end.

Note that at this time, the operating unit 22 detects the touch position as coordinates of a pixel position in the form of an x axis parallel to the vertical direction of the display screen and a y axis parallel to the horizontal direction of the display screen (i.e., two-dimensional coordinates). Note that in the following description, the vertical direction of the display face will also be referred to as "display face vertical direction", and the horizontal direction of the display face will also be referred to as "display face horizontal direction".

Also, each time a touch position is detected, the operating unit 22 sends touch position information indicating the detected touch position.

Upon touch position information being provided from the operating unit 22, the control unit 20 detects the time over which that touch position information is being provided as the time from the starting to the ending of the touch operation as the time over which the touch operation was performed (hereinafter, referred to as "touch operation time").

Also, the control unit 20 detects the displacement amount of the touch position which the touch position information indicates while the touch position information is being provided, for example, as touch position displacement information indicating how much displacement there has been in the touch position from the start to the ending of the touch operation.

The control unit 20 then determines the type of the touch operation based on the touch operation time and the touch position displacement amount. That is to say, the control unit 20 determines whether or not the touch operation is a tapping operation where the fingertip or the like touches approximately one point and released in a significantly short predetermined amount of time.

Also, the control unit 20 determines whether the touch operation performed at this time is a flicking operation where the fingertip or the like moves less than a significantly short predetermined distance during a predetermined amount of time and is released, or is a sliding operation where the fingertip or the like moves a predetermined amount of time or longer and/or moves a predetermined distance or more and is released.

Upon determining that the touch operation performed at this time is a tapping operation, an instruction item instructed by the tapping operation in the image displayed on the display unit 21 is determined based on the touch position according to the tapping operation.

The control unit 20 then detects a command appropriated beforehand to the instruction item instructed by the tapping operation (i.e., the instruction item determined at this time), and executes processing corresponding to the detected command.

Also, in the event of determining that the touch operation performed at this time is a flocking operation or sliding operation, the control unit 20 executes processing corresponding to the flicking operation or the sliding operation, which will be described later.

In this way, the control unit 20 executes various types of processing corresponding to key operations and touch operations, in accordance with key operations as to operating keys of the operating unit 22 and touch operations as to the touch panel.

In actual practice, upon obtaining of a desired electronic book being requested by a key operation or tapping operation, the control unit 20 transmits obtaining request data requesting obtaining of the electronic book from a transmission unit 23 to the information sharing device 14, electronic book providing device, or information providing device, via the network 13.

Upon the electronic book data of the requested electronic book being sent from the information sharing device 14, electronic book providing device, or information providing device, and received at a reception unit 24, the control unit 20 sends the received electronic book data to a storage unit 25 so as to be stored.

Note that in the event a Web page, report, or the like, posted on the network 13, is acquired from the information providing device for example, the control unit 20 displays the Web page, report, or the like, on the display unit 21 without storing in the storage unit 25.

At this time, with the Web page, report, or the like displayed, the control unit 20 can select a part of the Web page text or part of the report or the like in which the user is interested, by operations, as if with a scrapbook.

Upon the part of the Web page text or part of the report or the like being selected, the control unit 20 can store the selected part in the storage unit 25 as electronic book data of an electronic book.

Thus, the control unit 20 can obtain multiple electronic book data from an external information sharing device 14, electronic book providing device, or information providing device, and stored in the storage unit 25.

Also, upon an electronic book being selected by a key operation or tapping operation, and display of the electronic book being requested, the control unit 20 reads out the electronic book data of the electronic book from the storage unit 25 and sends this to a display control unit 26.

At this time, the display control unit 26 generates one page of electronic book image data based on the electronic book data. The display control unit 26 then sends at least part of the electronic book data to the display unit 21 as displayable image data, in accordance with the size and resolution of the display face of the display unit 21, for example.

Accordingly, as shown in FIG. 4, the display control unit 26 displays at least part of an electronic book image 27 made up of one page of text based on the electronic book image data (where photograph images or illustration images are laid out along with one page of text) over the entire face of the display unit 21.

Note that at this time, the display control unit 26 displays at least part of the electronic book image 27 on the display face of the display unit 21 such that the vertical direction of the display face and the vertical direction of the image are parallel, and the horizontal direction of the display face and the horizontal direction of the image are parallel.

Note that in the following description, in the electronic book image 27 (FIG. 4), of the one end side and other end side of the image vertical direction parallel top the display face vertical direction, the one end side indicated by the arrow a will also be called the image upper side, and the other end side opposite to the one end side indicated by the arrow a will also be called the image lower side.

Note that in the following description, in the electronic book image 27 (FIG. 4), of the one end side and other end side of the image vertical direction parallel top the display face vertical direction, the one end side indicated by the arrow b will also be called the image right side, and the other end side opposite to the one end side indicated by the arrow b will also be called the image left side.

Now, with the example shown in FIG. 4, English text is displayed in a normal fashion, in which case the text is displayed with the individual lines of the text in parallel with the image horizontal direction as electronic book image 27. In this arrangement, in the event that the font used for display is a non-proportional font, the characters will also be aligned in the vertical direction, while if a proportional font is used, this does not hold true. It should be noted that in the following description, the term "column" referring to the position of the character in the line, and the relation of the column number of a character in one line as to the column number of a character in another line is irrelevant.

It should further be noted that not all languages are described in this manner, and that various exemplary embodiments can be conceived for languages which primarily use non-proportional fonts, languages which can be written vertically from top to bottom, languages which are written from the right to the left, etc., the exemplary embodiments here will be described with reference to an example of how standard English is normally displayed.

Also, in the following description, the sentence beginning side in the text in the electronic book image 27 will also be referred to simply as "start", and the sentence ending side will also be referred to simply as "end".

In the state that the electronic book image 27 is displayed in this way, upon determining that a touch operation has been performed and this touch operation is a flicking operation, the control unit 20 detects the displacement direction of the touch portion by the flicking operation (hereinafter, this will also be referred to as "touch position displacement direction").

In the event that detected touch position displacement direction is a direction for displacement from the right side in the image to the left side in the image, or a direction for displacement from the left side in the image to the right side in the image, the control unit 20 controls the display control unit 26 so as to switch the display of the electronic book image 27.

At this time, the display control unit 26 generates new electronic book image data based on the electronic book data, in accordance with the touch position displacement direction, and sends the generated electronic book image data to the display unit 21.

Accordingly, the display control unit 26 switches the display of the electronic book image 27 currently displayed on the display unit 21 to one page before or one page after, in accordance with the touch position displacement direction.

Thus, the display control unit 26 switches the electronic book image 27 displayed on the display unit 21 as if the pages of a book were being turned in order, in accordance with the flicking operations as to the touch panel.

Also, in the event that detected touch position displacement direction is a direction for displacement from the upper side in the image to the lower side in the image, or a direction for displacement from the lower side in the image to the upper side in the image, the control unit 20 controls the display control unit 26 so as to change the display range of the electronic book image 27.

At this time, the display control unit 26 changes, of the electronic book image data which had been sent to the display unit 21, the portion to be sent to the display unit 21.

Thus, the display control unit 26 scrolls the electronic book image 27 displayed on the display unit 21 to the lower side of the image or to the upper side of the image, and changes the display range of the electronic book image 27.

Thus, the display control unit 26 can change the display range of the electronic book image 27 in accordance with flicking operations as to the touch panel even in cases where the entire one page of electronic book image 27 is not displayable on the entire screen of the display unit 21.

2-2-1. Highlighted Display Processing

Next, description will be made regarding highlighted display processing wherein a desired portion of the text of the electronic book selected by the user is registered and highlighted display is performed.

At the time of displaying the electronic book image 27 on the display unit 21, the control unit 20 can instruct the desired portion of text by the face of the touch panel being slide-operated by any of various techniques of sliding the fingertip or the like.

Figures 5, 6:
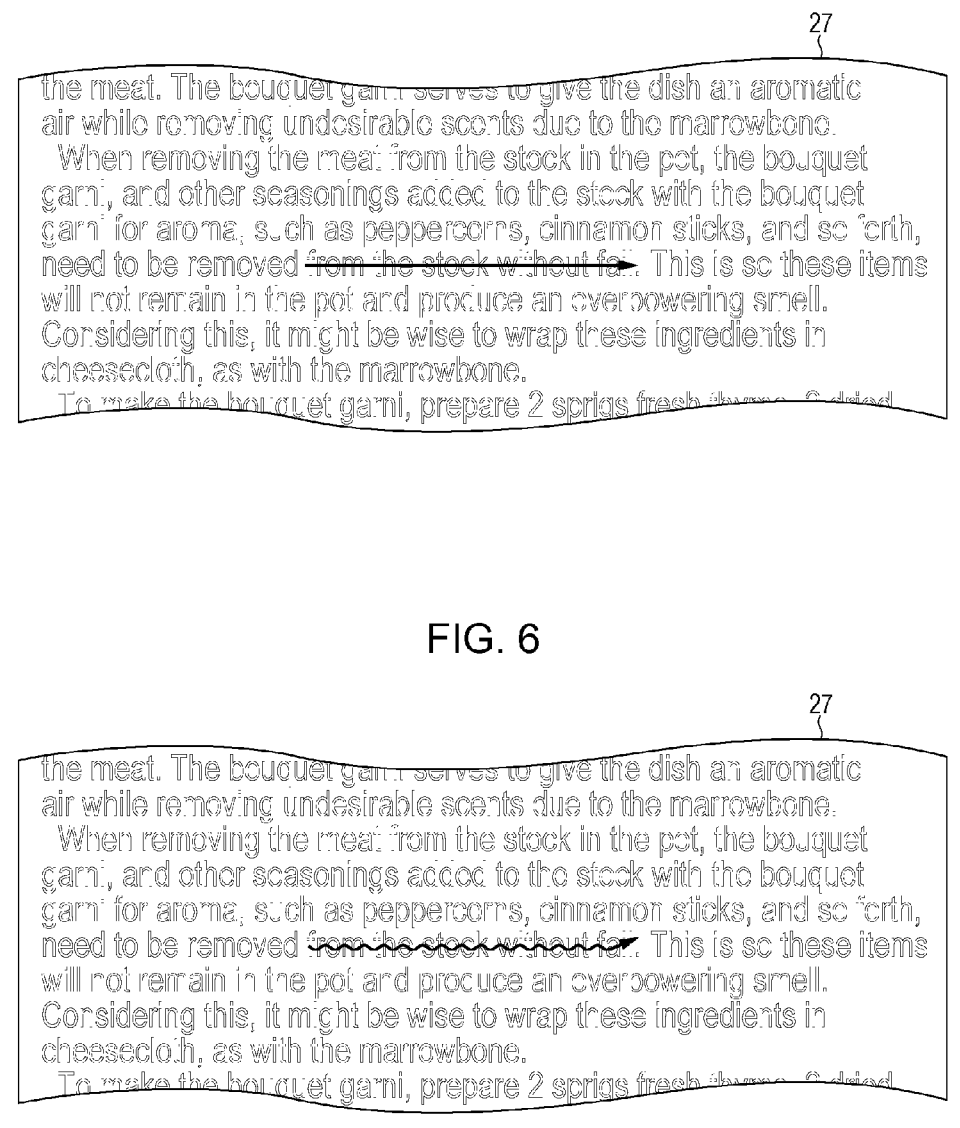

Now, as shown in FIG. 5, one type of sliding operation for indicating a selection of displayed content (that is, a desired portion of text) is to trace the desired portion of text with a fingertip or the like in an approximately straight line, so as to instruct that desired portion.

Now, as shown in FIG. 6, another type of sliding operation for indicating a desired portion of text is to trace the desired portion of text with a fingertip or the like in an undulating line, so as to instruct that desired portion.

Further, as shown in FIG. 7, another type of sliding operation for indicating a desired portion of text is to draw brackets with a fingertip or the like so as to enclose the desired portion of text, to instruct that desired portion.

Figures 8A, 8B:
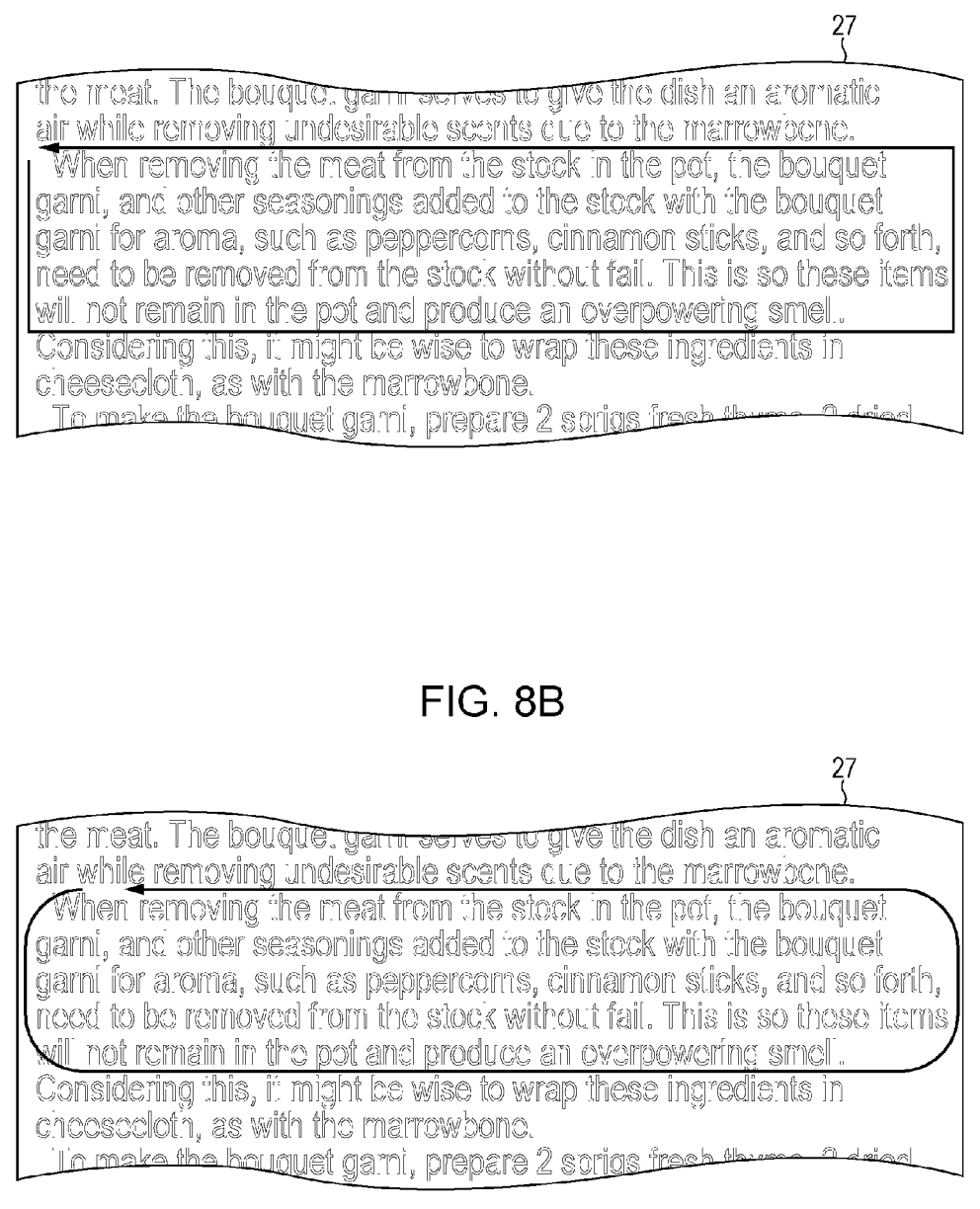

Further, as shown in FIGS. 8A and 8B, another type of sliding operation for indicating a desired portion of text is to draw lines of a desired shape such as a square or circle or the like with a fingertip or the like so as to enclose the desired portion of text, to instruct that desired portion.

However, when the user performs a sliding operation according to any one of the techniques for sliding operations with the electronic book image 27 displayed on the display unit 21, the user may not be able to accurately indicate the desired portion of text depending on the way in which the information display terminal 11 is being held, the dominant hand of the user, and so forth.

For example, in the event of the user performing a sliding operation of tracing the desired portion of text with a fingertip or the like in an approximately straight line, there may be cases wherein the path of tracing is diagonal as to the array of multiple characters representing the desired portion, or in an arc shape thereto, resulting in portions other than the desired portion also being traced.

Also, in the event of the user performing a sliding operation of tracing the desired portion of text with a fingertip or the like in an undulating line, there may be cases wherein height of undulations change partway and portions other than the desired portion also being traced, or the path of tracing gradually deviating from the desired portion.

As a result, in the event of the user tracing the desired portion of text by performing sliding operations with a fingertip or the like in an approximately straight line or an undulating line, the fingertip may cross over to an adjacent line to the upper side in the image or lower side in the image as to the desired portion, so as to indicate other than the desired portion.

Also, in the event of the user performing sliding operations by tracing the desired portion of text with a fingertip or the like in an approximately straight line or an undulating line, the user may not be able to see the characters being obscured by the finger for example, and may trace portions before or after the desired portion along with the desired portion. In this case, the user will have instructed portions other than the desired portion along with the desired portion of text.

Further, in the event that the characters are obscured by the fingertip in this way and are not visible, for example, the user may trace just a part of from the start to end of the desired portion, and thus instruct a portion shorter than the actual desired portion.

On the other hand, in the event of the user drawing brackets by performing sliding operations with a fingertip or the like so as to enclose the desired portion of text, the user may enclose portions before or after the desired portion, so as to indicate other than the desired portion along with the desired portion.

Also, in the event of the user drawing brackets by performing sliding operations with a fingertip or the like so as to enclose the desired portion of text, the user may enclose an adjacent line to the upper side in the image or lower side in the image as to the desired portion, so as to indicate other than the desired portion along with the desired portion.

Also, in the event of the user drawing brackets by performing sliding operations with a fingertip or the like so as to enclose the desired portion of text, the user may enclose just a part of from the start to end of the desired portion, and thus instruct a portion shorter than the actual desired portion.

Additionally, in the event of the user performing sliding operations with a fingertip or the like so as to encircle the desired portion of text, the user may encircle portions before or after the desired portion, so as to indicate other than the desired portion along with the desired portion.

Also, in the event of the user performing sliding operations with a fingertip or the like so as to encircle the desired portion of text, the user may encircle an adjacent line to the upper side in the image or lower side in the image as to the desired portion, so as to indicate other than the desired portion along with the desired portion.

Also, in the event of the user performing sliding operations with a fingertip or the like so as to encircle the desired portion of text, the user may encircle just a part of from the start to end of the desired portion, and thus instruct a portion shorter than the actual desired portion.

Accordingly, upon a desired portion of text being selected in the state of the electronic book image 27 displayed, the control unit 20 controls a selecting unit 28 to obtain data associated with the selection (that is, to select a portion estimated to have been instructed for selection of the desired portion of text), as an object of analysis of the desired portion. Note that in the following description, the portion estimated to have been instructed for selection of the desired portion of text will also be referred to as an "instruction-estimated portion".

In actual practice, in the event of determining that a touch operation performed as to the face of the touch panel in the state of the electronic book image 27 displayed is a sliding operation, the control unit 20 detects whether or not a sliding operation has been performed again within a predetermined time set beforehand from that point-in-time of determination.

Note that in the following description, the point-in-time at which determination has been made that the touch operation performed as to the touch panel is a sliding operation will also be referred as to "operation determining point-in-time".

Also, the predetermined time for storing the clocking at the operation determining point-in-time is set beforehand as appropriate, taking into consideration performing of a sliding operation twice in a row, for the user to instruct a desired portion of text by enclosing with a pair of brackets, for example.

In the event that a sliding operation is not performed again within the predetermined amount of time from the operation determining point-in-time, determination is made at this time that a sliding operation has been made just once to trace or encircle a desired portion of text in the electronic book image 27.

At this time, the control unit 20 detects the path of deviation of the touch position, from the beginning to end of the sliding operation, based on the touch position information indicating the touch position detected while the one sliding operation was being performed (hereinafter referred to as "touch path").

Also, based on the detected touch path, the control unit 20 determines what type of sliding operation was performed at that time (the way in which the fingertip or the like was moved in the sliding operation).

That is to say, the control unit 20 determines whether the sliding operation performed at that time was a sliding operation tracing the desired portion of text with a fingertip or the like in an approximately straight line, based on the touch path.

Also, the control unit 20 determines whether the sliding operation performed at that time was a sliding operation tracing the desired portion of text with a fingertip or the like in an undulating line, or a sliding operation encircling the desired portion of text with a fingertip or the like, based on the touch path.

The control unit 20 then sends the determination results of the type of sliding operation made at this time to the selecting unit 28 along with touch position information indicating all touch positions detected during the sliding operation (i.e., from the start to end of the sliding operation).

In addition to this, at this time the control unit 20 extracts electronic book data from the electronic book data which had been read out from the storage unit 25. The control unit 20 also inquires the display control unit 26 regarding the page number of the one page of text data used for generating the electronic book data for display at this time.

Accordingly, at this time, the control unit 20 extracts, from the electronic book data, text data of the page number notified from the display control unit 26 out of the text data for each page included in the electronic book data (one page of text data, hereinafter also referred to as "text data used for display") as well.

Further, the control unit 20 obtains from the display control unit 26 display region information indicating the display region for each character currently displayed (i.e., characters within the display range), indicated in coordinates of the pixel position on the display face of the display unit 21.

That is to say, if we say that the full text of one page is displayed, the control unit 20 obtains the display region information for each of all characters of the full text from the display control unit 26.

Also, if we say that just part of the text of one page is displayed, the control unit 20 obtains the display region information for each of all characters of the text in that part from the display control unit 26. Thus, the control unit 20 correlates the display region information of the characters with each of the characters within the display range in the text data used for display.

The control unit 20 then sends the text data used for display for the one page, with the display range information correlated with the characters within the display range (hereinafter also referred to as "region-correlated text data"), and book attribute data, to the selecting unit 28.

On the other hand, upon determining that a touching operation is performed again within the predetermined time from the operation determination point and the operation is a sliding operation (a sliding operation is performed again), the control unit 20 determines that the sliding operation is a sliding operation wherein the desired portion of text is enclosed in brackets.

The control unit 20 then sends the determination results of the type of sliding operation made at this time to the selecting unit 28 along with touch position information indicating all touch positions detected during each of the two sliding operations (i.e., from the start to end of each of the sliding operations).

The control unit 20 then prepares book attribute data in the same way as above, generates region-correlated text data, and sends the region-correlated text data and book attribute data as well, to the selecting unit 28.

In an exemplary embodiment, the determination results may indicate a type of user activation associated with the selection (that is, a sliding operation type), a plurality of activation positions associated with the first type of user activation (that is, touch position information), region-correlated text data, and/or book attribute data. Upon receiving the determination results from control unit 20, the selecting unit 28 performs range detection processing for detecting an instruction range instructed in the text being displayed.

Now, the following description will be made regarding a case of the text of the electronic book image 27 being displayed as horizontal text on the display face of the display unit 21, for example, as shown in FIG. 4.

Figure 9:
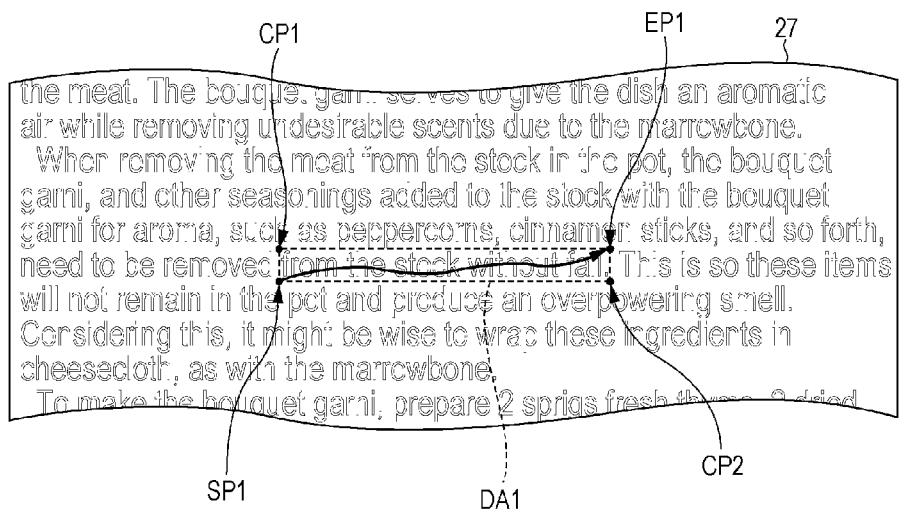
FIG. 9 is a schematic drawing for describing detection of an instruction range in a case of a desired portion of text having been traced in a straight line.

At this time, as shown in FIG. 9, in the event that a sliding operation has been made tracing the desired portion of text in a straight line, the selecting unit 28 identifies the start point-in-time touch position SP1 and end point-in-time touch position EP1, based on the touch position information.

Note that in the following description, the start point-in-time touch position SP1 for the sliding operation will also be referred to as operation start touch position SP1, and the end point-in-time touch position EP1 for the sliding operation will also be referred to as operation end touch position EP1.

The selecting unit 28 then determines whether or not the identified operation start touch position SP1 and operation end touch position EP1 are situated on a single straight line parallel with the image horizontal direction.

As a result, in the event that the operation start touch position SP1 and operation end touch position EP1 are not situated on a single horizontal straight line, the selecting unit 28 takes these as two apexes at one end and the other end of a diagonal line between opposing angles of a square.

The selecting unit 28 then detects an intersection CP1 between a straight line parallel with the image vertical direction passing through the operation start touch position SP1, and a straight line parallel with the image horizontal direction passing through the operation end touch position EP1.

The selecting unit 28 also detects an intersection CP2 between a straight line parallel with the image horizontal direction passing through the operation start touch position SP1, and a straight line parallel with the image vertical direction passing through the operation end touch position EP1.

The selecting unit 28 further takes the two detected intersections CP1 and CP2 as the remaining two apexes of the square. Thus, the selecting unit 28 detects the range of a square of which the operation start touch position SP1, operation end touch position EP1, and two intersections CP1 and CP2 are the four apexes, as an instructed range DA1 in the display range of the electronic book image 27.

Figure 10:
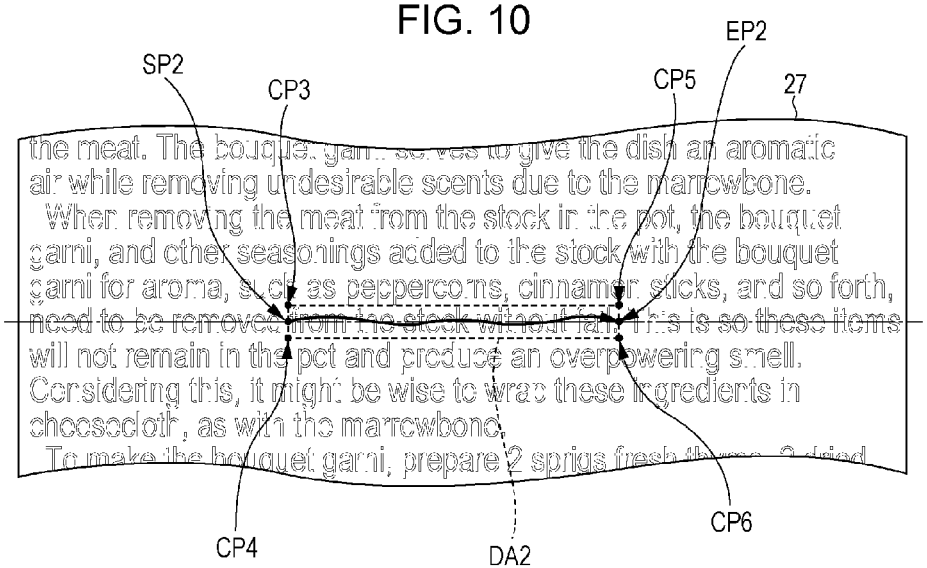
FIG. 10 is a schematic drawing for describing detection of an instruction range in a case of a desired portion of text having been traced in a straight line.

On the other hand, in the event that the operation start touch position SP2 and operation end touch position EP2 are situated on a single horizontal straight line as shown in FIG. 10, the selecting unit 28 detects the upper edge and lower edge of the display region of characters of which the display position overlaps this straight line.

The selecting unit 28 then detects two intersections CP3 and CP4 between a straight line parallel with the image vertical direction passing through the operation start touch position SP2, and straight lines parallel with the image horizontal direction which pass through the detected upper edge and lower edge.

The selecting unit 28 further detects two intersections CP5 and CP6 between a straight line parallel with the image vertical direction passing through the operation end touch position EP2, and straight lines parallel with the image horizontal direction which pass through the detected upper edge and lower edge.

The selecting unit 28 then takes the four detected intersections CP3 through CP6 as the four apexes of the square. Thus, the selecting unit 28 detects the range of a square of which the four detected intersections CP3 through CP6 are the four apexes, as an instructed range DA2 in the display range of the electronic book image 27.

Figure 11:
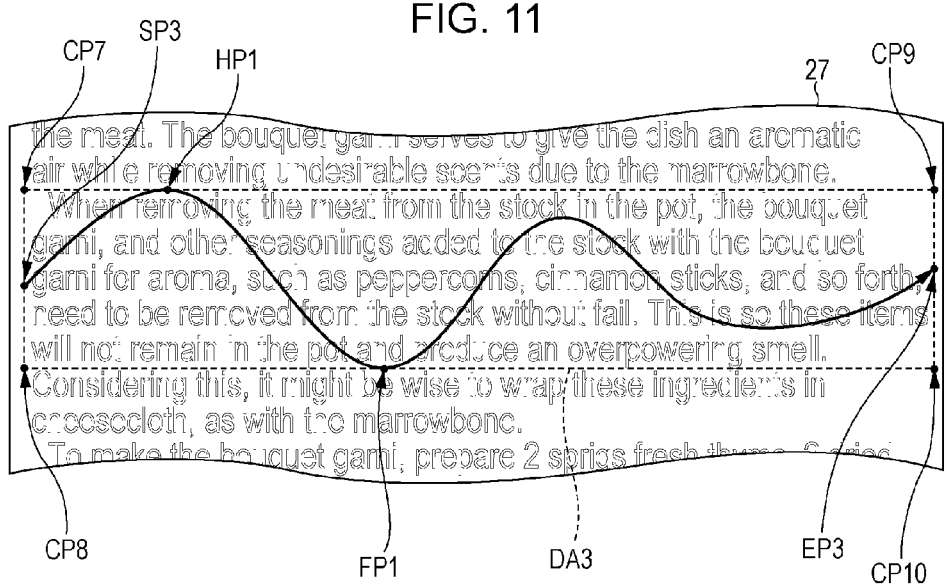
FIG. 11 is a schematic drawing for describing detection of an instruction range in a case of a desired portion of text having been traced in an undulating line.

Also, as shown in FIG. 11, in the event that a sliding operation has been made tracing the desired portion of text in an undulating line, the selecting unit 28 identifies the operation start touch position SP3 and operation end touch position EP3 of the sliding operation, based on the touch position information.

Also, the selecting unit 28 also identifies, of the multiple touch positions, a touch position HP1 closest to the start side of the text being displayed (in this case, at the uppermost side of the image), based on the touch position information.

Further, the selecting unit 28 also identifies, of the multiple touch positions, a touch position FP1 closest to the end side of the text being displayed (in this case, at the lowermost side of the image), based on the touch position information.

Note that, in the following description, the touch position HP1 closest to the start of the text being displayed will be referred to as "text start side touch position HP1", and the touch position FP1 closest to the end of the text being displayed will be referred to as "text end side touch position FP1".

The selecting unit 28 then detects an intersection CP7 between a straight line parallel with the image vertical direction passing through the operation start touch position SP3, and a straight line parallel with the image horizontal direction passing through the text start side touch position HP1.

The selecting unit 28 also detects an intersection CP8 between a straight line parallel with the image vertical direction passing through the operation start touch position SP3, and a straight line parallel with the image horizontal direction passing through the text end side touch position FP1.

The selecting unit 28 further detects an intersection CP9 between a straight line parallel with the image vertical direction passing through the operation end touch position EP3, and a straight line parallel with the image horizontal direction passing through the text start side touch position HP1.

The selecting unit 28 further detects an intersection CP10 between a straight line parallel with the image vertical direction passing through the operation end touch position EP3, and a straight line parallel with the image horizontal direction passing through the text end side touch position FP1.

The selecting unit 28 then takes these four detected intersections CP7 through CP10 as the four apexes of the square. Thus, the selecting unit 28 detects the range of a square of which the four detected intersections CP7 through CP10 are the four apexes, as an instructed range DA3 in the display range of the electronic book image 27.

Figure 12:
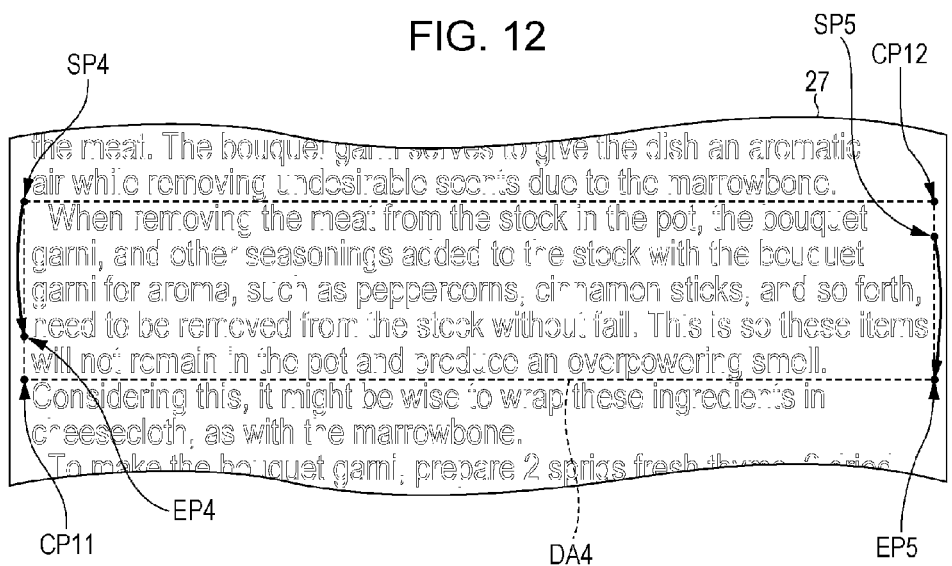
FIG. 12 is a schematic drawing for describing detection of an instruction range in a case of a desired portion of text having been enclosed in brackets.

Further, as shown in FIG. 12, in the event that two sliding operations have been performed so as to enclose a desired portion of the text with a pair of brackets, an operation start touch position SP4 of the first sliding operation is identified based on the touch position information obtained at the first sliding operation.

Also, an operation end touch position EP4 of the first sliding operation is also identified based on the touch position information obtained at the first sliding operation.

Further, an operation start touch position SP5 and operation end touch position EP5 of the second sliding operation are identified based on the touch position information obtained at the second first sliding operation.

Further, of the operation start touch position SP4 and operation end touch position EP4 of the first sliding operation, the selecting unit 28 detects the one situated at the start side of the text being displayed (in this case, the operation start touch position EP4 situated at the upper left side of the image).

Furthermore, of the operation start touch position SP5 and operation end touch position EP5 of the second sliding operation, the selecting unit 28 detects the one situated at the end side of the text being displayed (in this case, the operation end touch position EP5 situated at the lower right side of the image).

The selecting unit 28 then takes the operation start touch position SP4 detected as the text start side and the operation end touch position EP5 detected as the text end side as two apexes at one end and the other end of a diagonal line between opposing angles of a square.

The selecting unit 28 also detects an intersection CP11 between a straight line parallel with the image vertical direction passing through the operation start touch position SP4 detected as the text start side, and a straight line parallel with the image horizontal direction passing through the operation end touch position EP5.

The selecting unit 28 also detects an intersection CP12 between a straight line parallel with the image horizontal direction passing through the operation start touch position SP4 detected as the text start side, and a straight line parallel with the image vertical direction passing through the operation end touch position EP5.

The selecting unit 28 further takes the two detected intersections CP11 and CP12 as the remaining two apexes of the square. Thus, the selecting unit 28 detects the range of a square of which the operation start touch position SP4 at the text start side, the operation end touch position EP5 at the text end side, and two intersections CP11 and CP12 are the four apexes, as an instructed range DA4 in the display range of the electronic book image 27.

Further, as shown in FIGS. 13A and 13B, in the event that a sliding operation is made to encircle the desired portion of text, the selecting unit 28 identifies the operation start touch position SP6 (SP7), and operation end touch position EP6 (EP7), based on the touch position information.

Also, the selecting unit 28 detects the touch path from the operation start touch position SP6 (SP7) to the operation end touch position EP6 (EP7), for example. Accordingly, the selecting unit 28 detects the range encircled by the touched path as instructed range DA5 (DA6).

Upon detecting an instructed range such as DA1 through DA6 in the above-described drawings, the selecting unit 28 then performs selection processing for selecting an instruction-estimated portion from the text in the electronic book image 27 being displayed.

Note however, that there are three types of first through third selection techniques as selection techniques for this selection processing. Description will be made regarding these first through third selection techniques with reference to FIGS. 14A, 14B, 15A, and 15B. It should be understood in the following description that one description may be directed to multiple examples, and accordingly reference numerals from different cases in different drawings referred to in the same description. For example, the term "range DA1 through DA6" as used here does not imply that multiple ranges DA1 through DA6 exist in the same electronic book image 27 at the same time and are being processed at the same time; rather, this term implies that the description can be applied to any of these ranges DA1 through DA6.

The first technique is a technique effective for selecting an instruction-estimated portion by narrowing the instructed range DA1 through DA6, as if it were, in the event that the user has a tendency to instruct the desired portion of the text including portions before and after the desired portions as well, for example.

The second technique is a technique effective for selecting an instruction-estimated portion by expanding the instructed range DA1 through DA6, as if it were, in the event that the user has a tendency to instruct just part of the desired portion of the text between the start of the text to the end of the text thereof, for example.

The third technique is a technique effective for selecting an instruction-estimated portion from the instructed range DA1 through DA6 in the event that the user has a tendency to instruct in an irregular manner, with the range being inconsistently too wide or too narrow, for example, taking this into consideration.

Accordingly, the control unit 20 prompts the user beforehand to select and set which selection technique of the first through third selection techniques to be used to perform selection processing to select the instruction-estimated portion from the text.

Accordingly, the selection processing which the selecting unit 28 performs according to the first through third selection techniques, in accordance with the contents of setting of the selection technique, will be described in order.

First, the selection processing according to the first selection technique will be described. In the event that settings have been made so as to perform selection processing with the first selection technique, for example, the selecting unit 28 detects characters within the instructed range DA1 through DA6, based on the instructed range DA1 through DA6 detected early and the region-correlated text data.

At this time, the selecting unit 28 detects characters of which the display regions are completely within the instructed range DA1 through DA6 (hereinafter also referred to as "in-range characters"), for example, as characters within the instructed range DA1 through DA6.

At this time, the selecting unit 28 detects characters of which the display regions are overlapping the instructed range DA1 through DA6 (hereinafter also referred to as "fringe portion characters"), for example, as characters within the instructed range DA1 through DA6.

Figure 14A:
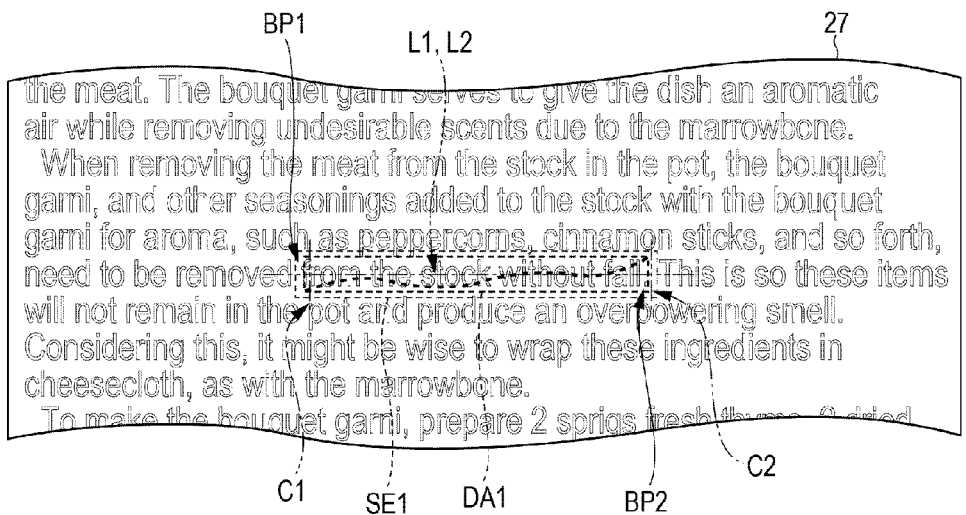
FIGS. 14A and 14B are schematic drawings for describing detection of a search range according to a first selection technique.
Figure 14B:
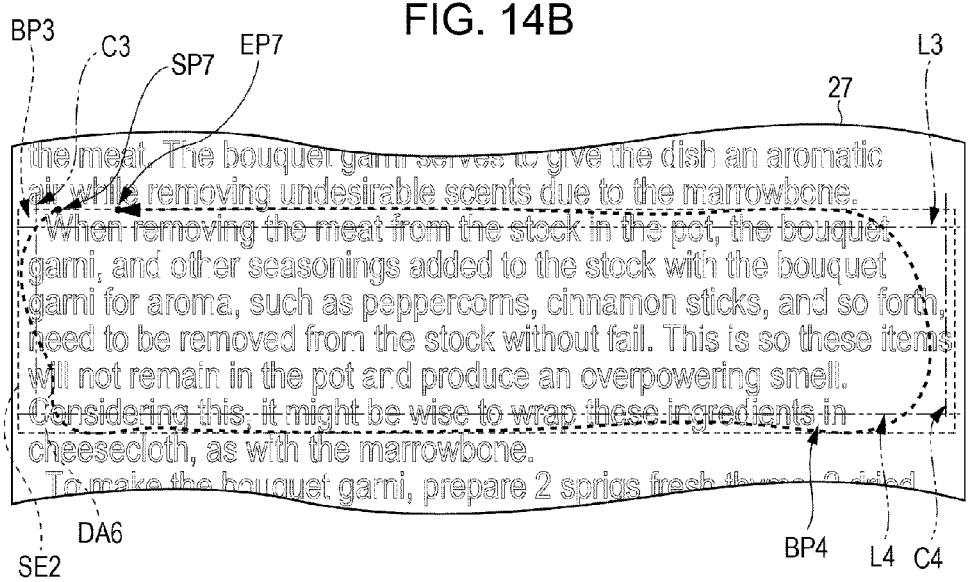
Figure 15A:
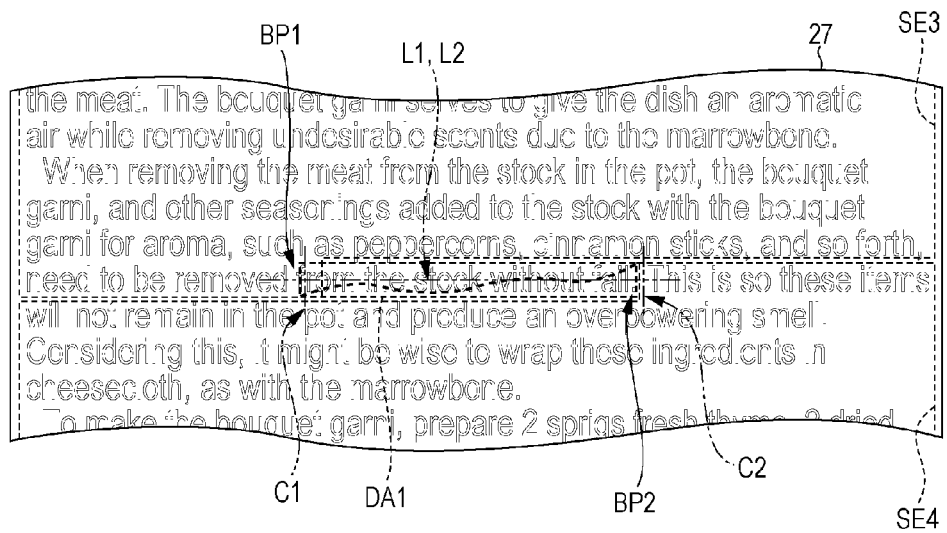
FIGS. 15A and 15B are schematic drawings for describing detection of a search range according to a second selection technique.
Figure 15B:
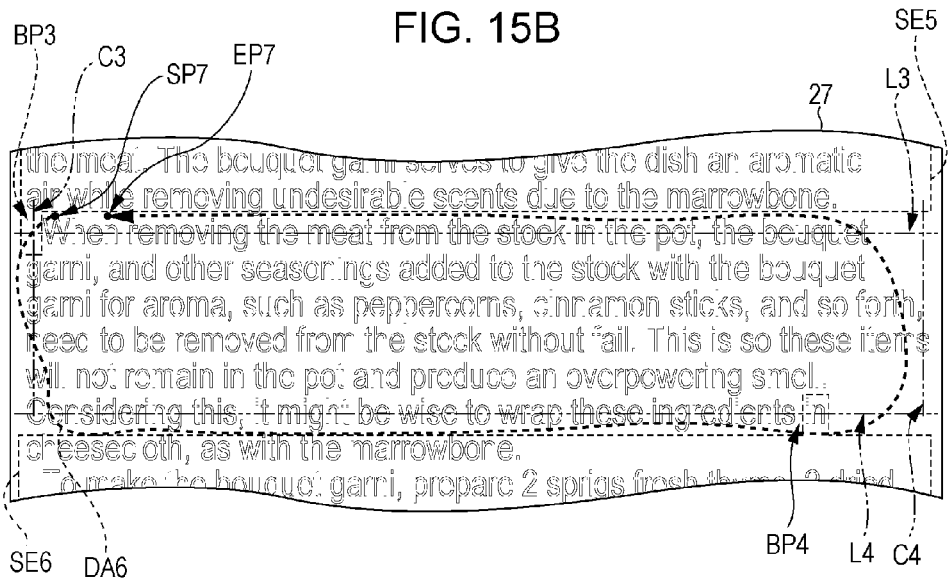

That is to say, as shown in FIGS. 14A and 14B, if there are in-range characters but no fringe portion characters, the selecting unit 28 detects the in-range characters alone as characters within the instructed range DA1.

Also, if there are in-range characters and no fringe portion characters, the selecting unit 28 detects both the in-range characters and fringe portion as characters being within the instructed range DA6.

The selecting unit 28 then detects, in the array of characters within the instructed range DA1 through DA6, the one line closest to the start of the text (in this case, the one line which is uppermost in the image), and one line closest to the end of the text (in this case, the one line which is lowermost in the image).

Incidentally, in the event that the character within the instructed range DA1 is just one line, the selecting unit 28 (FIG. 14A) detects that one line as both the one line closest to the start of the text and one line closest to the end of the text.

The selecting unit 28 also detects, in the array of characters within the instructed range DA1 through DA6, the one column closest to the start of the text within the line which extends the farthest in that direction (in this case, the one column which is leftmost in the image), and one column closest to the end of the text within the line which extends the farthest in that direction (in this case, the one column which is rightmost in the image). In the event that a non-proportional font is used, the one column closest to the start of the text or the one column closest to the end of the text within the line with the greatest number of characters can be selected, since the number of characters per line will be fixed; however, in the case of using a proportional font, the number of characters per line may vary, an hence this distinction.

It should also be noted that electronic display of English text involves word wrapping at the end of lines to facilitate reading, and while the end of a line wrapped early may appear to have several spaces, it should be noted that the selecting unit 28 is reading the character string, and so only sees one space at that portion, hence the above distinction.

Further, the selecting unit 28 detects the one character situated at the intersection between the one line L1 and L3 closest to the start of the text and the one column C1 and C3 closest to the start of the text in the line extending the farthest in that direction as base point BP1 and BP3 for starting to search for the first character in the instruction-estimated portion within the text (FIGS. 14A and 14B).

Note that in the following description, the base point BP1 and BP3 for starting to search for the first character in the instruction-estimated portion within the text will also be referred to as "start side base point character BP1 and BP3".

Further, the selecting unit 28 detects the one character situated at the intersection between the one line L2 and L4 closest to the end of the text and the one column C2 and C4 closest to the end of the text line extending the farthest in that direction as base point BP2 and BP4 for starting to search for the last character in the instruction-estimated portion within the text (FIGS. 14A and 14B).

Note that in the following description, the base point BP2 and BP4 for starting to search for the last character in the instruction-estimated portion within the text will also be referred to as "end side base point character BP2 and BP4".

Accordingly, the selecting unit 28 sets the range between the start side base point character BP1 and BP3 and end side base point character BP2 and BP4 as search range SE1 and SE2 in the text within the displayed range for searching for the first and last characters in the instruction-estimated portion (FIGS. 14A and 14B).

Now, as described above, there may be cases wherein the user instructs a desired words as the desired portion in the text in the displayed range, and cases of instructing a desired paragraph, phrase, or the like, including two or more words, as a desired portion.

Accordingly, the selecting unit 28 uses the region-correlated text data to search for characters within the search range SE1 and SE2 indicating breaks in the sentence such as punctuation and so forth, out of the various types of characters, using the region-correlated text data. Note that in the following description, characters indicating breaks in the sentence such as punctuation, will also be referred to as "break character".

In actual practice, the selecting unit 28 searches the search range SE1 and SE2 from the start side base point character BP1 and BP3 toward the end side base point character BP2 and BP4, one character at a time, searching for break characters.

In the event of the selecting unit 28 finding one break character between the start side base point character BP1 and BP3 and the end side base point character BP2 and BP4, the search for a break character from the start side base point character BP1 and BP3 toward the end side base point character BP2 and BP4 is ended at the point of detection.

The selecting unit 28 then searches the search range SE1 and SE2 from the end side base point character BP2 and BP4 toward the start side base point character BP1 and BP3, one character at a time, searching for break characters.

That is to say, upon the selecting unit 28 finding one break character between the start side base point character BP1 and BP3 and the end side base point character BP2 and BP4, a break character is then searched for from the end side base point character BP2 and BP4 toward the start side base point character BP1 and BP3.

In the event of the selecting unit 28 finding one break character between the end side base point character BP2 and BP4 and the start side base point character BP1 and BP3, the search for a break character from the end side base point character BP2 and BP4 toward the start side base point character BP1 and BP3 is ended at the point of detection.

Thus, upon detecting break characters within the search range SE1 and SE2, the display position of the break character detected in the search from the start side base point character BP1 and BP3 is compared with the display position of the break character detected in the search from the end side base point character BP2 and BP4.

Note that in the following description, the one break character detected in the search from the start side base point character BP1 and BP3 will also be referred to as "start side break character", and the one break character detected in the search from the end side base point character BP2 and BP4 will also be referred to as "end side break character".

In the event that the display position of the start side break character and the display position of the end side break character are not the same (i.e., the start side break character is closer to the text start than the end side break character), the selecting unit 28 takes the text string in the range between the start side break character and end side break character as the instruction-estimated portion.

That is to say, the selecting unit 28 detects the start side break character and end side break character as the first and last characters of the instruction-estimated portion, and selects the paragraph or sentence, for example, of the range between the start side break character and end side break character, as the instruction-estimated portion.

Now, in the event that the display position of the start side break character and the display position of the end side break character agree and these are the same break character at the same position, the selecting unit 28 takes the text string in the range between the start side base point character BP1 and BP3 to the end side base point character BP2 and BP4 as the instruction-estimated portion.

That is to say, the selecting unit 28 detects start side base point character BP1 and BP3 and end side base point character BP2 and BP4 as the first and last characters of the instruction-estimated portion.

The selecting unit 28 then selects a word or a predetermined portion in a paragraph or the like, from the range from the start side base point character BP1 and BP3 through end side base point character BP2 and BP4, as an instruction-estimated portion.

Also, in the event that the selecting unit 28 does not detect a start side break character in the search from the start side base point character BP1 and BP3 to end side base point character BP2 and BP4, in this case as well, the character string from the start side base point character BP1 and BP3 to the end side base point character BP2 and BP4 is taken as the instruction-estimated portion in this case as well.

That is to say, the selecting unit 28 detects the start side base point character BP1 and BP3 and the end side base point character BP2 and BP4 as the start and end characters of the instruction-estimated portion.

The selecting unit 28 then selects, from the text in the displayed range, a word or a predetermined portion in a paragraph or the like, from the range from the start side base point character BP1 and BP3 to the end side base point character BP2 and BP4, for example, as the instruction-estimated portion.

Thus, even in the event that the user has a tendency to include portions before and after the desired portion of text in the instructions, the selecting unit 28 can select a portion estimated to be instructed by the user in a fairly accurate manner.

Next, description will be made regarding the selection processing according to the second selection technique. In the event that the selecting unit 28 is set so as to execute the selection processing with the second selection technique, the characters within the instructed range DA1 through DA6 is detected in the same way as with the above-described first selection technique.

Also, in the same way as with the first selection technique described above, the selecting unit 28 detects the one line closest to the start of the text, the one line closest to the end of the text, the one column closest to the start of the line extending farthest in that direction, and the one column closest to the end of the line extending farthest in that direction.

Further, in the same way as with the first selection technique described above, the selecting unit 28 also detects the start side base point character BP1 and BP3, and end side base point character BP2 and BP4.

At this time, the selecting unit 28 sets the range between the start side base point character BP1 and BP3 and the first character in the text of the display range as search range SE3 and SE5 for searching for the first character in the instruction-estimated portion (hereinafter also referred to as "start side search range").

Also, the selecting unit 28 sets the range between the end side base point character BP2 and BP4 and the last character in the text of the display range as search range SE4 and SE6 for searching for the last character in the instruction-estimated portion (hereinafter also referred to as "end side search range").

The selecting unit 28 then uses the region-correlated text data to determine the character type one character at a time in the start side search range SE3 and SE5 from the start side base point character BP1 and BP3 to the first character in the display range, to search for break characters.

In the event that one break character is found between the start side base point character BP1 and BP3 and the first character in the display range, at that point of detection, the search for break characters from the start side base point character BP1 and BP3 to the first character in the display range is ended.

The selecting unit 28 also uses the region-correlated text data to determine the character type one character at a time in the end side search range SE4 and SE6 from the end side base point character BP2 and BP4 to the last character in the display range, to search for break characters.

In the event that one break character is found between the end side base point character BP2 and BP4 and the last character in the display range, at that point of detection, the search for break characters from the end side base point character BP2 and BP4 to the last character in the display range is ended.

Note that in the following description as well, the break character detected in the search from the start side base point character BP1 and BP3 will be referred to as "start side break character", and the break character detected in the search from the end side base point character BP2 and BP4 will be referred to as "end side break character".

Thus, upon detecting the start side break character and the end side break character, the selecting unit 28 takes the text string from the start side break character to the end side break character as the instruction-estimated portion.

That is to say, the selecting unit 28 detects, from the text in the display range, the start side break character and the end side break character as the first and last characters of the instruction-estimated portion, and selects a paragraph or phrase or the like, for example, in the range between the start side break character and the end side break character, as an instruction-estimated portion.

Now, in the event that the user has selected the second selection technique in settings beforehand, but no start side break character or end side break character can be found in the display range, the control unit 20 prompts selection and setting of whether or not to change the search range.

Also, in the event of changing the search range, the control unit 20 prompts selection and setting of whether to take from the start side base point character BP1 and BP3 to the end side base point character BP2 and BP4 as the search range, or whether to change the ends of the search range from the first character through last character in the display range to the first character through last character in the page.

However, if both the start side break character and end side break character are not found, the control unit 20 applies change of the search range to the search of both the start and end characters of the instruction-estimated portion.

Also, if the end side break character is found in the display range, but the start side break character is not found, the control unit 20 applies change of the search range to just the search of the start character of the instruction-estimated portion.

Further, if the start side break character is found in the display range, but the end side break character is not found, the control unit 20 applies change of the search range to just the search of the end character of the instruction-estimated portion.

Accordingly, in the event that the start side break character is not found in the start side search range SE3 and SE5, the selecting unit 28 determines whether or not to change the search range in accordance with the settings made beforehand.

In the event that it is found as a result thereof that settings have been made so as to not change the search range even if the start side break character is not found in the start side search range SE3 and SE5, the selecting unit 28 takes the first character in the display range as the first character in the instruction-estimated portion.

Also, in the event that settings have been made so as to change the end of the search range if the start side break character is not found in the start side search range SE3 and SE5, the selecting unit 28 determines whether or not the first character in the display range is the first character in the page including this display range.

In the event that it is found as a result thereof that the first character in the current display range is the first character in the page (i.e., a predetermined range from the start of the page is the display range), the selecting unit 28 takes the first character in the display range as the first character in the instruction-estimated portion.

On the other hand, in the event that the first character in the current display range is not the first character in the page (i.e., a predetermined range excluding the first character in the page is the display range), the selecting unit 28 changes the end of the start side search range SE3 and SE5 to the first character of the page.

The selecting unit 28 then uses the region-correlated text data to determine the character type one character at a time in the new start side search range from the character adjacent on the start side to the first character in the display range to the first character in the page, to search for break characters. Note that in the following description, a character adjacent on the start side to the first character in the display range will also be referred to as "display range preceding character".

As a result, in the event that one break character is found between the display range preceding character and the first character in the page, at that point of detection, the search for break characters from the display range preceding character to the first character in the page is ended.

The selecting unit 28 then takes the one start side break character detected between the display range preceding character and the first character in the page (i.e., the new start side search range) as the first character in the instruction-estimated portion.

On the other hand, in the event that a start side break character is not found between the display range preceding character and the first character in the page (i.e., within the new start side search range), the selecting unit 28 takes the first character in the page as the first character of the instruction-estimated portion.

Also, in the event that the end side break character is not found in the end side search range SE4 and SE6, the selecting unit 28 determines whether or not to change the search range in accordance with the settings made beforehand.

In the event that it is found as a result thereof that settings have been made so as to not change the search range even if the end side break character is not found in the start side search range SE4 and SE6, the selecting unit 28 takes the last character in the display range as the last character in the instruction-estimated portion.

Also, in the event that settings have been made so as to change the end of the search range if the end side break character is not found in the end side search range SE4 and SE6, the selecting unit 28 determines whether or not the last character in the display range is the last character in the page including this display range.

In the event that it is found as a result thereof that the last character in the current display range is the last character in the page (i.e., a predetermined range from the end of the page is the display range), the selecting unit 28 takes the last character in the display range as the last character in the instruction-estimated portion.

On the other hand, in the event that the last character in the current display range is not the last character in the page (i.e., a predetermined range excluding the last character in the page is the display range), the selecting unit 28 changes the end of the end side search range SE4 and SE6 to the last character of the page.

The selecting unit 28 then uses the region-correlated text data to determine the character type one character at a time in the new start side search range from the character adjacent on the end side to the first character in the display range to the last character in the page, to search for break characters. Note that in the following description, a character adjacent on the end side to the last character in the display range will also be referred to as "display range following character".

As a result, in the event that one break character is found between the display range following character and the last character in the page, at that point of detection, the search for break characters from the display range following character to the last character in the page is ended.

The selecting unit 28 then takes the one end side break character detected between the display range following character and the last character in the page (i.e., the new end side search range) as the last character in the instruction-estimated portion.

On the other hand, in the event that an end side break character is not found between the display range following character and the last character in the page (i.e., within the new end side search range), the selecting unit 28 takes the last character in the page as the last character of the instruction-estimated portion.

In this way, the selecting unit 28 detects, from text in the display range or one page, a start side break character, first character in display range, or first character in page, as the first character in the instruction-estimated portion, as appropriate.

Also, the selecting unit 28 detects, from text in the display range or one page, an end side break character, last character in display range, or last character in page, as the last character in the instruction-estimated portion, as appropriate. The selecting unit 28 then selects, from the text in the display range or one page, a paragraph or phase or the like in the range from the detected first character to last character as the instruction-estimated portion.

Also, in the event that settings are made such that when the start side break character is not found in the start side search range SE3 and SE5, from the start side base point character BP1 and BP3 to the end side base point character BP2 and BP4 is set as the search range, the selecting unit 28 searches for the start side break character in the same way as with the first selection technique described above.

That is to say, the selecting unit 28 uses the region-correlated text data to determine the character type one character at a time from the start side base point character BP1 and BP3 to the end side base point character BP2 and BP4 in the search range, to search for break characters.

In the event that one break character is found between the start side base point character BP1 and BP3 and the end side base point character BP2 and BP4, at that point of detection, the search for break characters from the start side base point character BP1 and BP3 to the first character in the display range is ended.

The selecting unit 28 also determines the character type one character at a time from the end side base point character BP2 and BP4 to the last character in the display range or the page as described above, to search for break characters.

In the event that one break character is found between the end side base point character BP2 and BP4 and the last character in the display range or the page, at that point of detection, the search for the start side break character is ended.

On the other hand, in the event that no break character is found in the search between the start side base point character BP1 and BP3 and the end side base point character BP2 and BP4 (i.e., in the search range), at that point of detection, the search for the start side break character is ended.

Also, at this time, in the event that the last character of the instruction-estimated portion is found between the end side base point character BP2 and BP4 and the last character in the display range or the page, the selecting unit 28 takes the start side base point character BP1 and BP3 as the first character of the instruction-estimated portion.

Also, in the event that settings are made such that when the end side break character is not found in the end side search range SE4 and SE6, from the start side base point character BP1 and BP3 to the end side base point character BP2 and BP4 is set as the search range, the selecting unit 28 searches for the start side break character in the same way as with the first selection technique described above.

That is to say, the selecting unit 28 uses the region-correlated text data to determine the character type one character at a time from the end side base point character BP2 and BP4 to the start side base point character BP1 and BP3 in the search range, to search for break characters.

In the event that one break character is found from the end side base point character BP2 and BP4 to the start side base point character BP1 and BP3 as a result thereof, at that point of detection, the search for the end side break character is ended.

At this time, in the event of having detected the first character in the instruction-estimated portion between the start side base point character BP1 and BP3 at this time, the selecting unit 28 takes the end side break character as the last character.

On the other hand, in the event of having detected a start side break character between the start side base point character BP1 and BP3 and the end side base point character BP2 and BP4 at this time, the selecting unit 28 compares the display position of the start side break character with the display position of the end side break character, in the same way as with the first selection technique described above.

In the event that the display position of the start side break character and the display position of the end side break character are not the same (i.e., the start side break character is closer to the text start than the end side break character), the selecting unit 28 takes the text string in the range between the start side break character and end side break character as the instruction-estimated portion.

That is to say, the selecting unit 28 detects the start side break character and end side break character as the first and last characters of the instruction-estimated portion, and selects the paragraph or sentence or the like, for example, of the range between the start side break character and end side break character, as the instruction-estimated portion.

Now, in the event that the display position of the start side break character and the display position of the end side break character agree and these are the same break character at the same position, the text string in the range between the start side base point character BP1 and BP3 to the end side base point character BP2 and BP4 is taken as the instruction-estimated portion.

That is to say, the selecting unit 28 detects start side base point character BP1 and BP3 and end side base point character BP2 and BP4 as the first and last characters of the instruction-estimated portion.

The selecting unit 28 then selects a word or a predetermined portion in a paragraph or the like, from the range from the start side base point character BP1 and BP3 through end side base point character BP2 and BP4, as an instruction-estimated portion.

Also, in the event that the selecting unit 28 does not detect a start side break character in the search from the end side base point character BP2 and BP4 to start side base point character BP1 and BP3 (i.e., in the search range), the end side base point character BP2 and BP4 is taken as the last character of the instruction-estimated portion.

That is to say, the selecting unit 28 detects, from text in the display range or one page, an end side break character, last character in display range, or last character in page, as the last character in the instruction-estimated portion, as appropriate, and also detects the end side base point character BP2 and BP4 as the last character of the instruction-estimated portion.

The selecting unit 28 then selects, from the text in the displayed range or one page, a paragraph or phrase or the like, from the range from the detected first character to last character, for example, as the instruction-estimated portion.

Thus, even in the event that the user has a tendency to instruct only part of desired portion of text, the selecting unit 28 can select a portion estimated to be instructed by the user from the display range or page of text in a fairly accurate manner.

Next, description will be made regarding the selection processing according to the third selection technique. In the event that the selecting unit 28 is set so as to execute the selection processing with the third selection technique, the characters within the instructed range DA1 through DA6 is detected in the same way as with the above-described first selection technique.

Also, in the same way as with the first selection technique described above, the selecting unit 28 detects the one line closest to the start of the text, the one line closest to the end of the text, the one column closest to the start of the line extending the farthest in that direction, and the one column closest to the end of the line extending the farthest in that direction.

Further, in the same way as with the first selection technique described above, the selecting unit 28 also detects the start side base point character BP1 and BP3, and end side base point character BP2 and BP4.

The selecting unit 28 first performs processing basically the same as with the above-described first selection technique. That is to say, the selecting unit 28 sets the range between the start side base point character BP1 and BP3 and end side base point character BP2 and BP4 as search range SE1 and SE2 in the text within the displayed range for searching for the first and last characters in the instruction-estimated portion.

Also, in the event that the selecting unit 28 does not detect a start side break character in the search from the start side base point character BP1 and BP3 to end side base point character BP2 and BP4, the text string in the range from the start side base point character BP1 and BP3 to the end side base point character BP2 and BP4 is taken as the instruction-estimated portion.

That is to say, the selecting unit 28 detects, from text in the display range, the start side base point character BP1 and BP3 and the end side base point character BP2 and BP4 as the start side break character and the end side break character.

The selecting unit 28 then selects, from the text in the displayed range, a paragraph or phrase or the like, for example, from the range from the start side base point character BP1 and BP3 to end side base point character BP2 and BP4, as the instruction-estimated portion.

In the event that one break character is found from the start side base point character BP1 and BP3 to the end side base point character BP2 and BP4 as a result thereof, at that point of detection, the search for the end side break character is ended, and the search range SE1 and SE2 continues to be searched for the end side break character.

In the event of the selecting unit 28 finding one break character between the end side base point character BP2 and BP4 and the start side base point character BP1 and BP3, the search for the end side break character is ended at the point of detection, and the display position of the start side break character and the display position of the end side break character are compared.

In the event that the display position of the start side break character and the display position of the end side break character are not the same as a result thereof, the selecting unit 28 takes the text string in the range between the start side break character and end side break character as the instruction-estimated portion.

That is to say, the selecting unit 28 detects, from the text in the display range, the start side break character and end side break character as the first and last characters of the instruction-estimated portion, and selects the paragraph or phrase or the like, for example, of the range between the start side break character and end side break character, as the instruction-estimated portion.

Now, in the event that the display position of the start side break character and the display position of the end side break character agree and these are the same break character at the same position, basically the same processing as with the above-described second selection technique is continued.

That is to say, the selecting unit 28 sets the range between the start side base point character BP1 and BP3 and the first character in the text of the display range as start side search range SE3 and SE5, and sets the range between the end side base point character BP2 and BP4 and the last character in the text of the display range as end side search range SE4 and SE6.

Accordingly, the selecting unit 28 searches for a start side break character in the start side search range SE3 and SE5, and upon detecting the start side break character, ends the search for the start side break character, and searches for an end side break character in the end side search range SE4 and SE6.

Upon detecting the end side break character, the selecting unit 28 ends the search for the end side break character at the point of detection, and takes the text string in the range from the start side break character to the end side break character as the instruction-estimated portion.

That is to say, the selecting unit 28 detects, from the text in the display range, the start side break character and end side break character as the first and last characters of the instruction-estimated portion, and selects the paragraph or phrase or the like, for example, of the range between the start side break character and end side break character, as the instruction-estimated portion.

Now, in the event that the user has selected the third selection technique in settings beforehand, but no start side break character or end side break character can be found in the display range, the control unit 20 prompts selection and setting of whether or not to change the search range.

However, in the event of changing the search range being selected, the control unit 20 just automatically sets changing of the ends of the search range from the first character through last character in the display range to the first character through last character in the page.

Note that if both the start side break character and end side break character are not found in the display range, the control unit 20 applies change of the search range to the search of both the start and end characters of the instruction-estimated portion.

Also, if the end side break character is found in the display range, but the start side break character is not found, the control unit 20 applies change of the search range to just the search of the start character of the instruction-estimated portion.

Further, if the start side break character is found in the display range, but the end side break character is not found, the control unit 20 applies change of the search range to just the search of the end character of the instruction-estimated portion.

Accordingly, in the event that the start side break character is not found in the start side search range SE3 and SE5, the selecting unit 28 determines whether or not to change the search range in accordance with the settings made beforehand, and performs processing in the same way as with the second selection technique described above.

However, in the event of changing the start side search range SE3 and SE5, the selecting unit 28 does not perform processing such that the end of the start side search range SE3 and SE5 is changed and the search ranges SE1 and SE2 are reused.

Also, in the event that the end side break character is not found in the end side search range SE4 and SE6, the selecting unit 28 determines whether or not to change the search range in accordance with the settings made beforehand, and performs processing in the same way as with the second selection technique described above.

However, in the event of changing the end side search range SE4 and SE6, the selecting unit 28 does not perform processing such that the end of the end side search range SE4 and SE6 is changed and the search ranges SE1 and SE2 are reused.

Accordingly, the selecting unit 28 detects, from text in the display range or one page, a start side break character, first character in display range, or first character in page, as the first character in the instruction-estimated portion, as appropriate.

Also, the selecting unit 28 detects, from text in the display range or one page, an end side break character, last character in display range, or last character in page, as the last character in the instruction-estimated portion, as appropriate.

The selecting unit 28 then selects, from the text in the displayed range or one page, a paragraph or phrase or the like, from the range from the detected first character to last character, for example, as the instruction-estimated portion.

Thus, even in the event that the user has a tendency to be irregular in the way of instructing the desired portion of text, the selecting unit 28 can select a portion estimated to be instructed by the user from the display range or page of text in a fairly accurate manner.

Upon performing such selecting processing and selecting an instruction-estimated portion from the text in the displayed range or one page, the selecting unit 28 extracts a page number from the region-correlated text data.

The selecting unit 28 also extracts, from the region-correlated text data, the instruction-estimated portion (i.e., the multiple characters expressing the instruction-estimated portion), and the character position information correlating to the instruction-estimated portion (i.e., of the multiple characters expressing the instruction-estimated portion).

Further, the selecting unit 28 stores the page number, instruction-estimated portion, and text position information, and generates instruction-estimated portion data indicating the instruction-estimated portion. The selecting unit 28 then sends the instruction-estimated portion to an obtaining unit 29 along with the book attribute data.

Upon the instruction-estimated portion data and book attribute data is provided from the selecting unit 28, the obtaining unit 29 sends the instruction-estimated portion data to a natural language processing block 30, and requests the natural language processing block 30 to perform natural language processing of the instruction-estimated portion data.

Note that the obtaining unit 29 temporarily stores the book attribute data while requesting the natural language processing block 30 to analyze the instruction-estimated portion, until the analysis results are obtained.

Figures 16, 17:
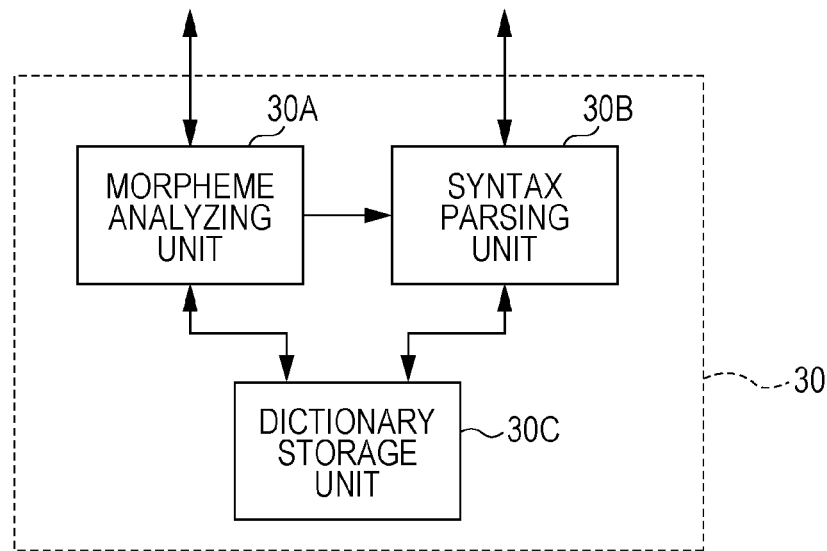
FIG. 16 is a block diagram illustrating the configuration of a natural language processing block.
FIG. 17 is a schematic drawing for describing identifying of a desired portion in an instruction-estimated portion.

As shown in FIG. 16, the natural language processing block 30 includes a morpheme analyzing unit 30A, a syntax parsing unit 30B, and a dictionary storage unit 30. The dictionary storage unit 30C stores beforehand morpheme dictionary data generated by correlating multiple morphemes of various types of word classes such as nouns, verbs, particles, adverbs, and so forth, with the readings of morphemes, the word classes, and so forth.

Note that a morpheme is the smallest unit of meaning in a language, and there are those which individually make up words, those which make up words by being combined with other morphemes, and those which do not make up words, either individually or by being combined with other morphemes.

Also, the dictionary storage unit 30C has stored therein beforehand meaning dictionary data which represents particular words of word classes such as nouns and verbs, and also hierarchically represents the meanings of the words in a superordinate concept.

Now, in the event that the particular word is a noun "spaghetti" or "angel hair" for example, the meaning of the word has two hierarchical superordinate concept meanings of "cooking: noodles".

Also, in the event that the particular word is a verb "eat" for example, the meaning of the word has two hierarchical superordinate concept meanings of "action: dining".

In the natural language processing block 30, the morpheme analyzing unit 30A acquires the instruction-estimated portion data provided from the obtaining unit 29, and reads out the morpheme dictionary data and meaning dictionary data from the dictionary storage unit 30C in accordance with the acquisition thereof.

The morpheme analyzing unit 30A performs morpheme analysis of the instruction-estimated portion (i.e., text string) based on the morpheme dictionary data. Accordingly, the morpheme analyzing unit 30A sections the instruction-estimated portion into multiple morphemes, and identifies the word classes of these multiple morphemes.

Also, based on the multiple morphemes and the word classes of these morphemes, and the meaning dictionary data, the morpheme analyzing unit 30A distinguishes one or multiple morphemes making up a particular word of a word class such as a noun or verb, from the multiple morphemes. Further, the morpheme analyzing unit 30A identifies the meaning of the words made up of the distinguished one or multiple morphemes.

The morpheme analyzing unit 30A then generates morpheme analysis result data indicating the analysis results of the instruction-estimated portion (word classes of multiple morphemes, and one or multiple morphemes making up words distinguished out of these multiple morphemes and meanings of the words made up of the one or multiple morphemes) Also, the morpheme analyzing unit 30A sends the morpheme analysis result data to the syntax parsing unit 30B along with the instruction-estimated portion data.

Upon being provided with the morpheme analysis result data and instruction-estimated portion data from the morpheme analyzing unit 30A, the syntax parsing unit 30B parses the syntax of the instruction-estimated portion based on the instruction-estimated portion data, based on the morpheme analysis result data.

Accordingly, from the instruction-estimated portion, the syntax parsing unit 30B identifies the grammatical role of the morphemes included in the instruction-estimated portion, and also identifies the modification and so forth among the morphemes.

The syntax parsing unit 30B then generates syntax parsing result data indicating the parsing results of the instruction-estimated portion (the grammatical role of the morphemes included in the instruction-estimated portion, and the modification and so forth among the morphemes).

Also, the syntax parsing unit 30B returns the syntax parsing result data and the morpheme analysis result data to the obtaining unit 29, as estimated portion analysis data indicating the natural language processing results of the instruction-estimated portion, along with the instruction-estimated portion data.

Upon being provided with the estimated portion analysis data and the instruction-estimated portion data from the natural language processing block 30, the obtaining unit 29 sends the estimated portion analysis data and the instruction-estimated portion data to an identifying unit 33 along with the book attribute data that had been temporarily held.

Upon being provided with the estimated portion analysis data, instruction-estimated portion data, and book attribute data from the obtaining unit 29, the identifying unit 33 performs identifying processing for identifying the desired portion which the user has selected in the instruction-estimated portion based on the instruction-estimated portion data, based on the estimated portion analysis data.

At this time, as shown in FIG. 17, the identifying unit 33 identifies a desired portion WA1 of a paragraph or phrase or the like in this instruction-estimated portion EA1, based on the morphemes and modification of words included in the instruction-estimated portion EA1.

In the event that the identifying unit 33 has identified a portion of the instruction-estimated portion EA1 as the desired portion WA1, the identifying unit 33 extracts the page number from the instruction-estimated portion data.

The identifying unit 33 also extracts, from the instruction-estimated portion data, the desired portion WA1 (i.e., the character code of the multiple characters expressing the desired portion WA1), and the character position information corresponding to the desired portion W1 (i.e., of the multiple characters expressing the desired portion WA1).

Further, the identifying unit 33 generates the desired portion WA1 and desired portion data indicating the desired portion A1 storing the character position information. The identifying unit 33 then sends the desired portion data to a registering unit 34 along with the book attribute data.

Additionally, at this time the identifying unit 33 extracts book identification information from the book attribute data, and also extracts, from the instruction-estimated portion data, the page number and character position information indicating the position of the first character in the desired portion WA1 (hereinafter also referred to as "first character position information").

Also, the identifying unit 33 extracts all information indicating the analyzing results of the morpheme analysis and syntax parsing of the desired portion WA1 from the estimated portion analysis results.

Further, the identifying unit 33 generates desired portion analysis result data indicating the analysis results of the desired portion WA1, storing the book identification information, page number and first character position information, and the morpheme analysis and syntax parsing of the desired portion WA1. The identifying unit 33 then sends the desired portion analysis result data to a detecting unit 35.

Now, in the event that the entire instruction-estimated portion EA1 has been determined to be the desired portion WA1, the identifying unit 33 takes the instruction-estimated portion data as desired portion data without change, and sends the desired portion data to the registering unit 34 along with the book attribute data.

Also, the identifying unit 33 extracts the book identification information from the book attribute data this time as well, and also extracts the page number and first character position information from the instruction-estimated portion data.

The identifying unit 33 then adds the book identification information, page number, and first character position information to the estimated portion analysis result data, to generate desired portion analysis result data indicating the analysis results of the desired portion WA1, and sends the generated desired portion analysis result data to the detecting unit 35.

Upon being provided with the desired portion analysis result data from the identifying unit 33, the detecting unit 35 performs keyword detection processing for detecting, in the desired portion WA1, keywords important for understanding the content of the desired portion WA1, based on the desired portion analysis result data.

Now, the detecting unit 35 holds contextual information, including a list of word classes for morphemes of certain word classes of particles (e.g., linguistic elements that lack a lexical definition) and adverbs which do not contribute to understanding of the sentence (hereinafter referred to as "word class list"), detected by learning beforehand using various types of sentences, for example.

Also, the detecting unit 35 holds the contextual information that includes a list of meanings for words having meanings which do not contribute to understanding of the sentence (hereinafter referred to as "meaning list"), detected by learning beforehand using various types of sentences, for example.

Accordingly, the detecting unit 35 excludes, from keyword candidates, morphemes of word classes registered in the word class list from the multiple morphemes included in the desired portion WA1, as not being important for understanding the contents of the desired portion WA1, based on the contextual information.

Also, the detecting unit 35 excludes, from keyword candidates, one or multiple morphemes making up words having meanings registered in the meaning list, as not being important for understanding the contents of the desired portion WA1.

Further, the detecting unit 35 determines, from the multiple morphemes of the desired portion WA1, morphemes which are not important for understanding the desired portion WA1 in light of the context of the desired portion WA1, based on the grammatical role and modifying relation of the multiple morphemes included in the desired portion WA1. The detecting unit 35 also excludes these determined morphemes from keyword candidates.

Thus, the detecting unit 35 detects words such as nouns and verbs made up of one or multiple morphemes, that have not been excluded from the multiple morphemes in the desired portion A1 but remained, as keywords important for understanding the contents of the desired portion WA1.

Now, upon detecting a keyword, the detecting unit 35 counts the detection results and obtains the number of instances of detection of each different keyword.

That is to say, in the event that a detected keyword differs from all other keywords detected at this time, the detecting unit 35 takes the number of instances of detection of the keyword to be one.

Also, in the event that the same keyword is detected twice or more, the detecting unit 35 collectively takes the number of instances of detection of this keyword as two or more.

Further, the detecting unit 35 weights the number of instances of each keyword as appropriate, based on the grammatical role of the keyword (i.e., a word made up of one or multiple morphemes) within the desired portion WA1. For example, in the event that a keyword is a principal term in a paragraph in the desired portion WA1, the detecting unit 35 performs weighting so as to increase the number of instances of detection by one.

Thus, the detecting unit 35 provides a weighted number of instances of detection to each keyword as appropriate, as a score indicating how important that keyword is to understanding the contents of the desired portion WA1.

Upon scoring the keywords, the detecting unit 35 extracts the detected keywords (i.e., words (multiple characters expressing words made up of one or multiple morphemes) detected as keywords) from the desired portion analysis result data so as to not be duplicate.

Also, the detecting unit 35 extracts text strings expressing the meaning of the keywords (hereinafter also referred to as "meaning words"), and also extracts the book identification information, page number, and first character position information.

Further, the detecting unit 35 generates keyword detection data indicating the keyword detection results, storing the keyword, meaning word, score, book identification information, page number, and first character position information, for each keyword. The detecting unit 35 then sends the keyword detection data to the registering unit 34 and a tag generating unit 36.

Upon being provided with the keyword detection data from the detecting unit 35, the tag generating unit 36 uses the meaning words representing the meaning of keywords to perform tag generating processing wherein words representing the contents of the desired portion WA1 (hereinafter also referred to as "tags") are automatically generated.

At this time, the tag generating unit 36 extracts the meaning words for each of the keywords from the keyword detection data, for example. Also, the tag generating unit 36 breaks down the meanings hierarchically representing the meanings of each of the keywords in a superordinate concept, into words each expressing one meaning.

However, the two meanings of the keyword are expressed in superordinate concept, so there will be cases wherein at least one meaning will be the same meaning of at least one meaning of another keyword.

Accordingly, the tag generating unit 36 breaks down the meaning words representing the two meanings of the keyword into two words, and in the event that two or more of the same word are obtained, the same words are consolidated so as to have no duplication.

The tag generating unit 36 also has a list of words (hereinafter also referred to as "word list") expressing certain meanings which do not readily express the contents of the sentence, detected by learning beforehand using various types of sentences, for example.

Accordingly, the tag generating unit 36 excludes from tag candidates the words expressing each of the meanings of the keywords which are the same as words registered in the word list, as being those which do not readily express the contents of the desired portion WA1.

Accordingly, the tag generating unit 36 takes the one of multiple words which have not been excluded from the words expressing each of the meanings of the keywords, as tags expressing the contents of the desired portion WA1.

Thus, the tag generating unit 36 extracts the score provided to the key word of the meaning which the tag represents, from the keyword detection data.

Also, the tag generating unit 36 counts the score given to one or multiple keywords of the meaning which the tag represents. The tag generating unit 36 then provides the score calculated for each tag to the tags as a score indicating how accurately the tag represents the contents of the predetermined portion WA1.

Note that for two words representing the two meanings of one keyword, the tag generating unit 36 takes the score for the one keyword as the score for each of the to words.

Upon generating tags in this way, and providing scores to the tags, the tag generating unit 36 extracts book identification information, page number, and first character position information, from the keyword detection data.

Also, the tag generating unit 36 generates tag generation data indicating the tag generating results, storing the generated tag and score, book identification information, page number, and first character position information, for each tag. The tag generating unit 36 then sends the tag generation data to the registering unit 34.

Now, a book registration database is configured in the storage unit 25 in which is registered the electronic book of which the desired portion has been selected, and that desired portion. A data table for actually registering electronic books, and a data table for registering the desired portion are generated in the book registration database in the storage unit 25.

Note that in the following description, the data table for registering electronic books will also be referred to as "book registration table", and the data table for registering desired portions will also be referred to as "desired portion registration table".

Also, a keyword registration database for registering keywords detected from the desired portion is also configured in the storage unit 25. A data table for actually registering keywords, and a data table for correlating the keywords with the desired portions where there were detected, are generated in the storage unit 25.

Note that in the following description, the data table for registering keywords will also be referred to as "keyword registration table", and the data table for correlating the keywords with the desired portions will also be referred to as "keyword correlation table".

Further, a tag registration database for registering tags generated from the desired portion is also configured in the storage unit 25. A data table for actually registering tags, and a data table for correlating the tags with the desired portions of which the tags indicate the contents, are generated in the storage unit 25.

Note that in the following description, the data table for registering tags will also be referred to as "tag registration table", and the data table for correlating the tags with the desired portions will also be referred to as "tag correlation table".

Now, as shown in FIG. 18, a book identification information registration column 37 for registering book identification information, and a book type registration column 38 for registering the type of electronic book, are provided in a book registration table DT1 within the book registration database, as information registration columns.

Also, a title registration column 39 for registering book titles, and a publisher name registration column 40 for registering the name of the publisher of the electronic book, are provided in the book registration table DT1, as information registration columns.

Accordingly, upon being provided with desired portion data and book attribute data from the identifying unit 33, the registering unit 34 extracts the book identification information from the book attribute data. The registering unit 34 determines whether or not the electronic book from which the desired portion at this time has been selected is already registered in the book registration table DT1 of the storage unit 25, based on the book identification information.

As a result, in the event of detecting that the electronic book from which the desired portion at this time has been selected is not registered in the book registration table DT1 in the storage unit 25 yet, the registering unit 34 sends the book attribute data to the storage unit 25 as book registration data.

Accordingly, the registering unit 34 stores the book identification information, book type, book title, and publisher name, stored in the book registration data, in the corresponding information registration columns in the book registration table DT1 in a mutually correlated manner.

Thus, the registering unit 34 stores the book registration data indicating the electronic book from which the desired portion at this time has been selected in the book registration table DT1 of the book registration database, thereby registering the electronic book from which the desired portion has been selected.

However, in the event of detecting that the electronic book from which the desired portion at this time has been selected has already been registered in the book registration table DT1 in the storage unit 25, the registering unit 34 does not register this electronic book in the book registration table DT1.

Upon detecting that the registration of the electronic book has been completed or has already been registered, the registering unit 34 then issues identification information by which the desired portion indicated by the desired portion data in an individually identifiable manner (hereinafter also referred to as "desired portion identification information").

Further, the registering unit 34 extracts the page number, the first character position information indicating the position of the first character of the desired portion, and the desired portion from the desired portion data, and also detects the number of characters of the desired portion based on the character position information stored in the desired portion data.

Further, the registering unit 34 extracts the book identification information from the book attribute data. Moreover, the registering unit 34 generates desired portion registration data for desired portion registration, storing the desired portion identification information, book identification information, page number, first character position information, number of characters, and desired portion (i.e., the multiple characters representing the desired portion). The registering unit 34 then sends the desired portion registration data to the storage unit 25.

Now, as shown in FIG. 19, a desired portion identification information registration column 41 for registering desired portion identification information, and a book identification information registration column 42 for registering book identification information, are provided as information registration columns in a desired portion registration table DT2 within the book registration database.

Also, a page number registration column 43 for registering the page number of a page where the desired portion exists, and a line number registration column 44 for registering the line number of the line where the first character of the desired portion is situated, are provided as information registration columns in the desired portion registration table DT2.

Further, a column number registration column 45 for registering the column number where the first character of the desired portion is situated, and a character number registration column 46 for registering the number of characters in the desired portion, are provided as information registration columns in the desired portion registration table DT2.

Further, desired portion registration column 47 for registering the desired portion itself as a text string is also provided as an information registration column in the desired portion registration table DT2.

Accordingly, the registering unit 34 stores the desired portion identification information, book identification information, page number, line number, column number, number of characters, and desired portion, which had been stored in the desired portion registration data, in the respective information registration columns of the desired portion registration table DT2 so as to be correlated with each other.

Thus, the registering unit 34 stores the desired portion registration data indicating the desired portion selected at this time in the desired portion registration table DT2 of the book registration database, thereby registering the desired portion.

On the other hand, upon keyword detection data being provided from the detecting unit 35, identification information capable of individually identifying the keyword stored in the keyword detection data (hereinafter also referred to as "keyword identification information") is issued.

Also, the registering unit 34 extracts the keyword (i.e., the multiple characters representing the keyword), the morpheme attribute information of the keyword, and the score of the keyword, from the keyword detection data.

Further, the registering unit 34 generates keyword registration data for keyword registration by storing the keyword identification information, keyword, morpheme attribute information, and score. The registering unit 34 then sends the keyword registration data to the storage unit 25.

Now, as shown in FIG. 20, a keyword identification information registration column 48 for registering keyword identification information is provided as an information registration column in a keyword registration table DT3 within the keyword registration database.

Also, a keyword registration column 49 for registering the keyword itself as a text string, and a word class registration column 50 for registering the word class of the keyword are provided as information registration columns in the keyword registration table DT3.

Further, a meaning registration column 51 for registering the meaning of the keyword (in reality, meaning words representing the meaning), and a keyword score registration column 52 for registering the score of the keyword are provided as information registration columns in the keyword registration table DT3.

Accordingly, the registering unit 34 stores the keyword identification information, keyword, word class, meaning word, and score, stored in the keyword registration data, in corresponding information registration columns of the keyword registration table DT3 so as to be correlated for each keyword.

Thus, the registering unit 34 registers keywords detected from the desired portion at this point by storing keyword registration data representing the keyword in the keyword registration table DT3 of the keyword registration database.

Also, upon being provided with tag generation data from the tag generating unit 36, the registering unit 34 issues identification information capable of individually identifying tags stored in the tag generation data (hereinafter also referred to as "tag identification information"). Further, the registering unit 34 extracts the tags (i.e., multiple characters representing the tags) from the tag generation data.

Moreover, the registering unit 34 generates tag registration data for registering tags by storing the tag identification information, the tag, and generation type information indicating that the tag has been automatically generated by the tag generating unit 36. The registering unit 34 then sends the tag registration data to the storage unit 25.

Now, as shown in FIG. 21, a tag identification information registration column 53 for registering tag identification information is provided as an information registration column in a tag registration table DT4 within the tag registration database.

Also, a generation type registration column 54 for registering generation type information, and a tag registration column 55 for registering the tag itself as a text string, are provided as an information registration columns in the tag registration table DT4.

Accordingly, the registering unit 34 stores the tag identification information, generation type information, and tags, stored in the tag registration data, in corresponding information registration columns of the tag registration table DT4 so as to be correlated for each tag.

Thus, the registering unit 34 registers tags by storing tag registration data indicating tags automatically generated to be added to the desired portion at this time in the tag registration table DT4 of the tag registration database.

Now, as for the tags to be added to the desired portion, there are also tags which the user can optionally select and add to the desired portion beforehand, such as "studies", "small tips", "memo", "presentation tips", and so forth, besides those automatically generated by the tag generating unit 36.

Accordingly, in the event that the user has selected a desired portion, or when an electronic book image in which a desired portion has been selected is displayed again, the control unit 20 generates tag generation data upon the desired portion and one or multiple tags to be added thereto are selected by the user by a predetermined operation. The control unit 20 then sends the tag generation data to the registering unit 34.

That is to say, at this time the control unit 20 extracts the book identification information, page number, first character position information indicating the position of the first character in the desired portion, from the book attribute data or text data of the electronic book in which the desired portion to add tags to has been selected.

Also, the control unit 20 automatically provides scores to the tags indicating pre-selected predetermined values at this time. The control unit 20 then generates tag generation data storing tags (i.e., one or multiple words representing a tag), the scores of the tags, book identification information, page number, and first character position information, and sends this to the registering unit 34.

In the event that the tag generation data is provided from the control unit 20, the registering unit 34 issues tag identification information capable of individually identifying tags stored in the tag generation data, in the same way as described above. The registering unit 34 also extracts the tags from the tag generation data.

Further, the registering unit 34 generates tag registration data storing the tag identification information, the tag, and generation type information indicating that the tag has been selected by the user and set so as to be added to the desired portion. The registering unit 34 then sends the tag registration data to the storage unit 25.

Accordingly, the registering unit 34 stores the tag identification information, generation type information, and tags, stored in the tag registration data, in the corresponding information registration columns in the tag registration table DT4 in a manner correlated with each tag.

Thus, the registering unit 34 registers tags by storing tag registration data indicating tags selected by the user to be added to the desired portion in the tag registration table DT4 of the tag registration database.

Now, when registering a keyword in the keyword registration table DT3, the registering unit 34 extracts book identification information, page number, and first character position information from the keyword detection data.

Also, the registering unit 34 stores the book identification information, page information, and first character position information along with the keyword identification information of the keyword registered at this time, and generates keyword correlation request data requesting correlation between the keyword and the desired portion. The registering unit 34 then sends the keyword correlation request data to the correlating unit 60.

Upon the keyword correlation request data being provided from the registering unit 34, a correlating unit 60 extracts the book identification information, page number, and first character position information from the keyword correlation request data.

The correlating unit 60 also searches the desired portion registration table DT2 in the storage unit 25 for the desired portion identification information of the desired portion corresponding to the keyword registered by the registering unit 34 at this time, based on the book identification information, page number, and first character position information.

Further, the correlating unit 60 extracts the keyword identification information from the keyword correlation request data, and generates keyword correlation data for keyword correlation storing the keyword identification information and searched desired portion identification information together. The correlating unit 60 then sends the keyword correlation data to the storage unit 25.

Figure 22:
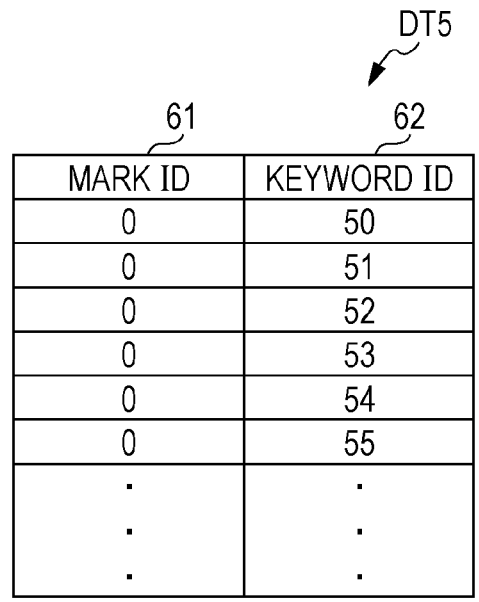
FIG. 22 is a schematic drawing illustrating the configuration of a keyword correlation table.

Now, as shown in FIG. 22, a desired portion identification information registration column 61 for registering the desired portion identification information is provided as an information registration column in a keyword correlation table DT5 within the keyword registration database.

Also, a keyword identification information registration column 62 for registering the keyword identification information is provided as an information registration column in the keyword correlation table DT5.

Accordingly, the correlating unit 60 stores the desired portion identification information and keyword identification information stored in the keyword correlation data in the corresponding information registration columns in the keyword correlation table DT5 in a manner correlated with each keyword.

Thus, the correlating unit 60 registers the desired portion and keywords detected from the desired portion in a correlated manner, using the keyword correlation table DT5 of the keyword registration database.

Also, when the tag is registered to the tag registration table DT4, the registering unit 34 extracts the book identification information, page number, and first character position information, from the tag generation data. The registering unit 34 also extracts the score for each tag from the tag generation data.

Further, the registering unit 34 stores the book identification information, page information, first character position information, and score for each tag, extracted from the tag generation data, along with the tag identification information for each tag issued at this time, and generates tag correlation request data requesting correlation between the tag and the desired portion. The registering unit 34 then sends the tag correlation request data to the correlating unit 60.

Upon being provided with tag correlation request from the registering unit 34, the correlating unit 60 extracts the book identification information, page number, and first character position information from the tag correlation request.

Also, based on the book identification information, page number, and first character position information, the correlating unit 60 searches the desired portion registration table DT2 in the storage unit 25 for the desired portion identification information of the desired portion corresponding to the tags registered by the registering unit 34 at this time.

Further, the correlating unit 60 extracts the tag identification information and scores from the tag correlation request data, and generates tag correlation data for correlating the tags, storing the tag identification information and scores along with the searched desired portion identification information. The correlating unit 60 then sends the tag correlation data to the storage unit 25.

Figure 23:
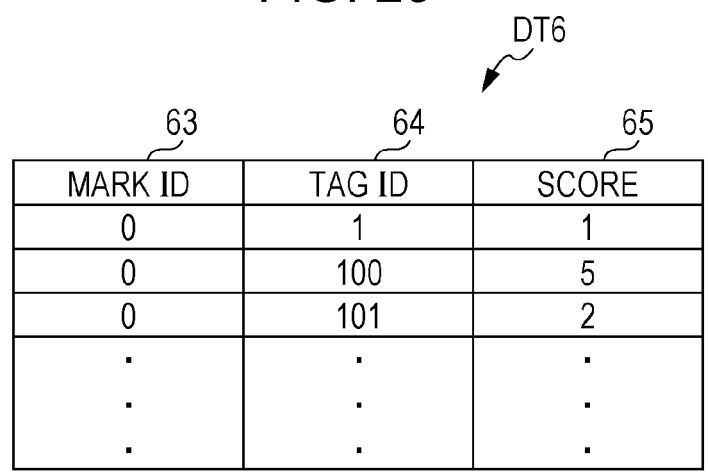
FIG. 23 is a schematic drawing illustrating the configuration of a tag correlation table.

Now, as shown in FIG. 23, a desired portion identification information registration column 63 for registering the desired portion identification information, and a tag identification information registration column 64 for registering tag identification information are provided as information registration columns in a tag correlation table DT6 within the tag registration database.

Also, a tag score registration column 65 for registering tag scores is provided as an information registration column in the tag correlation table DT6.

Accordingly, the correlating unit 60 stores the desired portion identification information, tag identification information, and scores, stored in the tag correlation data, in the corresponding information registration columns in the tag correlation table DT6 in a manner correlated with each tag.

Thus, the correlating unit 60 registers the desired portion and tags to be added to the desired portion (i.e., the automatically generated tags and user-selected tags) in a correlated manner, using the tag correlation table DT6 of the tag registration database.

Now, upon correlation between the desired portion and tags being completed for example, the correlating unit 60 stores the desired portion identification information used for the correlation, and generates desired portion search request data requesting a search of the desired portion. The correlating unit 60 then sends the desired portion search request data to a searching unit 66.

Upon being provided with the desired portion search request data from the correlating unit 60, the searching unit 66 extracts the desired portion identification information from the desired portion search request data. The searching unit 66 also searches and reads out from the storage unit 25 the line No, column number, and number of characters, correlated with the desired portion identification information, within the book registration table DT1.

Now, the line No, column number, and number of characters, correlated with the desired portion identification information, is information indicating the position within the text of the desired portion identified by the desired portion identification information.

Further, the searching unit 66 generates desired portion notification data which stores the desired portion position information indicating the position of the desired portion within the text (i.e., the line No, column number, and number of characters) along with the desired portion identification information, so as to notify the desired portion. The searching unit 66 then sends the desired portion notification data to the control unit 20.

Upon being provided with the desired portion notification data from the searching unit 66, the control unit 20 extracts the desired portion position information and desired portion identification information from the desired portion notification data.

Also, the control unit 20 generates highlighted display control data which is controlled to store the desired portion position information and desired portion identification information and perform highlighted display of the desired portion, and sends the generated highlighted display control data to the display control unit 26.

Upon receiving the highlighted display control data from the control unit 20, the display control unit 26 modifies the electronic book image data which had been generated at this time for display, based on the highlighted display control data, and sends this to the display unit 21.

Accordingly, as shown in FIG. 24, the display control unit 26 can perform highlighted display of the desired portion in the electronic book image 27 displayed on the display unit 21, instructed based on the highlighted display control data, so as to be viewed by the user.

Thus, each time the user selects a desired portion on the electronic book image 27, the control unit 20 controls the circuit units to execute the above-described series of processing.

Accordingly, the control unit 20 can identify the selected desired portion and register various types of information relating to the desired portion in various types of databases within the storage unit 25, and also show the desired portion in the electronic book image 27 with highlighted display.

Now, upon performing highlighted display of the desired portion in the electronic book image 27 displayed on the display unit 21, the display control unit 26 ends display of the electronic book image 27, and maintains the highlighted display until switching over the electronic book image displayed on the display unit 21.

Accordingly, as shown in FIG. 25, each time that desired portions are sequentially selected on a electronic book image 27 while the one electronic book image 27 is being displayed on the display unit 21, the display control unit 26 newly performs new highlighted display of the additionally selected desired portions while maintaining the highlighted display that has been made so far.

Accordingly, while the electronic book image 27 is being displayed on the display unit 21, the control unit 20 can allow the user to select desired portions within the electronic book image 27 and perform highlighted display, with the same sort of sensation as marking desired portions one after another on a page in a paper book using a marker.

Also, at the time of switching over the electronic book image 27 to be displayed on the display unit 21, or when displaying a newly-selected electronic book, the control unit 20 extracts the book identification information from the book attribute data.

Further, the control unit 20 also extracts the page number for the one page of text data to be displayed at this time. The control unit 20 generates desired portion search request data storing the book identification information and page number so as to request a search for the desired portion, and sends this to the searching unit 66.

At this time, upon being provided with the desired portion search request data from the control unit 20, the searching unit 66 extracts the desired portion identification information and page number from the desired portion search request data.

Also, the searching unit 66 searches within the book registration table DT1 of the storage unit 25 for desired portion position information corresponding to the desired portion identification information and page number, based on the desired portion identification information and page number In the event that there is no desired portion position information found corresponding to the desired portion identification information and page number registered in the book registration table DT1 of the storage unit 25 as a result, the searching unit 66 notifies the control unit 20 to that effect.

At this time, the control unit 20 detects that no desired portion whatsoever has been selected within the text of the electronic book image to be displayed at this time, in accordance with the notification from the searching unit 66. In light of the detection results, the control unit 20 does not perform control of the display control unit 26 so as to perform highlighted display of desired portions at this time.

On the other hand, in the event of finding desired portion position information correlated with the desired portion identification information and page number registered in the book registration table DT1 of the storage unit 25, the searching unit 66 reads out the desired portion position information from the storage unit 25.

The searching unit 66 then generates desired portion notification data storing the desired portion position information along with the desired portion identification information, so as to notify the desired portion, and sends the generated desired portion notification data to the control unit 20.

At this time, upon receiving the desired portion notification data from the searching unit 66 in the same way as described above, the control unit 20 generates highlighted display control data based on the desired portion notification data, and sends this to the display control unit 26.

Accordingly, the display control unit 26 modifies the electronic book image data based on the highlighted display control data provided from the control unit 20 and sends this to the display unit 21, such that the one or multiple desired portions are displayed highlighted in the electronic book image 27 displayed on the display unit 21.

Thus, in the event that a desired portion has already been selected in the electronic book image 27 to be newly displayed on the display unit 21, at the time of switching over the electronic book image 27 to be displayed on the display unit 21 or when displaying a newly-selected electronic book, the control unit 20 can performed highlighted display of the desired portion.

Also, the control unit 20 has multiple types of techniques for performing highlighted display of the desired portion, so that the user can optionally select and set the type of highlighted display.

Accordingly, in the event that the display unit 21 can handle color display, the control unit 20 can perform highlighted display of the desired portion by overlaying a desired color of a desired shape on the desired portion, as shown in FIGS. 24 and 25.

Also, in the event that the display unit 21 can handle color display, the control unit 20 can perform highlighted display of the desired portion by underlining the desired portion with desired color and line types (straight line, undulating lines, etc.)

Further, in the event that the display unit 21 can handle color display, the control unit 20 can perform highlighted display of the desired portion by encircling the desired portion with a frame of a desired color and shape (formed of straight lines or curved lines).

Moreover, in the event that the display unit 21 can handle color display, the control unit 20 can perform highlighted display of the desired portion by displaying the characters of the desired portion with a desired color that differs from the color of characters in other portions.

Further, in the event that the display unit 21 can handle color display, the control unit 20 can perform highlighted display of the desired portion by displaying marks of desired color and shapes (circles, stars, squares, etc.) above or below the individual characters in the desired portion, or by the first and last characters, or the like.

Moreover, in the event that the display unit 21 can handle color display, the control unit 20 can perform highlighted display of the desired portion by cyclically changing at least one of the character color, font, size, style, or the like, of the desired portion.

Also, in the event that the display unit 21 can handle black-and-white display, the control unit 20 can perform highlighted display of the desired portion by underlining the desired portion with desired line types (straight line, undulating lines, etc.)

Further, in the event that the display unit 21 can handle black-and-white display, the control unit 20 can perform highlighted display of the desired portion by encircling the desired portion with a frame of a desired shape (formed of straight lines or curved lines).

Further, in the event that the display unit 21 can handle black-and-white display, the control unit 20 can perform highlighted display of the desired portion by displaying marks of desired shapes (circles, stars, squares, etc.) above or below the individual characters in the desired portion, or by the first and last characters, or the like.

Moreover, in the event that the display unit 21 can handle black-and-white display, the control unit 20 can perform highlighted display of the desired portion by cyclically changing at least one of the character font, size, style, or the like, of the desired portion.

Further, in the event that the display unit 21 can handle both color display and black-and-white display, the control unit 20 can perform highlighted display of the desired portion by changing at least one of the character font, size, style, or the like, of the desired portion, so as to be different from other characters.

Now, after correlation of keywords and the desired portion has been completed, and the correlation of tags generated based on the keywords with the desired portion also having been completed, the correlating unit 60 generates related information search request data requesting search of related information of the desired portion.

At this time, the correlating unit 60 generates the related information search request data storing the keyword identification information and desired portion identification information used for correlating the keywords with the desired portion. The correlating unit 60 then sends the related information search request data to the searching unit 66.

Upon being provided with the related information search request data from the correlating unit 60, the searching unit 66 extracts the keyword identification information from the related information search request data. The searching unit 66 also searches and reads out the keyword registration table DT3 in the storage unit 25 for a keyword identified by that keyword identification information.

Further, the searching unit 66 generates search commissioning data storing the keyword as a search key along with upper limit instruction information instructing the upper limit of search hits that has been set beforehand, to commission an unshown searching device on the network 13 to search for related information regarding the desired portion.

The searching unit 66 then sends the search commissioning data to the transmission unit 23. The transmission unit 23 accordingly transmits the search commissioning data provided from the searching unit 66 to the searching device via the network 13.

At this time, the searching device receives the search commissioning data transmitted from the information display terminal 11, and extracts the keyword from the search commissioning data that has been received. The searching device then uses the keyword as a search key to search related information related to the desired portion (having text including the search key) from various types of information which can be browsed on the network 13, such as Web pages and the like posted on the network 13 for example, within the specified maximum number of search hits.

Incidentally, related information searched by the searching device is information commonly disclosed on the network 13 as described above. Accordingly, in the following description, the related information searched by the searching device will also be referred to as "disclosed related information".

Further, the searching device generates search result data storing the title of disclosed related information (hereinafter also referred to as "related information title"), and a network address for accessing that disclosed related information, for each searched disclosed related information, in a correlated manner. The searching device then returns the search result data to the information display terminal 11 via the network 13.

The reception unit 24 accordingly receives the search result data returned from the searching device at this time, and sends the received search result data to the searching unit 66.

Upon being provided with the search result data from the reception unit 24, the searching unit 66 extracts the related information title and network address for each disclosed related information searched by the searching device from the search result data.

Also, the searching unit 66 extracts the desired portion identification information from the related information search request data. Further, the searching unit 66 searches the tag correlation table DT6 and reads out tag identification information correlated with the desired portion identification information from the storage unit 25.

Further, the searching unit 66 generates related information registration data for storing the related information title and network address for each disclosed related information searched by the searching device, along with the found tag identification information, and registering the disclosed related information. The searching unit 66 then sends the related information registration data to the correlating unit 60.

Now, the storage unit 25 has a related information registration database configured beforehand. Within the related information registration database is generated a data table for correlating tags of the desired portion with the related information of the desired portion (hereinafter referred to as "information correlation table").

Accordingly, the correlating unit 60 sends the related information registration data provided from the searching unit 66 to the storage unit 25. The correlating unit 60 thus stores the related information title and network address for each disclosed related information stored in the related information registration data in the information correlation table so as to be correlated with the tag identification information in the storage unit 25.

Thus, the correlating unit 60 uses the information correlation table of the related information registration database to register the disclosed related information relating to the desired portion in a manner correlated with the tags of the desired portion.

Also, upon generating related information registration data indicating the disclosed related information as described above and sending this to the correlating unit 60, the searching unit 66 then searches electronic books already stored in the storage unit 25 as related information relating to the desired portion. Note that in the following description, electronic books serving as related information relating to the desired portion will also be referred to as "related electronic books".

At this time, the searching unit 66 detects whether or not the same keyword as this keyword has also been registered otherwise in the keyword registration table DT3 in the storage unit 25, based on the keyword which has been read out from the storage unit 25.

Incidentally, the keyword which the searching unit 66 had read out from the storage unit 25 has been detected from the desired portion by the detecting unit 35 and newly registered to the keyword registration table DT3 by the registering unit 34 at this time. Accordingly, in the following description, the keyword which the searching unit 66 has read out from the storage unit 25 will also be referred to as "newly registered keyword" as appropriate.

As a result, in the event of finding a keyword the same as the newly registered keyword in the keywords already registered within the keyword registration table DT3, the searching unit 66 reads out the keyword identification information of the keyword that has been found from the storage unit 25.

Note that in the following description, a keyword the same as the newly registered keyword found in the keywords already registered by searching for the newly registered keyword will also be referred to as "same keyword" as appropriate. Also, in the following description, keyword identification information of the same keyword will also be referred to as "registered keyword identification information" as appropriate.

Also, the searching unit 66 searches the keyword correlation table DT5 for desired portion identification information correlated with the registered keyword identification information (hereinafter also referred to as "registered desired portion identification information" as appropriate) and reads this out from the storage unit 25.

Moreover, the searching unit 66 searches the desired portion registration table DT2 for book identification information correlated with the registered desired portion identification information (hereinafter also referred to as "searched book identification information" as appropriate) and reads this out from the storage unit 25.

In addition to this, based on the desired portion identification information extracted from the related information search request data at this time, the searching unit 66 searches the desired portion registration table DT2 for the book identification information correlated to the desired portion identification information as well, and reads this out from the storage unit 25.

Note that the desired portion identification information which the searching unit 66 had extracted from the related information search request data has been newly registered in the desired portion registration table DT2 by the registering unit 34 at this time. Accordingly, in the following description, the desired portion identification information which the searching unit 66 has extracted from the related information search request data will also be referred to as "newly registered desired portion identification information" as appropriate.

Also, the book identification information correlated to the newly registered desired portion identification information is book identification information of an electronic book from which a desired portion identified by the newly registered desired portion identification information has been selected (hereinafter also referred to as "in-display electronic book" as appropriate), from the text displayed at this time. Accordingly, in the following description, the book identification information correlated with the newly registered desired portion identification information will also be referred to as "in-display book identification information" as appropriate.

The searching unit 66 then compares these searched book identification information read out from the storage unit 25 with the in-display book identification information. Accordingly, based on the comparison results thereof, the searching unit 66 determines whether or not another electronic book, which differs from the in-display electronic book and also includes a same keyword which is the same as a newly registered keyword in the text thereof, has been found as searched book identification information.

That is to say, the searching unit 66 determines whether or not a related electronic book which differs from the in-display electronic book but is related to the desired portion from which the newly registered keyword has been detected at this time by including a same keyword which is the same as the newly registered keyword in the text thereof.

When searching related electronic books at this time, the searching unit 66 reads out from the storage unit 25 the page number and desired portion position information correlated with the registered desired portion identification information used for searching for the searched book identification information of the related electronic book within the desired portion registration table DT2.

Also, the searching unit 66 also reads out the book title correlated with the searched book identification information in the book registration table DT1 from the storage unit 25, based on the searched book identification information of the related electronic book.

Further, the searching unit 66 searches the tag correlation table DT6 for the tag identification information correlated with the registered desired portion identification information, based on the registered desired portion identification information used for searching the searched book identification information of the related electronic book, and reads this out from the storage unit 25.

Then searching unit 66 then generates related information registration data indicating the related electronic book, in which is stored the book title, tag identification information, searched book identification information, page number, and desired portion position information read out from the storage unit 25, and sends the generated related information registration data to the correlating unit 60.

Thus, the searching unit 66 searches the electronic books stored in the storage unit 25 for related electronic books related to the desired portion from which a newly registered keyword of the in-display electronic book has been detected.

At this time, the correlating unit 60 sends the related information registration data provided from the searching unit 66 to the storage unit 25. Accordingly, the correlating unit 60 stores the tag identification information, and book title, searched book identification information, page number, and desired portion position information for each related electronic book stored in the related information registration data, in a correlated manner in the information correlation table in the storage unit 25.

Thus, the correlating unit 60 uses the information correlation table in the related information registration database to register related electronic books related to the desired portion selected at this time, in a manner correlated with the tag of the desired portion.

Further, in the event that a tag optionally added to the desired portion is selected by the user along with the desired portion, the control unit 20 can allow optional comments (hereinafter also referred to as "related comments") to be input as related information relating to the desired portion.

Accordingly, in the event that a tag has been optionally selected by the user along with the desired portion, and a related comment is input by predetermined operations by the user, the control unit 20 generates tag generation data that also stores this related comment. The control unit 20 sends this tag generation data to the correlating unit 60.

At this time, the registering unit 34 generates tag registration data based on the tag generation data in the same way as described above and sends this to the storage unit 25, thereby registering in the tag registration table DT4 tags selected by the users to be added to the desired portion.

Also, in the event that a related comment has been input by the user, the registering unit 34 extracts the book identification information, page number, first character position information, score for each tag, and the comment, from the tag generation data.

Further, the registering unit 34 generates tag correlation request data storing the book identification information, page number, first character position information, score for each tag, and the related comment, extracted from the tag generation data, along with tag identification information for each tag issued at this time. The registering unit 34 then sends the tag correlation request data to the correlating unit 60.

Upon being provided with the tag correlation request data from the registering unit 34, based on the tag correlation request data as described above, the correlating unit 60 uses the tag correlation table DT6 to correlate the desired portion and the tags added to the desired portion.

Also, at this time, the correlating unit 60 extracts the related comment for each tag from the tag correlation request data. Further, the correlating unit 60 generates related information registration data indicating the related comment by storing the related comment for each tag along with the tag identification information extracted from the tag correlation request data at this time.

The correlating unit 60 then sends the related information registration data to the storage unit 25. Accordingly, the correlating unit 60 stores the related comment for each tag stored in the related information registration data in the information correlation table, and the tag identification information, in the storage unit 25 in a correlated manner.

Thus, the correlating unit 60 uses the information correlation table of the related information registration database to register related comments related to the desired portion selected at this time to tags in the desired portion in a correlated manner.

Now, upon related information related to the desired portion being correlated with tags in the desired portion, the control unit 20 can display the related information in response to a tapping operation, for example, on the electronic book image displayed on the display unit 21.

In actual practice, the control unit 20 instructs the display control unit 26 to perform highlighted display of the desired portion based on the desired portion notification data as described above. Accordingly, the display control unit 26 performs highlighted display of the desired portion on the electronic book image being displayed on the display unit 21, in response to the highlighted display instructions.

It should be noted, however, that while the display control unit 26 is performing highlighted display of the desired portion on the electronic book image 27 being displayed on the display unit 21, the display control unit 26 generates desired portion display region information for the display region of the desired portion, indicated by coordinates of pixel positions on the display face of the display unit 21.

The display control unit 26 then sends the desired portion display region information of the desired portion to the control unit 20 along with the desired portion identification information of the desired portion.

The control unit 20 holds the desired portion display region information of the desired portion and the desired portion identification information that have been provided from the display control unit 26 in a correlated manner, while highlighted display of the desired portion is being performed.

In the event that the face of the touch panel is subjected to a tapping operation while the desired portion is being displayed highlighted on the electronic book image 27 being displayed on the display unit 21, the control unit 20 compares the touch position of the tapping operation with the display region of the desired portion which the desired portion display region information indicates.

In the event that detection is made that a tapping operation has been performed inside the display region of the desired portion as a result, the control unit 20 determines that the desired portion has been instructed by the tapping operation.

At this time, the control unit 20 detects the desired portion identification information correlated with the desired portion display region information, based on the desired portion display region information indicating the display region subjected to the tapping operation.

Also, the control unit 20 generates tag request data storing the desired portion identification information detected in accordance to the tapping operation (i.e., desired portion identification information of the instructed desired portion), to request tags of the desired portion. The control unit 20 then sends the tag request data to the searching unit 66.

Upon being provided with the tag request data from the control unit 20, the searching unit 66 extracts the desired portion identification information from the tag request data. Also, the searching unit 66 searches the tag correlation table DT6 for tag identification information and score correlated with the desired portion identification information, and reads this out from the storage unit 25.

Further, the searching unit 66 reads out from the storage unit 25 the tags correlated with the tag identification information in the tag registration table DT4, based on the tag identification information read out from the storage unit 25.

The searching unit 66 then generates tag providing data storing, for each tag, the tag, score, tag identification information, and desired portion identification information extracted from the tag request data, and returns the generated tag providing data to the control unit 20.

Upon being provided with the tag providing data from the searching unit 66, the control unit 20 extracts the desired portion identification information from the tag providing data, and the tag, score, and tag identification information for each tag.

Also, the control unit 20 identifies the desired portion display region information indicating the display region of the desired portion identified by the desired portion identification information (i.e., the desired portion instructed at this time), based on the desired portion identification information.

The control unit 20 then generates tag display control data which stores the tag added to the instructed desired portion and the tag identification information thereof along with the desired portion display region information indicating the display region of the desired portion, and which effects control so that tags are displayed in a manner correlated with the instructed desired portion.

Now, in the event that just one tag has been added to the instructed desired portion, the control unit 20 generates tag display control data storing the one tag along with the tag identification information and desired portion display region information.

However, in the event that multiple tags have been added to the desired portion, the user has been given the option of selecting and setting how to display the tags beforehand, such as for example, displaying all tags, displaying tags equal to or higher than a predetermined score that has been set beforehand, displaying the one tag with the highest score, and so forth.

Accordingly, in the event that multiple tags have been added to the instructed desired portion, the control unit 20 selects tags to display in accordance with the settings made beforehand. The control unit 20 then generates the tag display control data storing the selected tags along with the tag identification information and desired portion display region information.

Upon thus generating tag display control data, the control unit 20 sends the generated tag display control data to the display control unit 26.

Upon receiving the tag display control data from the control unit 20, the display control unit 26 modifies the electronic book image data generated for display at this time so as to additionally display the tags, based on the tag display control data, and sends this to the display unit 21.

Accordingly, as shown in FIG. 26, the display control unit 26 displays a tag TG added to the desired portion instructed by the user at this time on the electronic book image 27 displayed on the display unit 21, in a manner correlated with this desired portion.

Thus, the control unit 20 can display the tag TG representing the content of the desired portion to the user, along with the desired portion (i.e., the desired portion with highlighted display) by way of the electronic book image 27 displayed on the display unit 21.

While the display control unit 26 is displaying the tag TG on the electronic book image 27 being displayed on the display unit 21, the display control unit 26 generates tag display region information for the display region of the tag TG being displayed, indicated by coordinates of pixel positions on the display face of the display unit 21. The display control unit 26 then sends the tag display region information of the tag TG to the control unit 20 along with the tag identification information of the tag TG.

Also, the control unit 20 holds the tag display region information in a manner correlated with the tag identification information of the tag TG provided from the display control unit 26 while the tag TG is being displayed.

Accordingly, in the event that a tapping operation is made on the face of the touch panel when the tag TG is being displayed on the electronic book image 27 displayed on the display unit 21, the control unit 20 compares the touch position of the tapping operation with the display region of the tag TG which the tag display region information indicates.

In the event that detection is made that within the display region of the tag TG has been subjected to a tapping operation as a result thereof, the control unit 20 determines that the tag TG has been instructed by the tapping operation.

At this time, the control unit 20 detects the tag identification information correlated with the tag display region information, based on the tag display region information indicating the display region that has been subjected to the tapping operation.

Also, the control unit 20 generates related information request data storing the tag identification information detected in accordance with the tapping operation (i.e., tag identification information of the instructed tag TG), requesting related information. The control unit 20 then sends the related information request data to the searching unit 66.

Upon being provided with the related information request data from the control unit 20, the searching unit 66 extracts the tag identification information from the related information request data. At this time, in the event that disclosed related information has been correlated with the instructed tag TG, the searching unit 66 searches the information correlation table for the related information title and network address for each disclosed related information correlated with the tag identification information, and reads this out from the storage unit 25.

Also, in the event that a related electronic book is correlated with the instructed tag TG, the searching unit 66 searches the information correlation table for the book title of each related electronic book correlated with the tag identification information, the book identification information, page number and desired portion position information, and reads this out from the storage unit 25.

Further, in the event that a related comment is correlated with the instructed tag TG, the searching unit 66 searches the related comment correlated to the tag identification information within the information correlation table and reads this out from the storage unit 25.

Further, the searching unit 66 generates related information providing data storing the tag identification information used for searching, the related information title and network address for each disclosed related information, book title for each related electronic book, book identification information, page number, desired portion position information, and related comment. The searching unit 66 then returns the related information providing data to the control unit 20.

At this time, the control unit 20 extracts, from the related information providing data, the tag identification information, and also along therewith, related information title and network address for each disclosed related information, book title for each related electronic book, book identification information, page number, desired portion position information, and related comment.

Also, the control unit 20 identifies tag display region information indicating the display region of the tag TG identified by the tag identification information (i.e., the tag TG instructed at this time), based on the tag identification information.

The control unit 20 then generates related information display control data which stores the related information title and book title, related comment, and identified tag display region information, and effects control so as to display the related information title, book title, and related comment in correlation to the tag TG. The control unit 20 then sends the related information display control data to the display control unit 26.

Upon being provided with the related information display control data from the control unit 20, the display control unit 26 modifies the electronic book image data which had been generated for display at this time such that the related information is additionally displayed, based on the related information display control data, and sends this to the display unit 21.

Accordingly, as shown in FIG. 27, the display control unit 26 displays the related information title for each disclosed related information, book title for each related electronic book, and related comments, in a manner correlated with the tag TG instructed by the user, on the electronic book image 27 being displayed on the display unit 21.

Thus, the control unit 20 can notify the user of tags TG representing the content of the desired portion and various types of related information related to the desired portion, along with the desired portion (i.e., the desired portion displayed highlighted), by way of the electronic book image 27 displayed on the display unit 21.

That is to say, in the event of highlighted display of a desired portion in the electronic book image 27 being displayed on the display unit 21, in the event that there is disclosed related information related to the desired portion, the control unit 20 can make notification of the existence of the disclosed related information by the related information title on the electronic book image 27.

Also, in the event of highlighted display of a desired portion in the electronic book image 27 being displayed on the display unit 21, in the event that there is a related electronic book related to the desired portion, the control unit 20 can make notification of what sort of related electronic books exist by the book title on the electronic book image 27.

Further, in the event of highlighted display of a desired portion in the electronic book image 27 being displayed on the display unit 21, in the event that there is a related comment related to the desired portion, the control unit 20 can display the related comment on the electronic book image 27.

While the display control unit 26 is performing display of the related information title for each disclosed related information on the electronic book image 27 being displayed, the display control unit 26 generates title display region information for the display region of the related information title for each related information title, indicated by coordinates of pixel positions on the display face of the display unit 21. The display control unit 26 then sends the title display region information to the control unit 20 along with the corresponding related information title.

Also, while the display control unit 26 is performing display of the book title for each related electronic book on the electronic book image 27 being displayed, the display control unit 26 also generates title display region information for the display region of the book title for each book title, indicated by coordinates of pixel positions on the display face of the display unit 21. The display control unit 26 then sends the title display region information to the control unit 20 along with the corresponding book title.

While displaying the related information title, the control unit 20 identifies the network address corresponding to the related information title, based on the related information title and related information providing data given from the display control unit 26 along with the title display region information.

Also, while displaying the related information title, the control unit 20 holds the title display region information of the related information title provided from the display control unit 26 in a manner correlated with the network address identified by the related information title.

Also, while displaying the book title, the control unit 20 identifies the book identification information corresponding to the book title, and page number and desired portion position information, based on the book title and related information providing data provided from the display control unit 26 along with the title display region information.

Also, while displaying the book title, the control unit 20 holds the title display region information of the book title provided from the display control unit 26 in a manner correlated with the book identification information identified by the book title, page number, and desired portion position information.

Accordingly, upon a tapping operations being made on the face of the touch panel when displaying the related information title or book title on the electronic book image 27 displayed on the display unit 21, the control unit 20 compares the touch position by the tapping operation with the display region which the title display region information indicates, as well.

In the event that determination is made as a result thereof that within the display region of the related information title has been subjected to a tapping operation, the control unit 20 determines that the related information title has been instructed by the tapping operation.

At this time, the control unit 20 detects the network address correlated to the title display region information, based on the title display region information indicating the display region where the tapping operation has been made.

The control unit 20 generates information request data requesting the disclosed related information of the instructed related information title, and sends the generated information request data to the transmission unit 23 along with the detected network address.

The transmission unit 23 follows the network address provided from the control unit 20 and transmits the information request data provided from the control unit 20 to an unshown information providing device which has disclosed the disclosed related information of the related information title instructed at this time, via the network 13.

Upon the disclosed related information being transmitted from the information providing device as a result, in response to reception of the information request data, the reception unit 24 receives the disclosed related information and sends this to the control unit 20 via the network 13.

Upon the disclosed related information being provided from the reception unit 24, the control unit 20 sends the disclosed related information to the display control unit 26. Upon being provided with this disclosed related information from the control unit 20, the display control unit 26 sends the disclosed related information to the display unit 21 instead of the electronic book image data which had been generated at this time.

Thus, the display control unit 26 displays the disclosed related information on the display unit 21 instead of the electronic book image which had been displayed so far. Thus, in the event of a related information title being instructed on the electronic book image displayed on the display unit 21, the control unit 20 can show the user display of disclosed related information related to the desired portion within the electronic book image instead of that electronic book image.

Incidentally, in the event that a predetermined operation is performed by the user with the disclosed related information displayed on the display unit 21, the control unit 20 accordingly controls the display control unit 26 so as to display the electronic book image which had been displayed on the display unit 21 prior to switching the display, instead of the disclosed related information.

In the event that detection is made that within the display region of the book title has been subjected to a tapping operation as the result of comparing the touching position of the tapping operation and the display region which the title display region information indicates, the control unit 20 determines that the book title has been instructed by the tapping operation.

At this time, the control unit 20 detects the book identification information correlated with the title display region information, page number, and desired portion position information, based on the title display region information indicating the display region which has been subjected to the tapping operation.

The control unit 20 then reads out from the storage unit 25 the electronic book data of the related electronic book of the book title instructed at this time, based on the detected book identification information. Also, the control unit 20 sends the electronic book data to the display control unit 26 along with the page number and desired portion position information detected at this time.

That is to say, the control unit 20 sends the electronic book data of the related electronic book to the display control unit 26, along with the page of the text including the desired portion where a same keyword was detected, and the page number and desired portion position information indicating the position of the desired portion within that text.

Now, in the following description, one page of text including the desired portion where the same keyword was detected in the related electronic book will also be referred to as "related page", and the desired portion where the same keyword was detected will also be referred to as "related desired portion".

Upon being provided with the page number and desired portion position information along with the electronic book data from the control unit 20, the display control unit 26 generates electronic book image data of the page instructed by that page number based on the electronic book data.

Also, the display control unit 26 modifies the electronic book image data so as to perform highlighted display of the desired portion instructed by the desired portion position information, and sends this to the display unit 21.

Accordingly, the display control unit 26 displays at least the portion of the related page of the related electronic book which includes the related desired portion as the related electronic book image, instead of the electronic book image which had been displayed so far, on the display unit 21.

Also, at this time, the display control unit 26 performs highlighted display of the related desired portion in the related electronic book image displayed on the display unit 21. Note that in the event that another desired portion besides the related desired portion exists in the related electronic book image, at this time the display control unit 26 also displays the other desired portion in a highlighted manner, but the highlighted display of the related desired portion is made to be different in the display state as to the other desired portion.

Thus, upon a book title corresponding to the desired portion being instructed on the electronic book image being displayed on the display unit 21, the control unit 20 can display, instead of that electronic book image, a related electronic book image including the related desired portion of the related electronic book related to the desired portion.

At this time, the control unit 20 performs highlighted display of the related desired portion in the related electronic book image related to the desired portion in the electronic book image, whereby the related desired portion actually related to the content of the desired portion in the related electronic book image can be confirmed.

Incidentally, in the event that a predetermined operation is performed by the user with the related electronic book image displayed on the display unit 21, the control unit 20 controls the display control unit 26 in this case as well so as to display again the electronic book image which had been displayed prior to switching the display, instead of the related electronic book image, on the display unit 21.

Now, in the event that within the display region of the desired portion of the electronic book image 27 displayed on the display unit 21 as described above is subjected to a tapping operation of one tap, the control unit 20 accordingly controls the display control unit 26 to display the tag TG corresponding to the desired portion.

Accordingly, in the event that there are multiple desired portions selected in the electronic book image 27 displayed on the display unit 21, the tags TG for each desired portion can be displayed at the same time, with tags TG corresponding to each of these multiple desired portions.

Also, in the event that within the display region of the tag TG in the electronic book image 27 displayed on the display unit 21 as described above is subjected to a tapping operation of one tap, the control unit 20 accordingly controls the display control unit 26 to display the related information title or book title or the like, in accordance with the tag TG.

Accordingly, in the event that there are multiple desired portions selected in the electronic book image 27 displayed on the display unit 21, the related information titles or the like for each tag TG can be displayed at the same time with the related information titles or the like corresponding to each tag TG of the multiple desired portions.

Also, with a tag TG displayed on the electronic book image 27, for example, in the event of the tag TG being instructed by a tapping operation of two continuous taps, the control unit 20 accordingly controls the display control unit 26. Thus, the control unit 20 erases the tag TG instructed by the tapping operation of two taps from the electronic book image 27 at this time.

Also, with a tag TG and a related information title or the like corresponding to the tag TG are displayed on the electronic book image 27, for example, in the event of the tag TG being instructed by a tapping operation of two continuous taps, the control unit 20 accordingly controls the display control unit 26.

Thus, the control unit 20 erases the tag TG instructed by the tapping operation of two taps in batch fashion, and the related information title or the like corresponding to the tag TG, from the electronic book image 27 at this time.

Further, with multiple tags TG displayed on the electronic book image 27, in the event that a display region other than the tags TG is subjected to a tapping operation of two continuous taps, for example, the control unit 20 accordingly controls the display control unit 26. Thus, the control unit 20 erases all tags TG from the electronic book image 27 at this time in batch fashion.

Further, with multiple tags TG and related information titles or the like corresponding to each of the multiple tags TG are displayed on the electronic book image 27, in the event that a display region other than the tags TG or related information title or the like is subjected to a tapping operation of two continuous taps, for example, the control unit 20 controls the display control unit 26. Thus, the control unit 20 erases all tags TG and all of the related information titles or the like from the electronic book image 27 at this time in batch fashion.

In this way, the control unit 20 can display tags TG and related information titles and the like on the electronic book image 27, but can erase these individually or collectively with a simple operation.

Accordingly, the control unit 20 can easily avoid tags TG and related information titles and the like getting in the way of reading the text in the electronic book image 27 or when viewing photograph images or illustration images.

2-2-2. Index Generating Processing

Next, index generating processing for generating an index of an individual user for an electronic book will be described. With a electronic book image 27 displayed on the display unit 21 in accordance with a request for electronic book display as described above, the control unit 20 can hierarchically generate an index of an individual user for an electronic book in accordance with selection of desired portions by the user.

In actual practice, in the event that an electronic book regarding which an index is to be generated is selected by a key operation or tapping operation for example, and generating of an index is requested, the control unit 20 executes the index generating processing. At this time, the control unit 20 reads out the electronic book data of the selected electronic book from the storage unit 25 and sends this to the display control unit 26.

Also, based on the electronic book data, the display control unit 26 generates electronic book image data for one page. The display control unit 26 then sends at least a portion of the electronic book image data to the display unit 21 as image data which can be displayed, in accordance to the size and resolution of the display face of the display unit 21, for example.

Accordingly, in the same way as described above with reference to FIG. 4, the display control unit 26 displays at least part of the electronic book image made up of the one page of text based on the electronic book image data, on the entire display face of the display unit 21.

In the event that the desired portion is instructed by the user performing a sliding operation on the electronic book image in this state, the control unit 20 sends to the selecting unit 28 the determination result of the type of the sliding operation as described above, and touch position information indicating all touch positions detected during that sliding operation.

Also, the control unit 20 generates region-correlated text data in this case as well, and sends the generated region-correlated text data to the selecting unit 28 along with the book attribute data.

The selecting unit 28 performs selecting processing in the same way as described above, and selects an instruction-estimated portion from the text of the display range or the text of one page. The selecting unit 28 then generates instruction-estimated portion data indicating the instruction-estimated portion, and sends the generated instruction-estimated portion data to the obtaining unit 29 along with the book attribute data.

Now, at this time, the control unit 20 extracts book identification information from the book attribute data of the electronic book selected as the object of generating an index, in accordance with the instruction of the desired portion.

Also, the control unit 20 adds the book identification information to text data for all pages of the electronic book which is the object of generating an index. The control unit 20 then sends the text data for all pages to which the book identification information has been added (hereinafter referred to as "all text data") to the obtaining unit 29.

Upon being provided with the all text data from the control unit 20, the obtaining unit 29 sends the all text data to the natural language processing block 30, and requests the natural language processing block 30 to perform natural language processing of the all text data.

Accordingly, in the natural language processing block 30, the morpheme analyzing unit 30A performs morpheme analysis of the text of all pages based on the all text data (hereinafter referred to as "full text of book"), in the same way as described above, and generates morpheme analysis result data indicates the analysis results. The morpheme analyzing unit 30A then sends the morpheme analysis result data to the syntax parsing unit 30B along with the all text data.

Also, the syntax parsing unit 30B performs syntax parsing of the full text of the book based on the all text data, in the same way as described above, based on the morpheme analysis result data, and generates syntax parsing result data indicating the parsing results.

The syntax parsing unit 30B then returns the morpheme analysis result data and syntax parsing result data as full text analysis result data indicating the processing results of the natural language processing as to the full text of the book, to the obtaining unit 29, along with the full text data.

Upon being provided with the full text analysis result data and all text data from the natural language processing block 30, the obtaining unit 29 temporarily holds these and sends to the searching unit 66.

Upon being provided with the instruction-estimated portion data and book attribute data from the selecting unit 28, the obtaining unit 29 identifies information indicating the analysis results of morpheme analysis and syntax parsing in the instruction-estimated portion from the full text analysis data which had been temporarily held, based on the instruction-estimated portion data.

Also, the obtaining unit 29 clips the information indicating the analysis results of morpheme analysis and syntax parsing in the instruction-estimated portion that has been identified, from the full text analysis result data, as estimated portion analysis result data. Accordingly, the obtaining unit 29 sends the estimated portion analysis result data to the identifying unit 33 along with the instruction-estimated portion data and book attribute data.

Accordingly, in the same way as described above, the identifying unit 33 identifies the desired portion selected by the user in the estimated portion based on the instruction-estimated portion data provided from the obtaining unit 29, based on the estimated portion analysis result data provided from the obtaining unit 29.

The identifying unit 33 generates desired portion data indicating the identified desired portion based on the instruction-estimated portion data, and sends the generated desired portion data to the registering unit 34 along with the book attribute data.

Also, the identifying unit 33 generates desired portion analysis result data indicating the analysis results of the desired portion based on the book attribute data and estimated portion analysis result data, and sends the generated desired portion analysis result data to the detecting unit 35.

Here, upon being provided with the desired portion data and book attributed data from the identifying unit 33 at this time, the registering unit 34 registers the electronic book from which the desired portion was selected at this time, in the book registration table DT1 within the book registration database in the storage unit 25 in the same way as described above as appropriate.

Additionally, at this time, the registering unit 34 registers the desired portion selected from the electronic book at this time in the desired portion registration table DT2 within the book registration database in the storage unit 25 in the same way as described above.

Upon this registration ending, the registering unit 34 adds the desired portion identification information issued for the desired portion, and the book identification information and book title of the electronic book from which the desired portion was selected, to the desired portion, so as to generate registered desired portion data indicating the desired portion registered at this time. The registering unit 34 then sends the registered desired portion data to an index generating unit 67.

On the other hand, upon being provided with the desired portion analysis result data from the identifying unit 33, the detecting unit 35 detects important words for understanding the content of the desired portion, from the desired portion, with the same sort of technique as used in the keyword detection processing described above, based on the desired portion analysis result data.

Also, upon detecting important words for understanding the content of the desired portion, from the desired portion, the detecting unit 35 also detects the meanings of the words that have been detected (hereinafter also refereed to as "detected words").

The detecting unit 35 then extracts detected words (multiple characters representing words made up of one or multiple morphemes) from the desired portion analysis result data such that there is no duplication, and also extracts meaning words representing the meanings of the detected words such that there is no duplication.

Now, the detecting unit 35 extracts, from the desired portion analysis result data, the book identification information, page Nos. of pages where desired portions exist within the full text of the book, and the first character position information indicating the position of the first character in the desired portion.

The detecting unit 35 then generates identification information search request data requesting a search for the desired portion identification information of the desired portion, storing the book identification information, page Nos., and the first character position information, and sends the generated identification information search request data to the searching unit 66.

Accordingly, at this time the searching unit 66 searches for the desired portion identification information regarding which the search has been requested and reads this out from the storage unit 25, based on the identification information search request data provided from the detecting unit 35.

The searching unit 66 then generates identification information notification data for making notification of the searched desired portion identification information, storing the found desired portion identification information along with the book identification information within the identification information search request data, page Nos., and the first character position information, and returns this to the detecting unit 35.

Accordingly, upon being provided with the identification information notification data from the searching unit 66 at this time, the detecting unit 35 confirms whether or not the desired portion identification information regarding which the search was requested has been obtained, based on the book identification information, page Nos., and first character position information, stored in the identification information notification data.

As a result, in the event that the desired portion identification information regarding which the search was requested is stored in the identification information notification data, the detecting unit 35 extracts this desired portion identification information from the identification information notification data.

Also at this time, the detecting unit 35 generates word detection data indicating the detection results of the detected words, storing each detected word extracted from the desired portion analysis result data such that there is no duplication, along with the desired portion identification information. The detecting unit 35 then sends the word detection data to the searching unit 66.

Also, at this time, the detecting unit 35 generates meaning word detection data indicating the detection results of meaning words, storing the meaning words along the desired portion identification information, for each meaning word extracted from the desired portion analysis result data such that there is no duplication. The detecting unit 35 then sends the meaning word detection data to the searching unit 66.

Upon being provided with the full text analysis data and all text data from the obtaining unit 29, the searching unit 66 temporarily holds these. Also, upon being provided with word detection data from the detecting unit 35, the searching unit 66 extracts the detected words and desired portion identification information from the word detection data.

Based on the detected words, the searching unit 66 searches the full text of the book based on the all text data for all words having the same configuration as the detected words (i.e., configured of the same character string), based on the detected words, and detects the position of the found words in the full text of the book.

At this time, the searching unit 66 also searches for the detected words themselves detected from the desired portion by the detecting unit 35, and detects the position within the full text of the book. Note that in the following description, a word having the same configuration as a detected word will be also referred to as "same-configuration word". Also, in the following description, the position of the same-configuration word in the full text of the book will be also referred to as "same-configuration word position".

In actual practice, the searching unit 66 detects the same-configuration word position for a same-configuration word within the full text of the book, in the form of the page number of the page where the same-configuration word exists, the first character position information (line number and row number), and number of characters of the same-configuration word.

Also, upon being provided with meaning word data from the detecting unit 35, the searching unit 66 extracts the meaning word and desired portion identification information from the meaning word detection data.

Further, the searching unit 66 searches the full text of the book for words having the same meaning as the detected word though the configuration is different from the detected word, based on that meaning word and meaning words corresponding to various words obtained based on the full text analysis data.

That is to say, the searching unit 66 searches for all words which are correlated with meaning words matching the meaning words representing the meaning of the detected word (i.e., having the same meaning as the detected word) from the full text of the book, except for same-configuration words. The searching unit 66 then detects the position of the found words in the full text of the book.

Note that in the following description, words which have a different configuration from a detected word but have the same meaning as the detected word will also be referred to as "same-meaning word". Also, in the following description, the position of a same-meaning word in the full text of the book will also be referred to as "same-meaning word position".

In actual practice, the searching unit 66 detects the page Nos. of pages where the same-meaning words exist, the first character position information (i.e., line number and column number) indicating the position of the first character in the same-meaning word, and the number of characters in the same-meaning word, for the same-meaning word positions of the same-meaning words within the full text of the book.

Thus, the searching unit 66 searches for same-meaning words from the full text of the book based on each detected word detected by the detecting unit 35 based on the desired portion such that there is no duplication, and detects the same-meaning word position for the same-meaning word.

Also, the searching unit 66 searches for same-meaning words from the full text of the book based on each meaning word detected by the detecting unit 35 based on the desired portion such that there is no duplication, and detects the same-meaning word position for the same-meaning word.

The searching unit 66 then generates same-configuration word search data indicating the search results for same-configuration words, storing for each detected word, the detected word, same-configuration word position information indicating the same-configuration word position of a same-configuration word found with that detected word, and the desired portion identification information.

Also, the searching unit 66 generates same-meaning word search data indicating the search results for same-meaning words, storing for each meaning word, the meaning word, and same-meaning word position information indicating the same-meaning word position of the same-meaning word found with that meaning word.

The searching unit 66 then sends the same-configuration word search data and same-meaning word search data generated for each detected word to the index generating unit 67.

Thus, the control unit 20 causes the selecting unit 28, the obtaining unit 29, the identifying unit 33, the detecting unit 35, the registering unit 34, and the searching unit 66 to perform the same processing each time a desired portion is instructed on the electronic book image displayed on the display unit 21.

Each time registered desired portion data is provided from the registering unit 34 while performing index generating processing, the index generating unit 67 temporarily holds the registered desired portion data.

Also, each time same-configuration word search data and same-meaning word search data for each detected word is provided from the searching unit 66 while performing index generating processing, the index generating unit 67 temporarily holds the same-configuration word search data and same-meaning word search data for the detected word, as well.

Upon detecting that selection of the desired portion from the electronic book regarding which an index is to be created has ended, in accordance with predetermined operations from the user, the control unit 20 notifies the index generating unit 67 to that effect.

Upon being notified of ending of selection of the desired portion from the control unit 20, the index generating unit 67 accordingly extracts the desired portion, desired portion identification information, and book identification information and book title, from each registered desired portion data which had been temporarily held up to that point.

The index generating unit 67 then generates a desired portion list arraying and showing the desired portions in the order in which they appear in the book, from beginning of the full text of the book to the end, along with the corresponding desired portion identification information.

Also, the index generating unit 67 adds the book identification information and book title to the desired portion list, thereby generating an index indicating an electronic book regarding which the index is being generated, and desired portions selected from the electronic book as a first hierarchical level index serving as the highest hierarchical level in an index of a hierarchical structure.

Additionally, the index generating unit 67 extracts the desired portion identification information from the same-configuration word search data and same-meaning word search data which have been temporarily held so far.

Also, the index generating unit 67 classifies the same-configuration word search data and same-meaning word search data based on the desired portion identification information, for each desired portion.

The index generating unit 67 then extracts detected words and meaning words from the same-configuration word search data and same-meaning word search data collected with one desired portion for example, and issues identification information whereby these detected words and meaning words can each be individually identified.

Note that in the following description, identification information whereby detected words can each be individually identified will also be referred to as "detected word identification information", and identification information whereby meaning words can each be individually identified will also be referred to as "meaning word identification information".

Also, the index generating unit 67 generates a detected word list arraying and showing the detected words detected from the desired portion along with the corresponding detected word identification information, and also arrays and shows after the detected words meaning words detected based on the desired portion along with the corresponding meaning word identification information.

The index generating unit 67 then adds desired portion identification information to the detected word list and correlates the detected word list with the corresponding desired portion in the first hierarchical level index, using the desired portion identification information.

Thus, the index generating unit 67 generates an index indicating detected words detected from the desired portion, meaning words detected based on the desired portion, and the desired portion, as a second hierarchical level index one hierarchical level below the first hierarchical level index.

Incidentally, at this time the index generating unit 67 generates a second hierarchical level index of the same configuration, correlating the relevant desired portions for each desired portion in the first hierarchical level index, by performing processing the same as described above.

Following this, the index generating unit 67 extracts, from same-configuration word search data for one desired portion for example, the same-configuration word position information for each same-configuration word from one same-configuration word search data.

The index generating unit 67 also generates a same-configuration word position list indicating the same-configuration word position information arrayed in order from the same-configuration word position at the front side of the full text of the book to the same-configuration word position at the end side.

Further, the index generating unit 67 adds the detected words used for detecting the same-configuration words and the detected word identification information of the detected words, to the same-configuration word position list, and correlates the same-configuration word position list with the corresponding detected words within the second hierarchical level index.

Accordingly, the index generating unit 67 generates a third hierarchical level index one hierarchical level below the second hierarchical level index of the hierarchical-structure indexes of an index indicating the detected words from a desired portion, and the same-configuration word positions of the same-configuration words searched with the detected words within the full text of the book.

Note that at this time, the index generating unit 67 generates a third hierarchical level index of the same configuration, correlated with each detected word, for each detected word in the second hierarchical level index, by performing the processing the same as described above.

Also, of the same-meaning word search data for one desired portion for example, the index generating unit 67 extracts same-meaning word information for each same-meaning word from one same-meaning word data.

Further, the index generating unit 67 generates a same-meaning word position list indicating the same-meaning word position information, arraying in order from the same-meaning word position at the front side of the full text of the book to the same-meaning word position and the end side.

Moreover, the index generating unit 67 adds the meaning words used for searching for the same-meaning words and the meaning word identification information of the meaning words, to the same-meaning word position list, and uses the meaning word identification information to correlate the same-meaning word list with the corresponding meaning words within the second hierarchical level index.

Accordingly, the index generating unit 67 also generates a third hierarchical level index one hierarchical level below the second hierarchical level index of the hierarchical-structure indexes, of an index indicating the meaning words detected from a desired portion, and the same-meaning word positions of the same-meaning words searched with the meaning words within the full text of the book.

Note that at this time, the index generating unit 67 generates a third hierarchical level index of the same configuration, correlated with each meaning word, for each meaning word in the second hierarchical level index, by performing the processing the same as described above.

Thus, upon generating the first through third hierarchical level indexes, the index generating unit 67 sends the generated first through third hierarchical level indexes to the storage unit 25 as first through third hierarchical level index data.

Accordingly, the index generating unit 67 stores the first through third hierarchical level indexes in the storage unit 25.

Also, once generating and storage of the first through third hierarchical level indexes is completed, the index generating unit 67 notifies the control unit 20 to that effect. Accordingly, the control unit 20 ends the index generating processing performed in conjunction with each of the circuit portions, and subsequently enables the first through third hierarchical level indexes to be used.

Upon the user performing a predetermined operation, for example, to select an electronic book regarding which an index for the individual user has been generated, request display of the index, the control unit 20 generates first hierarchical level index request data which requests the first hierarchical level index, storing book identification information of that electronic book. The control unit 20 then sends the first hierarchical level index request data to the searching unit 66.

Upon being provided with the first hierarchical level index request data from the control unit 20, the searching unit 66 reads out the first hierarchical level index data including the book identification information from the storage unit 25, based on the book identification information stored in the first hierarchical level index request data, and returns this to the control unit 20.

Upon the first hierarchical level index data being provided from the searching unit 66, the control unit 20 extracts the book title and desired portion list from the first hierarchical level data.

Also, the control unit 20 generates first hierarchical level index image data based on the book title and desired portion list. The control unit 20 then sends the first hierarchical level index image data to the display control unit 26.

Upon being provided with the first hierarchical level index image data from the control unit 20, the display control unit 26 sends the first hierarchical level index image data to the display unit 21. This, the display control unit 26 displays on the display unit 21 a first hierarchical level index image 70 such as shown in FIG. 28, based on the first hierarchical level index image data.

At this time, on the first hierarchical level index image 70, the book title is displayed at the upper side of the image for example, and underneath the book title 71, multiple desired portions are displayed arrayed in the image vertical direction in the same order as in the desired portion list.

Accordingly, using this first hierarchical level index image 70, the control unit 20 can notify and enable confirmation of the desired portions already selected in the electronic book that has been selected for display.

Now, at this time, the display control unit 26 generates desired portion display region information indicating the display region of the desired portions in the first hierarchical level index image 70 displayed on the display unit 21, by pixel position coordinates on the display face of the display unit 21.

The display control unit 26 the sends the desired portion display region information of the desired portions to the control unit 20 along with the desired portion identification information of the desired portions.

The control unit 20 holds the desired portion display region information and desired portion identification information provided from the display control unit 26 in a correlated manner while the first hierarchical level index image 70 is being displayed.

Upon a tapping operation being made on the face of the touch panel while the first hierarchical level index image 70 is being displayed, the control unit 20 compares the touch position of the tapping operation with the display region of the desired portions which the desired portion display region information indicates.

As a result, upon detecting that a tapping operation has been made within the display region of a desired portion, the control unit 20 determines that the desired portion has been instructed by the tapping operation.

At this time, the control unit 20 detects the desired portion identification information correlated with this desired portion display region information, based on the desired portion display region information indicating the display region that has been subjected to the tapping operation.

Also, the control unit 20 generates second hierarchical level index request data requesting second hierarchical level index data, storing the desired portion identification information detected in accordance with the tapping operation (i.e., the desired portion identification information of the instructed desired portion). The control unit 20 then sends the second hierarchical level index request data to the searching unit 66.

Upon being provided with the second hierarchical level index request data from the control unit 20, the searching unit 66 reads out the second hierarchical level index data including the desired portion identification information from the storage unit 25, based on the desired portion identification information stored in the second hierarchical level index request data, and returns this to the control unit 20.

Upon being provided with the second hierarchical level index data from the searching unit 66, the control unit 20 extracts the detected word list from the second hierarchical level index data. Also, the control unit 20 generates second hierarchical level index image data based on the detected word list. The control unit 20 then sends the second hierarchical level index image data to the display control unit 26.

Upon being provided with the second hierarchical level index image data from the control unit 20, the display control unit 26 sends the second hierarchical level index image data to the display unit 21. Accordingly, the display control unit 26 displays a second hierarchical level index image 71 such as shown in FIG. 29 on the display unit 21, based on the second hierarchical level index image data.

At this time, the second hierarchical level index image 71 has displayed arrayed, for example, one or multiple detected words detected from the corresponding desired portion, and the meaning words detected based on this desired portion, in the vertical direction in the screen following the order in the detected word list.

Accordingly, the control unit 20 can notify and enable confirmation of the detected words detected based on the desired portion instructed at this time, and the meanings of the detected words, with this second hierarchical level index image 71.

Now, at this time the display control unit 26 generates word display region information indicating the display region of detected words on the second hierarchical level index image 71 being displayed on the display unit 21, in coordinates of the pixel positions on the display face of the display unit 21. The display control unit 26 sends the word display region information of the detected words to the control unit 20 along with the detected word identification information of the detected words.

Also, at this time, the display control unit 26 also generates meaning word display region information indicating the display region of meaning words on the second hierarchical level index image 71 being displayed on the display unit 21, in coordinates of the pixel positions on the display face of the display unit 21. The display control unit 26 sends the meaning word display region information of the meaning words to the control unit 20 along with the meaning word identification information of the meaning words.

Also, the control unit 20 holds the word display region information of the detected words and the detected word identification information provided from the display control unit 26 in a correlated manner, while the second hierarchical level index image 71 is being displayed.

Also, the control unit 20 holds the meaning word display region information of the meaning words and the meaning word identification information provided from the display control unit 26 in a correlated manner, while the second hierarchical level index image 71 is being displayed.

Upon a tapping operation being made on the face of the touch panel while the second hierarchical level index image 71 is being displayed, the control unit 20 compares the touch position of the tapping operation with the display region of the detected word which the word display region information indicates. Also at this time, the control unit 20 compares the touch position of the tapping operation with the meaning word display region which the meaning word display region information indicates.

As a result, upon detecting that a tapping operation has been made within the display region of a detected word for example, the control unit 20 determines that the detected word has been instructed by the tapping operation.

At this time, the control unit 20 detects the detected word identification information correlated with this word display region information, based on the word display region information indicating the display region that has been subjected to the tapping operation.

Also, the control unit 20 generates third hierarchical level index request data requesting third hierarchical level index data, storing the detected word identification information detected in accordance with the tapping operation (i.e., the detected word identification information of the instructed detected word), and the desired portion identification information obtained based on the second hierarchical level index data. The control unit 20 then sends the third hierarchical level index request data to the searching unit 66.

Upon being provided with the third hierarchical level index request data from the control unit 20, the searching unit 66 reads out the third hierarchical level index data including the detected word identification information and desired portion identification information from the storage unit 25, based on the detected word identification information and desired portion identification information stored in the third hierarchical level index request data, and returns this to the control unit 20.

Upon being provided with the third hierarchical level index data from the searching unit 66, the control unit 20 extracts the detected words and same-configuration word position list from the third hierarchical level index data.

The control unit 20 also generates third hierarchical level index image data based on the detected words and same-configuration word position list. The control unit 20 then sends the third hierarchical level index image data to the display control unit 26.

Upon being provided with the third hierarchical level index image data from the control unit 20, the display control unit 26 sends the third hierarchical level index image data to the display unit 21. Accordingly, the display control unit 26 displays a third hierarchical level index image 72 such as shown in FIG. 30 on the display unit 21, based on the third hierarchical level index image data.

At this time, the third hierarchical level index image 73 has displayed arrayed, for example, the detected word instructed by the user at this time to the upper side of the image, for example. Also, displayed below the detected word in the third hierarchical level index image 73 are, for example, page Nos. indicating the same-configuration word positions of the same-configuration words searched with the detected word in the full text of the book, and the first character position information, in the vertical image direction following the order in the same-configuration word position list.

Accordingly, the control unit 20 can notify and enable confirmation of the same-configuration word positions of the same-configuration words within the electronic book search with the detected word that has been instructed at this time, with this third hierarchical level index image 72.

Also, at this time, the display control unit 26 also generates position display region information indicating the display region of page Nos. and first character position information indicating the same-configuration word position of the same-configuration words in the third hierarchical level index image 72 being displayed on the display unit 21, in coordinates of the pixel positions on the display face of the display unit 21.

The display control unit 26 sends the position display region information of the same-configuration words to the control unit 20 along with the same-configuration word position information of the same-configuration words.

Also, the control unit 20 holds the position display region information of the same-configuration words and the same-configuration word position information provided from the display control unit 26 in a correlated manner, while the third hierarchical level index image 72 is being displayed.

Upon a tapping operation being made on the face of the touch panel while the third hierarchical level index image 72 is being displayed, the control unit 20 compares the touch position of the tapping operation with the display region of the same-configuration word position information of the same-configuration words which the position display region information indicates.

As a result, upon detecting that a tapping operation has been made within the display region of the same-configuration word position of a same-configuration word for example, the control unit 20 determines that the same-configuration word position of the same-configuration word has been instructed for display by the tapping operation.

At this time, the control unit 20 reads out the electronic book data of the electronic book which has been selected as the object of display from the storage unit 25, and sends this to the display control unit 26.

Also, at this time, the control unit 20 generates highlighted display control data to effect control so as to perform highlighted display of the same-configuration word based on the same-configuration word position information of the same-configuration word at the same-configuration word position regarding which display has been instructed, and sends the generated highlighted display control data to the display control unit 26 as well.

Upon being provided with the electronic book data and highlighted display control data from the control unit 20, the display control unit 26 generates electronic book image data of a page including the same-configuration word position of the same-configuration word instructed at this time, based on the electronic book data.

Also, the display control unit 26 modifies the electronic book image data based on the highlighted display control data and sends this to the display unit 21. The display control unit 26 thus displays the electronic book image on the display unit 21 based on the electronic book image data, such that the same-configuration words at the instructed same-configuration word positions will be in the display range, and also performs highlighted display of the same-configuration words.

Thus, the control unit 20 can display the electronic book image in a manner as if it were jumping to electronic book images including the portions related to desired portions selected by the user beforehand in the electronic book, based on the index of the individual user.

Now, in the event that a meaning word is instructed on the second hierarchical level image 71 as well, the control unit 20 displays a third hierarchical level index image corresponding to the meaning word.

Also, upon a same-meaning word position of the same-configuration word being instructed on the third hierarchical level index image, the control unit 20 displays an electronic book image of the page where that same-meaning word is situated, and also performs highlighted display of the same-meaning word included in the text of the electronic book image.

Accordingly, upon display of an electronic book being requested, the first through third hierarchical level index images 70 through 72 can be displayed in shown, as if it were showing the index on the first page of a paper novel.

Also, if an index of an individual user has been generated for the electronic book, the probability that this electronic book has been read at least once at the time of generating the index is high, so the control unit 20 can allow the user to jump to desired pages using the first through third hierarchical level index images 70 through 72 and start reading.

Further, by enabling the user to jump to desired pages of the electronic book using the first through third hierarchical level index images 70 through 72, the control unit 20 can allow the user to use that function to easily search for places of paragraphs and phrases and the like related to a desired portion throughout the full text of the electronic book. Note that in the following description, places of paragraphs and phrases and the like related to a desired portion will also be referred to as "related places".

Moreover, in the event of displaying an electronic book image of an electronic book regarding which an index of the individual user has been generated, the control unit 20 performs highlighted display of desired portions selected in the text of the electronic book image, in the same way as described above.

Accordingly, the control unit 20 can handle easily cases of displaying an electronic book image regarding which an index of the individual user has been generated, and upon the user reading to a desired portion, for example, requesting to read a related place relating to the desired portion in the electronic book.

Now, a related place including a same-configuration word in the electronic book is expressed including the same-configuration word having the same configuration as the detected word detected from the desired portion.

Accordingly, a related place including a same-configuration word in the electronic book can be though to have high relation with the desired portion used for searching for this same-configuration word.

On the other hand, a related place including a same-meaning word in the electronic book is expressed including the same-meaning word of which the configuration differs from the detected word, though having the same meaning as the meaning of the detected word that has been detected from the desired portion.

Accordingly, a related place including a same-meaning word in the electronic book is considered to have weaker relation as to the desired portion used for detection of the same-meaning word, as compared to the relation between the desired portion and the related portion including a same-configuration word detected based on the desired portion.

Accordingly, in the event of performing highlighted display of a same-configuration word or a same-meaning word, the control unit 20 performs highlighted display such that the same-configuration word and the same-meaning word are displayed in different states.

Accordingly, the control unit 20 can notify that the degree of relationship between the desired portion and the related place including the same-configuration word differs from the degree of relationship between the desired portion and the related place including the same-meaning word.

Also, not only does the control unit 20 perform highlighted display such that the same-configuration word and the same-meaning word are displayed highlighted in different states, but also displays the same-configuration word and same-meaning word in a different state from the desired portion.

Accordingly, in the event of performing highlighted display of same-configuration words and same-meaning words in a desired portion within the text of an electronic book image displayed on the display unit 21, which words are same-configuration words and which words are same-meaning words can be easily recognized within the desired portion.

Further, even in the event that an electronic book regarding which an index of the individual user has been generated is selected as the object of display by a predetermined operation being performed by the user, if display of the electronic book is requested without display of the index being requested, the first hierarchical level index image 70 is not displayed at this time. The control unit 20 displays an electronic book image of the electronic book selected as the object of display on the display unit 21.

However, in the event that display of the index is requested, in the state of the electronic book regarding which an index of the individual user has been generated being displayed, by a predetermined operation being performed by the user, the first hierarchical level index image 70 is displayed instead of the electronic book image.

Also, upon displaying the first hierarchical level index image 70, the control unit 20 thereafter sequentially displays the second and third hierarchical level index images 71 and 72 in accordance with user operations in the same way as described above, and also finally displays the electronic book image of the page including the same-configuration words or same-meaning words.

Further, in the event of displaying the first through third hierarchical level index images 70 through 72 on the display unit 21, the control unit 20 returns the display on the display unit 21 to one state before (i.e., the display state immediately before displaying the first through third hierarchical level index images 70 through 72), in accordance with predetermined user operations.

Note however, the control unit 20 displays an electronic book image of the first page of the electronic book, for example, only in the event of returning the display state to the state in which the first hierarchical level index image 70 is displayed without displaying an electronic book image, in accordance with request for display of the electronic book, for example.

Accordingly, even in a case of having displayed the first through third hierarchical level index images 70 through 72, the control unit 20 enables instruction of desired portions, detected words, and meaning words to be redone by returning the display one back as appropriate.

Incidentally, even in a case of having performed index generating processing, the control unit 20 performs keyword detection, tag generation, registration of these, searching of related information, and so forth, in accordance with selection of a desired portion, in the same way as with a case of a desired portion having been selected without index generating processing being performed.

2-2-3. Link Generating Processing

Next, link generating processing where links to related portions related to desired portions in the full text of the electronic book will be described.

In the event of having displayed an electronic book image 27 on the display unit 21 in accordance with an electronic book display request as described above, the control unit 20 can generate links to related portions related to desired portions in the electronic book, in accordance with selection of the desired portion by the user.

In actual practice, the in the event that an electronic book regarding which links are to be generated is selected by a key operation or tapping operation or the like for example, and generating of a link being requested, the control unit 20 performs link generating processing. At this time, the control unit 20 displays at least part of the electronic book image of the display unit 21 by way of the display control unit 26, in the same way as with the case of the index generating processing described above.

Upon the desired portion being instructed on the electronic book image, the control unit 20 generates region-correlated text data in the same way as described above, and sends the generated region-correlated text data to the selecting unit 28 along with the book attribute data.

Also, the control unit 20 generates all text data corresponding to the electronic book which is the object of link generating, and sends the generated all text data to the obtaining unit 29.

Accordingly, the selecting unit 28 performs the same processing as with the case of index generating described above to select an instruction-estimated portion from text of a display range or text of one page, and generates instruction-estimated portion data indicating the instruction-estimated portion. The selecting unit 28 then sends the instruction-estimated portion data to the obtaining unit 29 along with the book attribute data.

Also, the obtaining unit 29 performs processing the same as with the case of index generating described above to send the all text data to the natural language processing block 30 and request natural language processing of the all text data.

Accordingly, the natural language processing block 30 performs processing the same as with the case of index generating described above to analyze the all text data, generate full text analysis result data indicating the analysis results, and return the generated full text analysis result data to the obtaining unit 29 along with the all text data.

Accordingly, the obtaining unit 29 temporarily holds the full text analysis result data and all text data provided from the natural language processing block 30, and sends this to the searching unit 66.

Also, upon being provided with instruction-estimated portion data and book attribute data from the selecting unit 28, the obtaining unit 29 identifies information indicating the analysis results of the morpheme analysis and syntax parsing of the instruction-estimated portion from the full text analysis result data which had been temporarily held, and clips the instruction-estimated portion analysis result data. The obtaining unit 29 the sends the instruction-estimated portion analysis result data to the identifying unit 33 along with the instruction-estimated portion data and book attribute data.

At this time, the identifying unit 33 also performs processing the same as with the case of index generating described above to identify the desired portion selected by the user in the instruction-estimated portion based on the instruction-estimated portion data, based on the estimated portion analysis result data.

Also, based on the instruction-estimated portion data, the identifying unit 33 generates desired portion data indicating the desired portion, and sends the generated desired portion data to the registering unit 34 along with the book attribute data.

The identifying unit 33 at this time generates desired portion analysis result data indicating the analysis results of the desired portion based on the book attribute data and instruction-estimated portion analysis result data, and sends the generated desired portion analysis result data to the detecting unit 35.

Now, upon being provided with the desired portion data and book attribute data from the identifying unit 33, the registering unit 34 performs processing the same as with the case of index generating described above, to register the electronic book of which the desired portion has been selected, in the book registration table DT1 in the storage unit 25.

Also, the registering unit 34 registers the desired portion selected from the electronic book at this time in the desired portion registration table DT2 in the book registration database in the storage unit 25.

On the other hand, upon being provided with desired portion analysis result data from the identifying unit 33, the detecting unit 35 perform processing the same as with the index generating described above, and upon detecting a detected word from the desired portion based on the desired portion analysis result data, also detects the meaning of that detected word.

The detecting unit 35 then extracts detected words from the desired portion analysis result data such that there is no duplication, and also extracts meaning words representing the meanings of the detected words such that there is no duplication. Further, the detecting unit 35 obtains desired portion identification information identifying the desired portion used for detection of the detected words, by way of the searching unit 66.

Now, at this time, the detecting unit 35 generates word detection data indicating the detection results of the detected words, storing each detected word extracted from the desired portion analysis result data such that there is no duplication, along with the book identification information and desired portion identification information. The detecting unit 35 then sends the word detection data to the searching unit 66.

Also, at this time, the detecting unit 35 generates meaning word detection data indicating the detection results of meaning words, storing the meaning words along the book identification information and desired portion identification information, for each meaning word extracted from the desired portion analysis result data such that there is no duplication. The detecting unit 35 then sends the meaning word detection data to the searching unit 66.

At this time, the searching unit 66 performs processing the same as with the index generating described above, to temporarily hold the full text analysis data and all text data provided from the obtaining unit 29.

Also, upon being provided with word detection data from the detecting unit 35 the searching unit 66 searches the full text of the book for all same-meaning words having the same configuration as the detected words, based on the word detection data and all text data, and detects the same-configuration word positions of the same-configuration words in the full text of the book.

Also, upon being provided with meaning word data from the detecting unit 35, the searching unit 66 searches the full text of the book for all same-meaning words correlated with the same meaning words as the meaning words, based on the meaning word detection data, full text analysis result data, and all text data. The searching unit 66 then detects the same-meaning word positions for the same-meaning words detected in the full text of the book.

Thus, the searching unit 66 detects, from the full text of the book, a same-configuration word based on the detected word for each detected word detected from the desired portion by the detecting unit 35 such that there is not duplication, and detects the same-configuration word position of this same-configuration word.

Also, the searching unit 66 searches for a same-meaning word from the full text of the book based on the meaning word, for each meaning word detected by the detecting unit 35 based on the desired portion so that there is no duplication, and detects the same-meaning word position of this same-meaning word.

Note however, at this time, the searching unit 66 extracts the desired portion identification information and book identification information from the word detection data and meaning word detection data.

Accordingly, the searching unit 66 generates same-configuration word registration request data requesting registration of the same-configuration word, storing the same-configuration word and same-configuration word position information along with the desired portion identification information and book identification information, for each same-configuration word that has been found.

The searching unit 66 then sends the same-configuration word registration request data to the registering unit 34. Incidentally, the searching unit 66 has added search completion information indicating that searching for the same-configuration word has been completed, to the same-configuration word registration request data of the same-configuration word that has been found last out of all same-configuration words found from the full text of the book based on one desired portion.

Also, the searching unit 66 generates same-meaning word registration request data requesting registration of the same-meaning word for each same-meaning word that has been found, storing the same-meaning word and same-meaning word position information, along with the desired portion identification information, book identification information, and meaning word representing the meaning of the corresponding detected word.

The searching unit 66 then sends the same-meaning word registration request data to the registering unit 34. Incidentally, the searching unit 66 has added search completion information indicating that searching for the same-meaning word has been completed, to the same-meaning word registration request data of the same-meaning word that has been found last out of all same-meaning words found from the full text of the book based on one desired portion.

At this time, each time same-configuration word registration request data is provided from the searching unit 66, the registering unit 34 extracts, from the same-configuration word registration request data, the book identification information, same-configuration word position information (page number, line number, column number, number of characters), same-configuration word, and desired portion identification information.

The registering unit 34 also issues same-configuration word identification information capable of individually identifying that same-configuration word. Note that even in the event that a same-configuration word with exactly the same configuration is found by the searching unit 66 from multiple plates in the full text of the book, the same-configuration word position in the full text of the book differs for each of the multiple same-configuration words that have been detected.

Accordingly, the registering unit 34 issues unique same-configuration word identification information for each of the multiple same-configuration words, so that the multiple same-configuration words can each be identified as different words.

Upon issuing the same-configuration word identification information, the registering unit 34 generates same-configuration word registration data for registering the same-configuration word, storing the same-configuration word identification information along with the book identification information, page number, line number, column number, number of characters, and same-configuration word. The registering unit 34 then sends the same-configuration word registration data to the storage unit 25.

Now, a data table for registering the same-configuration word (hereinafter also referred to as "same-configuration word registration table") is generated in the above-described book registration database, with the same configuration as that of the desired portion registration table DT2.

Provided in the same-configuration word registration table as information registering columns are a same-configuration word identification information registration column for registering same-configuration word identification information, and a book identification information registration column for registering book identification information.

Also provided in the same-configuration word registration table as information registering columns are a page number registration column for registering the page number of a page where the same-configuration word exists, and a line number registration column for registering the line number of the line where the first character of the same-configuration word is situated.

Further provided in the same-configuration word registration table as information registering columns are a column number registration column for registering the column number where the first character of the same-configuration word is situated, and a character number registration column for registering the number of characters of the same-configuration word.

Moreover provided in the same-configuration word registration table as an information registering column is a same-configuration word registration column for registering the same-configuration word itself as a text string.

Accordingly, the registering unit 34 stores the same-configuration word identification information, book identification information, page number, line number, column number, number of characters, and same-configuration word, which had been stored in the same-configuration word registration data, in the corresponding information registration columns of the same-configuration word registration table, so as to be mutually correlated.

Thus, each time a registration for a same-configuration word is requested from the searching unit 66, the registering unit 34 registers same-configuration word registration data indicating the same-configuration word found at this time, in the same-configuration word registration table of the book registration database.

Also, each time a same-configuration word is registered, the registering unit 34 generates same-configuration word registration completed data indicating completion of registration of the same-configuration word, storing the same-configuration word identification information of the same-configuration word and the same-configuration word position information along with the book identification information and desired portion identification information.

The registering unit 34 then sends the same-configuration word registration completed data to a link generating unit 75. Note, however, that the registering unit 34 has added detection completion information to the same-configuration word registration completed data for the same-configuration word found last based on one desired portion.

Additionally, each time same-meaning word registration request data is provided from the searching unit 66, the registering unit 34 extracts, from the same-meaning word registration data, the book identification information, same-meaning word position information (page number, line number, column number, number of characters), same-meaning word, desired portion identification information, and meaning words.

Also, the registering unit 34 also issues same-meaning word identification information capable of individually identifying that same-meaning word. Note that even in the event that a same-meaning word with exactly the same meaning is found by the searching unit 66 from multiple plates in the full text of the book, the same-meaning word position in the full text of the book differs for each of the multiple same-meaning words.

Accordingly, the registering unit 34 issues unique same-meaning word identification information for each of the multiple same-meaning words, so that the multiple same-meaning words can each be identified as different words.

Upon issuing the same-meaning word identification information, the registering unit 34 generates same-meaning word registration data for registering the same-meaning word, storing the same-meaning word identification information along with the book identification information, page number, line number, column number, number of characters, and same-meaning word. The registering unit 34 then sends the same-meaning word registration data to the storage unit 25.

Now, a data table for registering the same-meaning word (hereinafter also referred to as "same-meaning word registration table") is generated in the above-described book registration database, with the same configuration as that of the desired portion registration table DT2.

Provided in the same-meaning word registration table as information registering columns are a same-meaning word identification information registration column for registering same-meaning word identification information, and a book identification information registration column for registering book identification information.

Also provided in the same-meaning word registration table as information registering columns are a page number registration column for registering the page number of a page where the same-meaning word exists, and a line number registration column for registering the line number of the line where the first character of the same-meaning word is situated.

Further provided in the same-meaning word registration table as information registering columns are a column number registration column for registering the column number where the first character of the same-meaning word is situated, and a character number registration column for registering the number of characters of the same-meaning word.

Moreover provided in the same-meaning word registration table as an information registering column is a same-meaning word registration column for registering the same-meaning word itself as a text string.

Accordingly, the registering unit 34 stores the same-meaning word identification information, book identification information, page number, line number, column number, number of characters, and same-meaning word, which had been stored in the same-meaning word registration data, in the corresponding information registration columns of the same-meaning word registration table, so as to be mutually correlated.

Thus, each time a registration for a same-meaning word is requested from the searching unit 66, the registering unit 34 stores same-meaning word registration data indicating the same-meaning word found at this time, in the same-meaning word registration table of the book registration database.

Also, each time a same-meaning word is registered, the registering unit 34 generates same-meaning word registration completed data indicating completion of registration of the same-meaning word, storing the same-meaning word identification information of the same-meaning word and the same-meaning word position information along with the meaning word, book identification information, and desired portion identification information.

The registering unit 34 then sends the same-meaning word registration completed data to a link generating unit 75. Note, however, that the registering unit 34 has added detection completion information to the same-meaning word registration completed data for the same-meaning word found last based on one desired portion.

Thus, the control unit 20 causes the selecting unit 28, the obtaining unit 29, the identifying unit 33, the detecting unit 35, the registering unit 34, and the searching unit 66 to perform the same processing each time a desired portion is instructed on the electronic book image displayed on the display unit 21.

Each time same-configuration word registration completed data is provided from the registering unit 34 while performing the index generating processing, the link generating unit 75 temporarily holds the same-configuration word registration completed data.

Also, each time same-meaning word registration completed data is provided from the registering unit 34 while performing the index generating processing, the link generating unit 75 temporarily holds the same-meaning word registration completed data as well.

Upon being provided with the same-configuration word registration completed data with the detection completed information added thereto from the registering unit 34, and temporarily holding this, the link generating unit 75 extracts the book identification information and desired portion identification information from the same-configuration word registration completed data.

Also, based on the desired portion identification information, the link generating unit 75 detects same-configuration word registration completed data of all same-configuration words found based on one desired portion identified by the desired portion identification information.

Further, the link generating unit 75 extracts the same-configuration word from each same-configuration word registration completed data that has been found, and compares the extracted same-configuration words.

As a result, in the event that it is found that all same-configuration words are the same (i.e., just one detected word is detected from the corresponding desired portion), the link generating unit 75 does not perform any further classification of the same-configuration word registration completed data that has been found.

On the other hand, in the event that different same-configuration words exist (i.e., two or more detected words have been found from the corresponding desired portion), the link generating unit 75 classifies the found same-configuration word registration completed data for each same-configuration word.

Thus, the link generating unit 75 compiles the same-configuration word registration completed data of the same-configuration words found based on the one desired portion for each same-configuration words having equal configurations.

The link generating unit 75 then extracts the same-configuration word identification information and same-configuration word position information from the same-configuration word registration completed data of each of the same-configuration words with equal configuration.

The link generating unit 75 also generates a same-configuration word position list by arraying the same-configuration word position information of the same-configuration words in a manner correlated with the same-configuration word identification information of the same-configuration words, in order from the same-configuration word at the start side of the full text of the book toward the same-configuration word at the end side.

Further, the link generating unit 75 adds the book identification information and desired portion identification information of the electronic book and desired portion used for generating the same-configuration words, to the same-configuration word position list.

Accordingly, the link generating unit 75 generates a same-configuration word link list whereby same-configuration words in the full text of the book are sequentially linked following the same-configuration word position list.

In the event that two or more types of same-configuration words have been found based on one desired portion, the link generating unit 75 performs the same processing for each same-configuration word to generate a same-configuration word link list for each.

Also, upon two or more desired portions being selected in the electronic book, the link generating unit 75 performs the same processing on each desired portion and detected word, regarding the same-configuration words found based on each of the desired portions, and generates a same-configuration word link list for each.

Thus, upon generating a same-configuration word link list, the link generating unit 75 sends the same-configuration word link list to the registering unit 34, so as to store the same-configuration word link list in the storage unit 25 by way of the registering unit 34.

On the other hand, upon being provided with the same-meaning word registration completed data with the detection completed information added thereto from the registering unit 34, and temporarily holding this, the link generating unit 75 extracts the book identification information and desired portion identification information from the same-meaning word registration completed data as well.

Also, based on the desired portion identification information, the link generating unit 75 detects same-meaning word registration completed data of all same-meaning words found based on one desired portion identified by the desired portion identification information.

Further, the link generating unit 75 extracts the meaning words from each same-meaning word registration completed data that has been found, and compares the extracted meaning words.

As a result, in the event that it is found that all meaning words are the same (i.e., just one detected word is detected from the corresponding desired portion), the link generating unit 75 does not perform any further classification of the same-meaning word registration completed data that has been found.

On the other hand, in the event that different meaning words exist (i.e., two or more meaning words have been found from the corresponding desired portion), the link generating unit 75 classifies the found same-meaning word registration completed data for each meaning word.

Thus, the link generating unit 75 compiles the same-meaning word registration completed data of the same-meaning words found based on the one desired portion for each meaning word (i.e., same-meaning word).

The link generating unit 75 then extracts the same-meaning word identification information and same-meaning word position information from the same-meaning word registration completed data of each of the same-meaning words with equal meaning.

The link generating unit 75 also generates a same-meaning word position list by arraying the same-meaning word position information of the same-meaning words in a manner correlated with the same-meaning word identification information of the same-meaning words, in order from the same-meaning word at the start side of the full text of the book toward the same-meaning word at the end side.

Further, the link generating unit 75 adds the book identification information and desired portion identification information of the electronic book and desired portion used for generating the same-meaning words, to the same-meaning word position list.

Accordingly, the link generating unit 75 generates a same-meaning word link list whereby same-meaning words in the full text of the book are sequentially linked following the same-meaning word position list.

In the event that two or more types of same-meaning words have been found based on one desired portion, the link generating unit 75 performs the same processing for each same-meaning word to generate a same-meaning word link list for each.

Also, upon two or more desired portions being selected in the electronic book, the link generating unit 75 performs the same processing on each desired portion and same-meaning word, regarding the same-meaning words found based on each of the desired portions, and generates a same-meaning word link list for each.

Thus, upon generating a same-meaning word link list, the link generating unit 75 sends the same-meaning word link list to the registering unit 34, so as to store the same-meaning word link list in the storage unit 25 by way of the registering unit 34.

Note that in the following description, in the event that the same-configuration word link list and same-meaning word link list do not have to be distinguished, these will also collectively be referred to as, simply, "link list".

Each time of storing the same-configuration word link lists and same-meaning word link lists in the storage unit 25, the link generating unit 75 notifies the control unit 20 that generating of a link list has been completed.

For example, in the event that notification of completion of generating of a link list is made from the link generating unit 75 while displaying a electronic book image of an electronic book for example, the control unit 20 stores the book identification information of the electronic book and generates list search request data requesting a search of the link list. The control unit 20 then sends the list search request data to the searching unit 66.

Upon being provided with the list search request data from the control unit 20, based on the book identification information stored in the list search request data, the searching unit 66 searches for the same-configuration word link lists and same-meaning word link lists having this book identification information in the storage unit 25.

As a result, upon finding same-configuration word link lists and same-meaning word link lists in the storage unit 25, the searching unit 66 reads out the found same-configuration word link lists and same-meaning word link lists which are sent to the control unit 20.

Now, upon the same-configuration word link lists and same-meaning word link lists being provided from the searching unit 66, the control unit 20 distinguishes whether or not same-configuration word position information including this page is registered in the same-configuration word link list, based on the page number of the electronic book image being displayed.

As a result, in the event that one or multiple same-configuration word position information including the page number are detected in the same-configuration word link list, the control unit 20 reads out the same-configuration word position information from the same-configuration word link list, along with the corresponding same-configuration word identification information.

The control unit 20 then generates highlighted display control data to control highlighted display of the corresponding same-configuration word, based on the same-configuration word position information and same-configuration word identification information, and sends the generated highlighted display control data to the display control unit 26.

Also, the control unit 20 determines whether or not same-meaning word position information including this page number is included in the same-meaning word link list, based on the page number of the electronic book image being displayed.

As a result, in the event that one or multiple same-meaning word position information including the page number are detected in the same-meaning word link list, the control unit 20 reads out the same-meaning word position information from the same-meaning word link list, along with the corresponding same-meaning word identification information.

The control unit 20 then generates highlighted display control data to control highlighted display of the corresponding same-meaning word, based on the same-meaning word position information and same-meaning word identification information, and sends the generated highlighted display control data to the display control unit 26.

Upon being provided with the highlighted display control data from the control unit 20, the display control unit 26 modifies the electronic book image which had been generated for display at this time, based on the highlighted display control data, and sends this to the display unit 21.

Accordingly, the display control unit 26 performs highlighted display of the one or multiple same-configuration words instructed based on the highlighted display, in the electronic book image displayed on the display unit 21. Also, the display control unit 26 also performs highlighted display of the one or multiple same-meaning words instructed based on the highlighted display, in the electronic book image displayed on the display unit 21.

Thus, in the event that a same-configuration word or a same-meaning word is included in the text of the electronic book image displayed on the display unit 21, the control unit 20 can present the same-configuration word or same-meaning word to the user with highlighted display.

Note that in the event that the user performs a flicking operation in this state and the electronic book image displayed on the display unit 21 is switched, the control unit 20 performs processing in the same way.

Accordingly, in the event that a same-configuration word or a same-meaning word is included in the text of the electronic book image newly displayed on the display unit 21, highlighted display is performed for the same-configuration word or same-meaning word.

Now, in the event that highlighted display is being made of one or multiple same-configuration words in the electronic book image displayed on the display unit 21, the display control unit 26 generates word display region information indicating the display region of each same-configuration word by coordinates of pixel position on the display face of the display unit 21 for each same-configuration word.

The display control unit 26 then sends the word display region information of each same-configuration word to the control unit 20 along with same-configuration word identification information of the same-configuration word.

Also, in the event that highlighted display is being made of one or multiple same-meaning words in the electronic book image displayed on the display unit 21, the display control unit 26 generates word display region information indicating the display region of each same-meaning word by coordinates of pixel position on the display face of the display unit 21 for each same-meaning word.

The display control unit 26 then sends the word display region information of each same-meaning word to the control unit 20 along with same-meaning word identification information of the same-meaning word.

Accordingly, while the same-configuration word is being displayed highlighted, the same-configuration word display region information and same-configuration word identification information of the same-configuration word provided from the display control unit 26 are held in a correlated manner.

Also, while the same-meaning word is being displayed highlighted, the same-meaning word display region information and same-meaning word identification information of the same-meaning word provided from the display control unit 26 are held in a correlated manner.

Now, in the event that highlighted display is being made of a same-configuration word, and the user performs a flicking operation by moving the fingertip or the like on the face of the touch panel so as to move from the left side of the image toward the right side of the image, the control unit 20 compares the touch position of the flicking operation with the display region which the word display region information indicates.

Also, in the event that highlighted display is being made of a same-meaning word, and the user performs a flicking operation by moving the fingertip or the like on the face of the touch panel to the right, the control unit 20 compares the touch position of the flicking operation with the display region which the word display region information indicates.

As a result, in the event of detecting that a flicking operation has been made in the right direction such that the fingertip enters the display region of the same-configuration word for example, the control unit 20 determines that the same-configuration word of this display region has been instructed by this flicking operation.

The control unit 20 also determines that instruction has been made by the flicking operation to display, of the same-configuration words at various same-configuration word positions in the full text of the book, the same-configuration word which is before the instructed same-configuration word and is closest to this same-configuration word.

The control unit 20 then detects the same-configuration word identification information correlated with the word display region information, based on the word display region information which the display region that has been the object of the flicking operation indicates.

Also, the control unit 20 detects the same-configuration word position information registered one before the same-configuration word position information of the instructed same-configuration word, following the order of same-configuration word position information within the same-configuration word link list, based on the detected same-configuration word identification information.

Accordingly, the control unit 20 extracts the detected same-configuration word position from the same-configuration word link list, along with the corresponding same-configuration word identification information. The control unit 20 then compares the page number included in the same-configuration word position information with the page number of the electronic book image being displayed.

In the event that the page number included in the same-configuration word position information is found to indicate a page before the electronic book image being displayed, the page of the electronic book image to be newly displayed is instructed by that page number, and display switching control data for controlling switching of the display is generated.

Also, the control unit 20 generates highlighted display control data to effect control such that the instructed same-configuration word is subjected to highlighted display, based on the same-configuration word position information and same-configuration word identification information. The control unit 20 then sends the display switching control data and highlighted display control data to the display control unit 26.

Upon being provided with the display switching control data and highlighted display control data from the control unit 20, the display control unit 26 generates electronic book image data of the instructed page, based on the display switching control data and highlighted display control data.

Also at this time, the display control unit 26 modifies the electronic book image data generated at this time based on the highlighted display control data, and sends this to the display unit 21. Accordingly, the display control unit 26 displays the electronic book image of the instructed page instead of the electronic book image which had been displayed so far, such that the same-configuration word that has been instructed is situated at the middle of the display face as much as possible, and also performs highlighted display of the same-configuration word.

Now, when switching the display of the electronic book image, the control unit 20 determines whether or not there is a same-configuration word other than the instructed same-configuration word within the text of the electronic book image to be newly displayed, based on the same-configuration word link list.

As a result, if a same-configuration word other than the instructed same-configuration word is detected within the text of the electronic book image to be newly displayed, the control unit 20 performs highlighted display of the same-configuration word other than the instructed same-configuration word as well, in the same way as described above.

Also, in the event that comparison of the page number included in the same-configuration word position information with the page number of the electronic book image being displayed shows that this page number indicates the page number of the electronic book image being displayed, the control unit 20 generates no display switching control data at this time.

However, the control unit 20 generates display range control data to control the display range such that the instructed same-configuration word is displayed at the middle of the display face, as much as possible, based on the same-configuration word identification information. The control unit 20 then sends the display range control data to the display control unit 26.

Upon being provided with the display range control data from the control unit 20, the display control unit 26 changes the portion of the electronic book image that is set to the display unit 21, in accordance with this display range control data.

Accordingly, the changes the display range of the electronic book image such that the instructed same-configuration word is displayed at the middle of the display face, as much as possible, without changing the electronic book image to be displayed on the display unit 21.

Now, if a flicking operation is made in the right direction as described above, for example, in the event of detecting that a flicking operation has been made in the right direction such that the fingertip enters the display region of the same-meaning word for example, the control unit 20 determines that the same-meaning word of this display region has been instructed by this flicking operation.

The control unit 20 also determines at this time that instruction has been made by the flicking operation to display, of the same-meaning words at various same-meaning word positions in the full text of the book, the same-meaning word which is before the instructed same-meaning word and is closest to this same-meaning word.

The control unit 20 then detects the same-meaning word identification information correlated with the word display region information, based on the word display region information which the display region that has been the object of the flicking operation indicates.

Thus, the control unit 20 at this time uses the same-meaning word link list perform processing the same as with the case of using the same-configuration word link list described above.

Thus, the control unit 20 switches the electronic book image being displayed to the electronic book image of the previous page as appropriate and displays this, or changes the display range of the electronic book image, and performs highlighted display of the instructed same-meaning word included in the text of the electronic book image.

Thus, each time a same-configuration word included in text in the electronic book image being displayed are indicated by a flicking operation in the right direction, the control unit 20 can switch the display of the electronic book image as appropriate, and display the same-configuration word situated before the instructed same-configuration word.

Also, each time a same-meaning word included in text in the electronic book image being displayed are indicated by a flicking operation in the right direction, the control unit 20 can switch the display of the electronic book image as appropriate, and display the same-meaning word situated before the instructed same-meaning word.

Additionally, in the event that highlighted display is being made of a same-configuration word, and the user performs a flicking operation by moving the fingertip or the like on the face of the touch panel so as to move from the right side of the image toward the left side of the image, the control unit 20 compares the touch position of the flicking operation with the display region which the word display region information indicates.

Additionally, in the event that highlighted display is being made of a same-meaning word, and the user performs a flicking operation by moving the fingertip or the like on the face of the touch panel to the left, the control unit 20 compares the touch position of the flicking operation with the display region which the word display region information indicates.

As a result, in the event of detecting that a flicking operation has been made in the left direction such that the fingertip enters the display region of the same-configuration word for example, the control unit 20 determines that the same-configuration word of this display region has been instructed by this flicking operation.

The control unit 20 also determines that instruction has been made by the flicking operation to display, of the same-configuration words at various same-configuration word positions in the full text of the book, the same-configuration word which is after the instructed same-configuration word and is closest to this same-configuration word.

The control unit 20 then detects the same-configuration word identification information correlated with the word display region information, based on the word display region information which the display region that has been the object of the flicking operation indicates.

Also, the control unit 20 detects the same-configuration word position information registered one after the same-configuration word position information of the instructed same-configuration word, following the order of same-configuration word position information within the same-configuration word link list, based on the detected same-configuration word identification information.

Accordingly, the control unit 20 extracts the detected same-configuration word position from the same-configuration word link list, along with the corresponding same-configuration word identification information. The control unit 20 then compares the page number included in the same-configuration word position information with the page number of the electronic book image being displayed.

In the event that the page number included in the same-configuration word position information is found to indicate a page after the electronic book image being displayed at this time, the page of the electronic book image to be newly displayed is instructed by that page number, and display switching control data for controlling switching of the display is generated.

Also, the control unit 20 generates highlighted display control data to effect control such that the instructed same-configuration word is subjected to highlighted display, based on the same-configuration word position information and same-configuration word identification information. The control unit 20 then sends the display switching control data and highlighted display control data to the display control unit 26.

Upon being provided with the display switching control data and highlighted display control data from the control unit 20, the display control unit 26 generates electronic book image data of the instructed page, based on the display switching control data and highlighted display control data.

Also at this time, the display control unit 26 modifies the electronic book image data generated at this time based on the highlighted display control data, and sends this to the display unit 21. Accordingly, the display control unit 26 displays the electronic book image of the instructed page instead of the electronic book image which had been displayed so far on the display unit 21, such that the same-configuration word that has been instructed is situated at the middle of the display face as much as possible, and also performs highlighted display of the same-configuration word.

Now, when switching the display of the electronic book image, the control unit 20 determines whether or not there is a same-configuration word other than the instructed same-configuration word within the text of the electronic book image to be newly displayed, based on the same-configuration word link list.

As a result, if a same-configuration word other than the instructed same-configuration word is detected within the text of the electronic book image to be newly displayed, the control unit 20 performs highlighted display of the same-configuration word other than the instructed same-configuration word as well, in the same way as described above.

Also, in the event that comparison of the page number included in the same-configuration word position information with the page number of the electronic book image being displayed shows that this page number indicates the page number of the electronic book image being displayed, the control unit 20 generates no display switching control data at this time.

However, the control unit 20 generates display range control data to control the display range such that the instructed same-configuration word is displayed at the middle of the display face, as much as possible, based on the same-configuration word identification information. The control unit 20 then sends the display range control data to the display control unit 26.

Upon being provided with the display range control data from the control unit 20, the display control unit 26 changes the portion of the electronic book image that is set to the display unit 21, in accordance with this display range control data.

Accordingly, the changes the display range of the electronic book image such that the instructed same-configuration word is displayed at the middle of the display face, as much as possible, without changing the electronic book image to be displayed on the display unit 21.

Now, if a flicking operation is made in the left direction as described above, for example, in the event of detecting that a flicking operation has been made in the left direction such that the fingertip enters the display region of the same-meaning word for example, the control unit 20 determines that the same-meaning word of this display region has been instructed by this flicking operation.

The control unit 20 also determines at this time that instruction has been made by the flicking operation to display, of the same-meaning words at various same-meaning word positions in the full text of the book, the same-meaning word which is after the instructed same-meaning word and is closest to this same-meaning word.

The control unit 20 then detects the same-meaning word identification information correlated with the word display region information, based on the word display region information which the display region that has been the object of the flicking operation indicates.

Thus, the control unit 20 at this time uses the same-meaning word link list perform processing the same as with the case of using the same-configuration word link list described above.

Thus, the control unit 20 switches the electronic book image being displayed to the electronic book image of the previous page as appropriate and displays this, or changes the display range of the electronic book image, and performs highlighted display of the instructed same-meaning word included in the text of the electronic book image.

Thus, each time a same-configuration word included in text in the electronic book image being displayed are indicated by a flicking operation in the left direction, the control unit 20 can switch the display of the electronic book image as appropriate, and display the same-configuration word situated after the instructed same-configuration word.

Also, each time a same-meaning word included in text in the electronic book image being displayed are indicated by a flicking operation in the left direction, the control unit 20 can switch the display of the electronic book image as appropriate, and display the same-meaning word situated after the instructed same-meaning word.

Accordingly, in the case of having generated a link as to an electronic book, the control unit 20 can use the link function to allow easy searching of related places such as paragraphs or phrases or the like related to the desired portion.

Note that in the case of performing highlighted display of same-configuration words or same-meaning words based on link lists, the control unit 20 performs highlighted display such that the same-configuration words and same-meaning words are displayed with different display states, in the same way as with using the index described above.

Thus, the control unit 20 can notify that the degree of relation between the desired portion and the related part including the same-configuration word, and the degree of relation between the desired portion and the related part including the same-meaning word, differ.

Also, in the event of having performed link generating processing, the control unit 20 performs detection of keywords and detecting of tags, registration thereof, searching for related information, and so forth, in the same way as with the case of a desired portion being selected in a state without link generating processing having been performed.

Accordingly, in the case of displaying an electronic book image of an electronic book regarding which links have been generated, if a desired portion is selected in the text of the electronic book image the desired portion is displayed highlighted.

Thus, while performing highlighted display with the same-configuration words and same-meaning words in different display states, the control unit 20 further performs highlighted display of the same-configuration words and same-meaning words so as to be different in display state from the desired portion as well.

Accordingly, in the event that a desired portion is included in the text of the electronic book image displayed on the display unit 21, and same-configuration words and same-meaning words are to be subjected to highlighted display within the desired portion, at which portion of the desired portion the same-configuration words and same-meaning words are can be readily recognized.

Also, if an electronic book image of an electronic book regarding which links have been generated is being displayed, and user reads to a desired portion, and requests to read related parts relating to the desired portion in the electronic book, this can be easily handled.

Now, in the event that a same-configuration word is being displayed highlighted in the electronic book image being displayed, the control unit 20 can enable the user to instruct the same-configuration word with a predetermined operation, and also delete the same-configuration word from the same-configuration word link list.

In actual practice, in the event that an instruction is made by the user by a predetermined operation to delete a same-configuration word in the electronic book image being displayed from the same-configuration word link list, highlighted display of the instructed same-configuration word is ceased.

The control unit 20 also detects and deletes the same-configuration word position information and same-configuration word identification information of the instructed same-configuration word within the same-configuration word link list. Accordingly, the control unit 20 invalidates the search of the same-configuration word instructed by the user at this time, and thereafter does not perform highlighted display of that same-configuration word.

Also, in the event that a same-meaning word is being displayed highlighted in the electronic book image being displayed, the control unit 20 can enable the user to instruct the same-meaning word with a predetermined operation, and also delete the same-meaning word from the same-meaning word link list.

In the event that an instruction is made by the user by a predetermined operation to delete a same-meaning word in the electronic book image being displayed from the same-meaning word link list, highlighted display of the instructed same-meaning word is ceased.

The control unit 20 also detects and deletes the same-meaning word position information and same-meaning word identification information of the instructed same-meaning word within the same-meaning word link list. Accordingly, the control unit 20 invalidates the search of the same-meaning word instructed by the user at this time, and thereafter does not perform highlighted display of that same-meaning word.

Accordingly, the control unit 20 can avoid a same-configuration word or a same-meaning word included in a related place which the user has judged to not be related all that much to a desired portion, from being uselessly subjected to highlighted display in order to search for that related portion, in the electronic book image.

Also, the control unit 20 can avoid the text itself from becoming difficult to read due to too many same-configuration words and same-meaning words being displayed highlighted in the electronic book image.

Further, when an electronic book image of an electronic book regarding which a link list has been generated is being displayed, and highlighted display is being performed of a desired portion selected at the time of the generating the link list, the control unit 20 can enable the user to instruct the desired portion with a predetermined operation and cancel the selection.

In actual practice, upon an instruction being made by the user by a predetermined operation to cancel selection of the desired portion in the electronic book image being displayed, the control unit 20 ceases highlighted display of the desired portion.

Also, at this time the control unit 20 sends deletion request data requesting deletion of registration of the desired portion storing the desired portion identification information of the desired portion that has been instructed, to the registering unit 34.

Accordingly, at this time the registering unit 34 extracts the desired portion identification information from the deletion request data provided from the control unit 20. The registering unit 34 then detects and deletes the desired portion registration data corresponding to the desired portion identification information within the desired portion registration table DT2 in the storage unit 25, based on the desired portion identification information.

Accordingly, the control unit 20 cancels selection of the desired portion instructed by the user at this time, so as to not be displayed highlighted thereafter.

Also, at this time, the registering unit 34 detects and deletes the same-configuration word link list and same-meaning word link list including the desired portion identification information in the storage unit 25, based on the desired portion identification information extracted from the deletion request data.

Accordingly, the control unit 20 invalidates detection of the same-configuration words and same-meaning words searched based on the desired portion instructed by the user, such that these same-configuration words and same-meaning words are not displayed highlighted thereafter.

Accordingly, in the event that the user has determined that a desired portion does not have to be left, which has been selected at one time, in a selected state in the electronic book image, the control unit 20 cancels the selection thereof, so that the desired portion is not uselessly subjected to highlighted display thereafter.

Also, the control unit 20 can avoid a state wherein related places relating to the desired portion do not have to be searched for since the selection of the desired portion has been canceled, but the same-configuration words and same-meaning words for searching for related places relating to the desired portion are uselessly subjected to highlighted display.

2-2-4. Classification Processing

Next, classification processing for classifying the desired portions selected in various types of electronic books will be described. First, we can say that a desired portion selected by the user in an electronic book is a portion which the user has been particularly interested in within the full text of the electronic book.

Accordingly, the control unit 20 does not classify the desired portions according to the genre of the selected electronic book, but rather classifies from the perspective of what sort of things the user is interested in, allowing the classification results to be used for subsequent desired portion searching more readily.

In order to realize classification of such desired portions, the control unit 20 uses meanings of keywords detected from the desired portion. Also, the control unit 20 hierarchically classifies the desired portion, allowing the classification results to be used for subsequent desired portion searching more readily.

In actual practice, upon classification of a predetermined portion be requested by predetermined operations of a user, in response thereto the control unit 20 performs classification processing in cooperation with the circuit portions. At this time, the control unit 20 prompts the user to select a folder name of one or multiple first hierarchical level at the highest order of hierarchical folders for hierarchically classifying the desired portions, for example.

At this time, the control unit 20 exemplifies a hierarchical meaning of a superordinate concept as to a certain word included in the desired portion on the display unit 21, for example (e.g., the word "bouquet garni", and the hierarchical meanings of "cooking" and "food", which are superordinate concepts thereof).

Accordingly, the user reading through the electronic book is prompted to select the first hierarchical level filter name from one or more words representing the meaning of the superordinate concept which can be thought to be appropriate in classifying the desired portion, such as "cooking" or "history, historical figures".

Upon the user selecting the names of one or multiple first hierarchical level folders the control unit 20 generates, for each first hierarchical level folder, folder name data indicating the selected folder name, and sends this to the classifying unit 77.

How, at the point that the electronic book has been instructed to be obtained by the user, it can be said that the entire book is the desired portion. Particularly, electronic books which have been obtained by clipping from text within Web pages, reports, and so forth, as if with a scrapbook, are portions which the user ha instructed to be clipped due to the user being interested in the text in the Web pages, reports, and so forth, and accordingly are desired portions themselves.

Accordingly, the selecting unit 28 determines, under control of the control unit 20 at this time, whether or not there are unregistered electronic books in the book registration table DT1 in the storage unit 25, based on the electronic book data stored in the storage unit 25 and the book registration data within the book registration table DT1.

That is to say, the selecting unit 28 determines whether or not there are any electronic books in the storage unit 25 regarding which no part of the text has been selected as a desired portion even once after obtaining.

In the event that an unregistered electronic book is found to exist in the book registration table DT1 as a result thereof, the selecting unit 28 selects the all text data of the electronic book for analysis. The selecting unit 28 then reads out the book attribute data and all text data of the unregistered electronic book from the storage unit 25, and sends this to the obtaining unit 29.

Upon the book attribute data and all text data being provided from the selecting unit 28, the obtaining unit 29 temporarily holds the book attribute data, and sends the all text data to the natural language processing block 30 to request natural language processing of the all text data.

At this time, the natural language processing block 30 performs morpheme analysis and syntax parsing of the full text of the book based on the all text data as described, above, and returns the full text analysis result data obtained as a result thereof to the obtaining unit 29 along with the all text data.

Upon being provided with the full text analysis result data and all text data from the natural language processing block 30, the obtaining unit 29 sends this to the detecting unit 35 along with the book attribute data which had been temporarily held.

Upon being provided with the full text analysis result data and all text data along with the book attribute data from the obtaining unit 29, the detecting unit 35 detects keywords from the full text of the book based on the all text data, based on the full text analysis data, in the same way as with the case of detecting keywords from desired portions.

Also, the detecting unit 35 detects the meanings of the detected keywords, based on the full text analysis data. The detecting unit 35 then extracts the page number of the page where each keyword has been detected from the all text data.

Also, for each detected keyword, the detecting unit 35 extracts, from the all text data, the keyword (i.e., character code of multiple characters representing the keyword) and character position information corresponding to that keyword (i.e., of the multiple characters representing the keyword).

Further, the detecting unit 35 takes the score of the keyword as 1 for each keyword. The detecting unit 35 further extracts, for each keyword, meaning words representing the meaning for that keyword, from the all text data.

Accordingly, the detecting unit 35 generates keyword data for each keyword which indicates that keyword, storing page number, keyword, character position information, meaning words, and score. The detecting unit 35 then sends the keyword data to the registering unit 34 along with the book attribute data.

Upon being provided with the keyword data along with the book attribute data from the detecting unit 35 at this time, the registering unit 34 generates book registration data based on the book attribute data in the same way as described above, and registers the electronic book from which the keyword was detected in the book registration table DT1.

Also, in the same way as with the case of registering the desired portions as described above, the registering unit 34 issues keyword identification information, and generates keyword registration data of the same configuration as the desired portion registration data, based on the keyword data and book registration data.

Accordingly, the registering unit 34 sends the keyword registration data to the storage unit 25 and registers the keyword in the desired portion registration table DT2 as with a desired portion.

Also, at this time the registering unit 34 uses the keyword identification information again to generate keyword registration data of the same configuration as described above based on the keyword identification information and the keyword data. The registering unit 34 then sends the keyword registration data to the storage unit 25 and registers the keyword in the keyword registration table DT3.

Note that at this time, the registering unit 34 does not perform correlation using the correlating unit 60 as described above, since the same keyword identification information is being used for keyword registration to the desired portion registration table DT2 and keyword registration to the keyword registration table DT3.

Thus, with regard to electronic books in which desired portions have not been selected, the control unit 20 automatically identifies keywords important for understanding the content from the full text of the electronic book. The control unit 20 handles the keywords as desired portions, so as to be classifiable along with desired portions selected by the user.

Also, related comments input as related information of the desired portions are written so as to represent items which the user is interested in regarding the desired portions, and accordingly can be said to be desired portions in which the user is interested, though not part of the electronic book.

Accordingly, at this time, under control of the control unit 20 the selecting unit 28 determines whether or not a related comment input by the user as related information of the desired portion is stored in the storage unit 25. In the event that a relate comment is found to have been stored in the storage unit 25 as a result, the related comment is selected as an object of analysis.

The selecting unit 28 then reads out the related comment along with the tag identification information correlated therewith, adds the tag identification information to the related comment which has been read out, and sends this to the obtaining unit 29.

At this time, upon the related comment being provided from the selecting unit 28, the obtaining unit 29 sends the related comment to the natural language processing block 30 and commissions natural language processing thereof.

Upon the related comment being analyzed in the same way as the instruction-estimated portion data and all text data described above, and the related comment and comment analysis result data being provided from the natural language processing block 30, the obtaining unit 29 sends these to the detecting unit 35.

Upon being provided with the related comment and comment analysis result data from the obtaining unit 29, the detecting unit 35 detects keywords from the related comment based on the comment analysis result data in the same way as described above, and detects meanings for the detected keywords so that there is no duplication. The detecting unit 35 then sends the detected meaning words to a classifying unit 77 along with the tag identification information added to the related comment.

Thus, the selecting unit 28 handles related comment stored in the storage unit 25 as desired portion as well at this time, thereby enabling classification thereof along with the desired portions selected by the user.

Now, description will be made regarding the processing for actually classifying the desired portions by the classifying unit 77. The following is a description relating a case of classifying the keywords and related comments prepared as objects of classification as described above, along with the desired portions selected by the user.

Upon being provided with one or multiple folder name data from the control unit 20, for each folder name data the classifying unit 77 generates a first hierarchical level folder to which the folder name indicating the folder name data has been given.

Based on the folder name of one of the first hierarchical level folders, the classifying unit 77 then searches for meaning words including words matching the folder name and meaning words including words resembling the name, within the keyword registration table DT3 within the storage unit 25, using an approximate string matching technique ignoring duplications.

In the event of finding a meaning word corresponding to the folder name in the keyword registration table DT3, the classifying unit 77 reads out the found meaning word from the storage unit 25, and also reads out keyword identification information corresponding to the meaning word.

Also, based on the keyword identification information read out from the storage unit 25, the classifying unit 77 searches for the desired portion identification information corresponding to the keyword identification information within the keyword correlation table DT5 in the storage unit 25.

In the result of having detected desired portion identification information with which the keyword identification information has been correlated in the keyword correlation table DT5 in the storage unit 25, the found desired portion identification information is read out from the storage unit 25.

That is to say, the classifying unit 77 reads out the found desired portion identification information from the storage unit 25 as information indicating the desired portion to be classified in the first hierarchical level folder used for this search.

Also, the classifying unit 77 determines whether or not there is keyword identification information regarding which desired portion identification information is not found within the keyword correlation table DT5 in the storage unit 25 (i.e., keyword identification information of keywords registered in the desired portion registration table DT2).

In the event that there is found to be keyword identification information regarding which desired portion identification information is not found within the keyword correlation table DT5, the classifying unit 77 uses this as information indicating a keyword to be classified in a first hierarchical level folder of the folder name used for the search at this time.

Further at this time, as for meaning words to which tag identification information has been added as well, the classifying unit 77 then searches for meaning words including words matching the folder name and meaning words including words resembling the name, using an approximate string matching technique, ignoring duplications.

In the event of finding a meaning word corresponding to the folder name from the meaning words to which tag identification information has been added, the classifying unit 77 detects the tag identification information added to the meaning word, such that there are no duplications.

The classifying unit 77 then detects the detected tag identification information as being information indicating the related comment to be classified to the first hierarchical level folder used for searching at this time.

Now, the classifying unit 77 counts the number of pieces of desired portion identification information that have been found, the number of pieces of keyword identification information that have been detected, and the number of pieces of tag identification information, thereby calculating the number of classifications of desired portions, keywords, and related comments, as to the first hierarchical level folder.

Also, the classifying unit 77 determines whether or not the number of classifications is equal to or greater than a preselected predetermined number. In the event that the counted number of classifications is less that the predetermined number, the classifying unit 77 generates second hierarchical level folders one hierarchical level below the first hierarchical level folder, so as to be correlated to the first hierarchical level folder.

Also, based on the found desired portion identification information, the classifying unit 77 searches and reads out desired portion registration data including the desired portion identification information within the desired portion registration table DT2 from the storage unit 25.

Further, based on the detected keyword identification information, the classifying unit 77 searches and reads out keyword registration data including keyword identification information within the desired portion registration table DT2 from the storage unit 25.

The classifying unit 77 then stores all desired portion registration data that has been found at this time, in this second hierarchical level folder. Also, the classifying unit 77 also stores all keyword registration data that has been found at this time, in this second hierarchical level folder.

Further, the classifying unit 77 stores all tag identification information that has been found at this time, in this second hierarchical level folder, as well as number of classifications information storing the number of classifications that has been obtained at this time.

Thus, the classifying unit 77 completes classification of the desired portions, keywords, and related comments, as to the first hierarchical level folder of the folder name used for searching at this time.

On the other hand, in the event that the number of classifications is equal to or greater than the predetermined number, at this time the classifying unit 77 separates a word representing one meaning from each of the meaning words found with the folder name, such that there is no duplication.

Also, the classifying unit 77 generates as many second hierarchical level folders as there are those words (words separated from meaning words without duplication) one hierarchical level below the first hierarchical level folder, such that each is correlated with the first hierarchical level folder. Further, the classifying unit 77 gives the words separated from meaning words without duplication as folder names to the second hierarchical level folders.

Now, with regard to folders for classifying the desired portions for example, the user has selected and set beforehand how many hierarchical levels down from the first hierarchical level folder will be used of generating lower-order folders.

For example, at this time, in the event that settings have been made so as to generate as far as third hierarchical level folders, one hierarchical level down from the second hierarchical level folders, the classifying unit 77 searches for meaning words based on the folder name of one of the second hierarchical level folders, in the same way as with the case of the first hierarchical level folder described above.

In the event of finding a meaning word corresponding to the folder name in the keyword registration table DT3 as a result, the classifying unit 77 reads out the found meaning word from the storage unit 25, and also reads out the keyword identification information corresponding to the meaning word.

Also, based on the keyword identification information read out from the storage unit 25, the classifying unit 77 searches for desired portion identification information within the keyword correlation table DT5. In the event of finding desired portion identification information to which the keyword identification information has been correlated, the classifying unit 77 reads out the found desired portion identification information from the storage unit 25.

Also, in the event that there is keyword identification information regarding which desired portion identification information is not found, the classifying unit 77 detects this as information indicating a keyword to be classified in a second hierarchical level folder.

Further, upon finding a meaning word corresponding to the folder name from the meaning words to which tag identification information has been added, the classifying unit 77 detects the tag identification information added to the found meaning word such that there is no duplication with information indicating related comments to be classified to the second hierarchical level folders.

Thus, the classifying unit 77 detects the desired portions, keywords, and related comments to be classified to the second hierarchical level folder of the folder name used this time for searching, based on the searching results of the meaning words in the same way as described above.

In this case as well, the classifying unit 77 counts the number of pieces of desired portion identification information that have been found, the number of pieces of keyword identification information that have been detected, and the number of pieces of tag identification information, thereby calculating the number of classifications of desired portions, keywords, and related comments, as to the second hierarchical level folder.

However, at this time, the classifying unit 77 does not compare the counted number of classifications with the predetermined number, but rather generates third hierarchical level folders, one hierarchical level down from the second hierarchical level folder, in a manner correlated with the second hierarchical level folder.

Based on the found desired portion identification information, the classifying unit 77 searches and reads out desired portion registration data including the desired portion identification information within the desired portion registration table DT2 from the storage unit 25.

Further, based on the detected keyword identification information, the classifying unit 77 searches and reads out keyword registration data including keyword identification information within the desired portion registration table DT2 from the storage unit 25.

The classifying unit 77 then stores all desired portion registration data that has been found at this time, in this third hierarchical level folder, and also stores all keyword registration data that has been found at this time as well.

Further, the classifying unit 77 stores all tag registration data that has been found at this time, in this third hierarchical level folder, as well as number of classifications information storing the number of classifications that has been obtained at this time.

Thus, the classifying unit 77 completes classification of the desired portions, keywords, and related comments, as to the second hierarchical level folder of the folder name used for searching at this time.

Also, the classifying unit 77 processes each of the remaining second hierarchical level folders in the same way, and classifies the desired portions, keywords, and related comments in the second hierarchical level folders.

Further, upon ending the above-described series of processing as to the one first hierarchical level folder, the classifying unit 77 processes the remaining first hierarchical level folders in the same way as above, and classifies the desired portions, keywords, and related comments.

Thus, the classifying unit 77 classifies the desired portions, keywords, and related comments using the meanings of corresponding keywords. Accordingly, in the event that only one keyword is detected from a desired portion, this desired portion is classified in one of the first hierarchical level folders.

However, in the event that multiple keywords have been detected from the desired portion for example, the classifying unit 77 classifies the desired portion in multiple first hierarchical level folders in duplication, in accordance with the meanings of these keywords.

Figure 31:
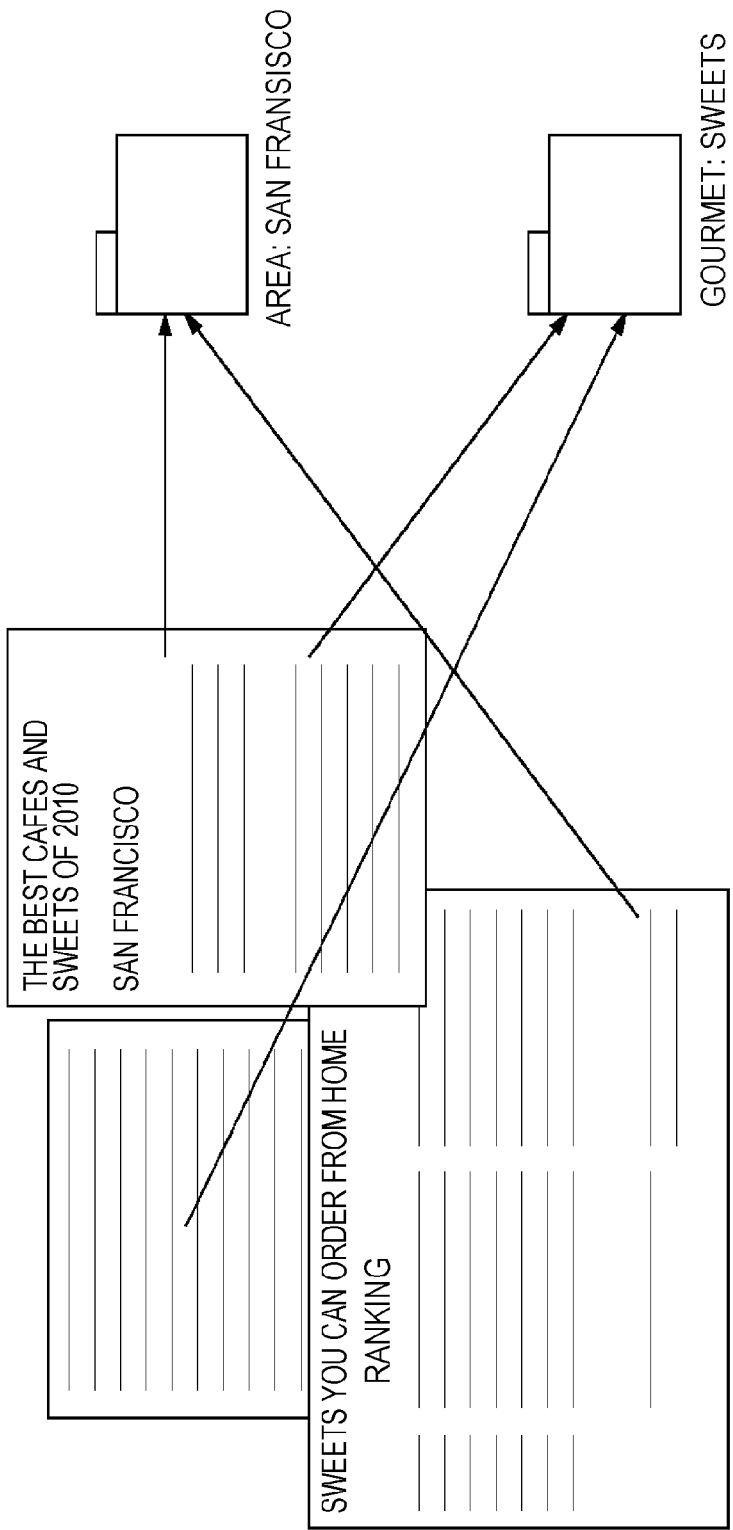
FIG. 31 is a schematic drawing for describing classification of desired portions.

That is to say, as shown in FIG. 31, the classifying unit 77 can group the desired portions together by related contents, without any consideration whatsoever regarding the type of electronic book selected.

Also, with regard to keywords detected from the electronic book as if they were desired portions, the classifying unit 77 can classify the keywords by grouping together those with matching or similar meanings, in accordance with the meanings of the keywords, without any consideration for the electronic books.

Further, with the related comments added to the desired portions, as with the case of the desired portions, the classifying unit 77 can group together those with related contents, without any consideration whatsoever regarding the type of electronic book selected.

Upon classifying the desired portions, keywords, and related comments, as described above, the classifying unit 77 determines whether or not the second hierarchical level folders automatically generated for classification of the desired portions, keywords, and related comments, have been correlated with third hierarchical level folders.

In the event that a second hierarchical level folder is found to have been correlated with one third hierarchical level folder as a result, the number of classifications information stored in the third hierarchical level folder is also stored in the second hierarchical level folder.

Also, in the event that a second hierarchical level folder is found to have been correlated with two or more third hierarchical level folders as a result, the number of classifications indicated by the number of classifications information stored in each of the third hierarchical level folders is counted, and the counted number of classifications is stored in the second hierarchical level folder.

Thus, upon ending storage of the number of classifications information corresponding to the second hierarchical level folder, the classifying unit 77 then detects the number of classifications of the second hierarchical level folders correlated with a first hierarchical level folder.

In the event that a first hierarchical level folder is found to have been correlated with one second hierarchical level folder as a result, the number of classifications information stored in the second hierarchical level folder is also stored in the first hierarchical level folder.

Also, in the event that a first hierarchical level folder is found to have been correlated with two or more second hierarchical level folders as a result, the number of classifications indicated by the number of classifications information stored in each of the second hierarchical level folders is counted, and the counted number of classifications is stored in the first hierarchical level folder.

Thus, the classifying unit 77 can detect the number of classifications of desired portions, keywords, and related comments, classified into the individual first through third hierarchical level folders.

Upon generating the first through third hierarchical level folders as appropriate, and classifying the desired portions, keywords, and related comments, the classifying unit 77 stores the first through third hierarchical level folders generated at this time in the storage unit 25. Accordingly, the classifying unit 77 ends all of the classification of desired portions, keywords, and related comments, and makes notification of the ending to the control unit 20.

Upon notification of ending of the classification of the desired portions, keywords, and related comments is made from the classifying unit 77, the control unit 20 notifies the user by way of the display unit 21 that classification has ended, for example, and that the classification results can be used for searching of the desired portions, keywords, and related comments thereafter.

Now, the control unit 20 performs the classification processing such as described above each time requested by the user. Accordingly, the control unit 20 can newly add or delete first hierarchical level folders, for example, or automatically add second and third hierarchical level folders, so as to re-classify desired portions, keywords, and related comments.

Now, upon being requested for display of the classification results of the desired portions, keywords, and related comments, by the user performing predetermined operations, the control unit 20 reads out all first through third hierarchical level folders from the storage unit 25 in response.

Note that in the following description, in the event that the desired portions, keywords, and related comments, do not have to be distinguished in particular, these will also be collectively referred to simply as "classified information".

The control unit 20 then generates classification result data of the classification results of the classified information, based on the first through third hierarchical level folders, so as to be presentable in order from the classification results of the higher order hierarchical levels sequentially to the lower level classification results.

In actual practice, the control unit 20 extracts the number of classifications information from each of the first hierarchical level folders. Also, the control unit 20 calculates the percentage of the number of classifications of classified information per first hierarchical level folder as to the number of classifications of classified information of all first hierarchical level folders (total number including duplicate classifications of classified information).

Based on the calculation results, the control unit 20 generates first hierarchical level classification result data indicating the percentage of number of classifications as to each first hierarchical level folder, in the form of a pie graph for example, as classification results at the first hierarchical level of classified information, and sends this to the display control unit 26.

Figure 32:
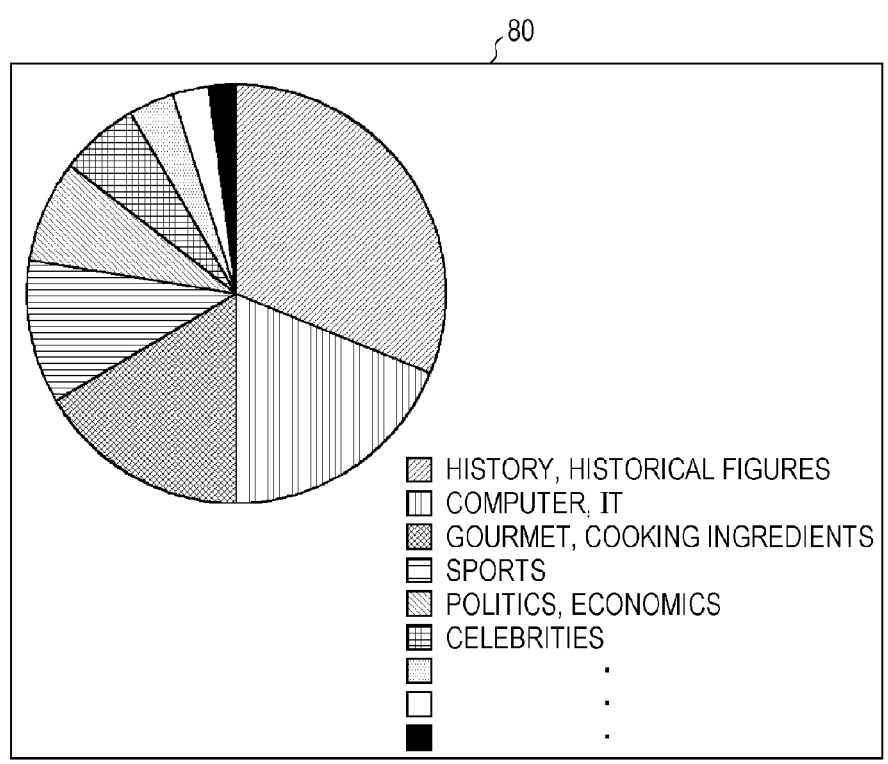
FIG. 32 is a schematic drawing for describing display of a first hierarchical classification results image.

The display control unit 26 sends the first hierarchical level classification result data provided from the control unit 20 at this time to the display unit 21. Accordingly, the display control unit 26 displays a first hierarchical level classification results image 80 such as shown in FIG. 32, based on the first hierarchical level classification result data, on the display unit 21.

The first hierarchical level classification results image 80 shows a pie graph illustrating the number of classifications of the classified information for each first hierarchical level folder, as to the number of classifications of classified information for all first hierarchical level folders.

Thus, the control unit 20 can present the classification results of the classified information as to each first hierarchical level folder by way of the first hierarchical level classification results image 80.

Note however, that in the first hierarchical level classification results image 80, the control unit 20 shows the classification results for each first hierarchical level folder to which a folder name has been given indicating a superordinate concept meaning in the form of the percentage as to the number of classifications of classified information of all first hierarchical level folders, and not as a specific number of classifications.

Accordingly, the control unit 20 can let the user easily recognize and confirm what sort of things the user has shown interest in and by how much, by way of the first hierarchical level classification results image 80.

In the event that the user instructs any first hierarchical level folder as a division region of the pie graph in the first hierarchical level classification results image 80, the control unit 20 detects all second hierarchical level folders correlated with the instructed first hierarchical level folder.

At this time, in the event that multiple second hierarchical level folders are found to be correlated with the instructed first hierarchical level folder as a result, the control unit 20 extracts the number of classifications information from each of these second hierarchical level folders.

Based on the number of classifications information, the control unit 20 calculates the percentage of the number of classifications of classified information per second hierarchical level folder as to the number of classifications of classified information of all second hierarchical level folders (total number including duplicate classifications of classified information), in the same way as with the first hierarchical level folder.

Based on the calculation results, the control unit 20 generates second hierarchical level classification result data indicating the percentage of number of classifications as to each second hierarchical level folder, in the form of a pie graph for example, as classification results at the second hierarchical level of classified information, and sends this to the display control unit 26.

The display control unit 26 displays a second hierarchical level classification results image (not shown) such as the first hierarchical level classification results image 80, on the display unit 21, presenting the classification result for the classified information as to each second hierarchical level folder.

Also, in this case as well, the control unit 20 can let the user recognize and confirm what sort of things the user has shown interest in and by how much, in further detail, by way of the second hierarchical level classification results image.

In this case as well, the control unit 20 allows the user to instruct any second hierarchical level folder as a division region of the pie graph in the second hierarchical level classification results image.

Now, in the event that just one second hierarchical level folder (or third hierarchical level folder) is found to be correlated with the first hierarchical level folder (or second hierarchical level folder) instructed by the user, the control unit 20 extracts data relating to the classified information.

That is to say, in the event that one hierarchical level below the first hierarchical level folder (or second hierarchical level folder) instructed by the user is the lowest hierarchical level, the control unit 20 extracts the desired portion registration data and keyword registration data from the second hierarchical level folder (or third hierarchical level folder) at the bottom hierarchical level.

Then, based on the desired portion registration data and keyword registration data, the control unit 20 generates classified information selection image data for selection of the classified information (desired portions, keywords, and related comments), classified to the second hierarchical level folder (third hierarchical level folder) at the bottom hierarchical level. The control unit 20 then sends the classified information selection image data to the display control unit 26.

At this time, the display control unit 26 sends classified information selection image data provided from the control unit 20 to the display unit 21, so as to display a classified information selection image (not shown) of almost the same configuration of the third hierarchical level index image described above with regard to FIG. 30, for example, on the display unit 21.

Here, the book title of the electronic book including the desired portions and keywords classified to the corresponding second hierarchical level folder (or third hierarchical level folder) is displayed in the classified information selection image.

Also, the page number, and line number and column number of the first character, and so forth, indicating the position of the desired portion or keyword classified to the corresponding second hierarchical level folder (or third hierarchical level folder) is also displayed in the classified information selection image.

Further, in the event that related comments are classified in the corresponding second hierarchical level folder (or third hierarchical level folder), a text string such as "comment 1" or "comment 2" indicating that the comments are classified, for example, is displayed in the classified information selection image.

Upon one of the desired portions in the classified information selection image is instructed as information of a corresponding book title or the like, the control unit 20 reads out the electronic book data including this desired portion from the storage unit 25, based on the desired portion registration data corresponding to the instructed desired portion.

The control unit 20 then sends the electronic book data to the display control unit 26 along with the desired portion registration data. Accordingly, at this time the display control unit 26 displays the electronic book image of the page including the instructed desired portion on the display unit 21 based on the desired portion registration data and electronic book data, and performs highlighted display of the desired portion.

Also, upon any one of the keywords in the classified information selection image is instructed as information such as corresponding book title or the like, the control unit 20 reads out the electronic book data including the keyword from the storage unit 25, based on the keyword recording data corresponding to the instructed keyword.

The control unit 20 then sends the electronic book data to the display control unit 26 along with the keyword registration data. Accordingly, at this time, the display control unit 26 displays the electronic book image of the page including the instructed keyword on the display unit 21 based on the keyword registration data and electronic book data, and also performs highlighted display of the keyword.

Further, in the event that one of the related comments in the classified information selection image is instructed as a corresponding text string such as "comment 1" or the like, the control unit 20 generates comment search request data storing tag identification information correlated to the instructed related comment, and sends this to the searching unit 66.

As a result, in the event that the instructed related comment is provided from the searching unit 66, the control unit 20 sends the related comment to the display control unit 26, accordingly, the display control unit 26 displays the related comment on the display unit 21.

Thus, the control unit 20 can not only present the classification results of classified information, but also search and display classified information using the classification results, so as to be presented to the user.

2-2-5. Introduction Reception Processing

Next, introduction reception processing in which the control unit 20 receives introduction from other users with similar preferences by way of the information sharing device 14 will be described.

The control unit 20 is registered to the information sharing device 14 beforehand as a first user, to share various types of information relating to electronic books with information display terminals 11 and 12 of other users (that is, second users) by way of the information sharing device 14, for example.

In this state, in the event display of an electronic book is requested by the user, each time a desired portion is selected, and in the event of being requested to provide book related data to the information sharing device 14, each time selection of the desired portion ends, the control unit 20 requests the searching unit 66 to search for book related data.

That is to say, each time selection of one desired portion indicated within the text of the electronic book image ends at this time, the control unit 20 requests the searching unit 66 to search for book related data related to that desired portion.

Now, book related data is information including the book registration data and desired portion registration, keyword registration data, tag registration data, related comments, and so forth, generated in accordance with selection of the desired portion.

Upon being provided with the book related data searched from the electronic book by the searching unit 66, the control unit 20 sends the book related data of the electronic book to the transmission unit 23 along with the user registration information used for user registration. Accordingly, the transmission unit 23 sends the book related data and user registration information provided from the control unit 20 to the information sharing device 14 via the network 13.

Figure 33:
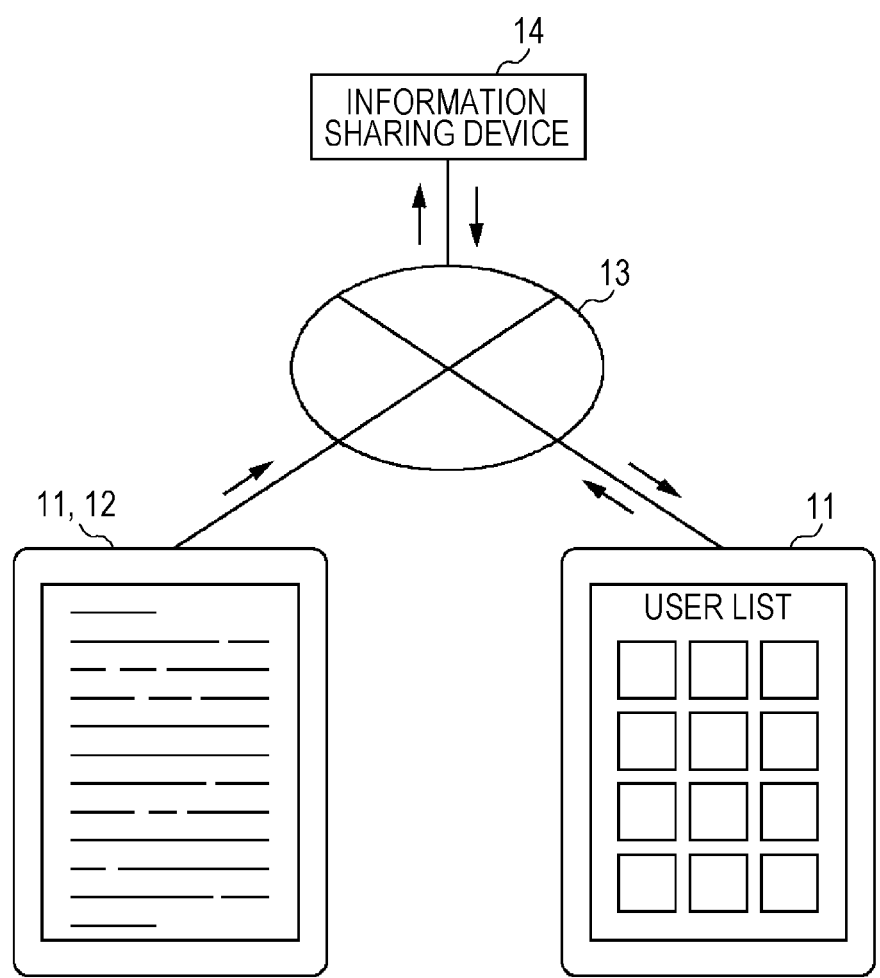
FIG. 33 is a schematic drawing for describing introduction of users with an information sharing device.

Now, as shown in FIG. 33, the information sharing device 14 accumulates book related data and user registration information in a correlated manner, each time book related data and user registration information transmitted from multiple information display terminals 11 and 12 in the same manner is received.

Also, upon being requested to receive introduction of another user with similar preferences as the user from the information sharing device 14, by predetermined user operations, the control unit 20 generates introduction request data requesting introduction of another user, storing registration information used for user registration, and sends this to the transmission unit 23. Accordingly, the transmission unit 23 sends the introduction request data provided from the control unit 20 to the information sharing device 14 via the network 13.

Upon receiving the introduction request data transmitted from the information display terminal 11, the information sharing device 14 extracts the user registration information from the introduction request data that has been received, and also identifies this as being user registration information correlated with the user registration information.

Also, the information sharing device 14 performs collaborative filtering processing using the identified book related data and other multiple book related data accumulated to that point in time.

Accordingly, the information sharing device 14 identifies the user who has made the introduction request at this time (hereinafter also referred to as "introduction requesting user" as appropriate), and other users who have obtained the same electronic book.

The information sharing device 14 narrows down other user from the identified other users who have shown interest in items the same and also similar items as the introduction requesting user (i.e., preferences are similar), who have also obtained other books than the introduction requesting user.

The information sharing device 14 then generates user introduction data indicating the other users who have been narrowed down, and returns the generated user introduction data to the information display terminal 11 of the introduction requesting user via the network 13.

At this time, at the information display terminal 11 of the introduction requesting user, the reception unit 24 receives the user introduction data transmitted from the information sharing device 14 and sends this to the control unit 20.

The control unit 20 then sends the user introduction data to the display control unit 26. Accordingly, the display control unit 26 sends the user introduction data to the display unit 21, and displays an introduced user list image on the display unit 21 based on the user introduction data.

At this time, the introduced user list image displays information (names, nicknames, etc.) of multiple other user introduced from the information sharing device 14 as to the introduction requesting user.

Accordingly, the control unit 20 can present multiple other users introduced from the information sharing device 14 to the introduction requesting user by way of the introduced user list image.

Upon one of the other users being selected as corresponding information from the introduced user list image at this time by the introduction requesting user, the control unit 20 generates other user notification data indicating the selected other user, storing the user registration information of the introduction requesting user.

The control unit 20 then sends the other user notification data to the transmission unit 23. Thus, the transmission unit 23 transmits the other user notification data to the information sharing device 14 via the network 13.

Upon receiving the other user notification data transmitted from the information display terminal 11, the information sharing device 14 identifies the other user and introduction requesting user indicated by the other user notification data.

The information sharing device 14 then generates book introduction data introducing one or multiple electronic books from the electronic books that the other user has obtained by the introduction requesting user has not obtained, based on the book related data for the identified other user and introduction requesting user. The information sharing device 14 then returns the book introduction data to the information display terminal 11 via the network 13.

Accordingly, the reception unit 24 at the information display terminal 11 of the introduction requesting user receives the book introduction data returned from the information sharing device 14 at this time and sends this to the control unit 20.

Upon being provided with book introduction from the reception unit 24, the control unit 20 sends this to the display control unit 26. Accordingly, the display control unit 26 sends the book introduction data to the display unit 21, and displays a book introduction image (not shown) on the display unit 21 based on the book introduction data.

At this time, displayed in the book introduction image are, for each electronic book introduced by the information sharing device 14, book title and publisher of the electronic book, book type, book identification information, and so forth.

Accordingly, the control unit 20 can notify the introduction requesting user of the one or multiple electronic books notified from the information sharing device 14 by way of the book introduction image.

Also, in the event that a desired electronic book is selected from the book introduction image by the user as information of the book title or the like, the control unit 20 obtains book attribute data such as the book title and publisher of the selected electronic book, book type, book identification information, and so forth.

The control unit 20 then stores the book attribute data, and generates obtaining request data requesting obtaining of the selected electronic book and sends this to the transmission unit 23. The transmission unit 23 then transmits the obtaining request data to an information sharing device or electronic book providing device via the network 13.

Upon the electronic book data of the requested electronic book being transmitted from the information sharing device or electronic book providing device via the network 13, the reception unit 24 receives this and sends to the control unit 20.

At this time, upon being provided with electronic book data from the reception unit 24, the control unit 20 sends the electronic book data to the storage unit 25 so as to be stored. Thus, the control unit 20 can use the book introduction image to obtain new electronic books.

Note that when display of the electronic book is requested by the user for example, the control unit 20 can request the information sharing device 14 to provide the book related data in accordance with ending of display of the electronic book.

In this case, the control unit 20 requests the searching unit 66 to search for the electronic book data for each desired portion selected while displaying the electronic book in batch fashion, in accordance with ending of the display of the electronic book.

The control unit 20 transmits book related data relating to all desired portions selected while displaying the electronic book, to the information sharing device 14 via the transmission unit 23. Thus, the control unit 20 can transmit a certain amount of book related data relating to the desired to the information sharing device 14 portion in batch fashion so as to be accumulated.

2-2-6. Introduction Sharing Processing

Next, information sharing processing wherein various types of information relating to an electronic book are shared with other user information display terminals 11 and 12 by the control unit 20 using the information sharing device 14 will be described.

Upon a user requesting obtaining of information relating to a desired portion selected by another user in an electronic book regarding which a desired portion has been selected, the control unit 20 generates desired portion information request data requesting information relating to the desired portion, storing the book identification information of the electronic book along with the user registration information. Note that in the following description, information relating to a desired portion will also be referred to as "desired portion information".

The control unit 20 then sends the desired portion information request data to the transmission unit 23. Thus, the transmission unit 23 transmits the desired portion information request data to the information sharing device 14 via the network 13.

At this time, upon receiving the desired portion information request data, the information sharing device 14 extracts the book identification information and user registration information stored in that desired portion information request data.

Also, the information sharing device 14 identifies the book related data of other users based on the book identification information and user registration information, and further identifies, out of the identified book related data, one or multiple book related data of an electronic book identified by the book identification information.

The information sharing device 14 then returns the ultimately determined one or multiple book related data to the information display terminal 11 via the network 13.

At this time, at the information display terminal 11 the reception unit 24 receives the one or multiple book related data transmitted from the information sharing device 14 and sends this to the control unit 20. Upon being provided with the one or multiple book related data from the reception unit 24, the control unit 20 extracts the desired portion registration data and book identification information from one of the book related data.

Also, the control unit 20 extracts the page number and desired portion position information indicating the position in the full text of the book of one of the one or multiple desired portions in the desired portion registration data. Further, the control unit 20 generates highlighted display control data to effect control so as to perform highlighted display of the desired portion based on the desired portion position information.

The control unit 20 then reads out corresponding electronic book data from the storage unit 25 based on the book identification information, and also sends the book identification information that has been read out to the display control unit 26 along with the page number and highlighted display control data thereof.

Upon being provided with the electronic book data long with the page number and highlighted display control data thereof from the control unit 20, the display control unit 26 generates electronic book image data based on the electronic book data. Also, the display control unit 26 modifies the electronic book image data based on the highlighted display control data and sends to the display unit 21.

Accordingly, the display control unit 26 displays an electronic book image based on the electronic book image data on the display unit 21, and also performs highlighted display of the desired portions in the text of the electronic book image selected by another user.

Thus, the control unit 20 can present the user with desired portions selected by other users by the electronic book image. Also, upon a desired portion in the electronic book image being instructed at this time, the control unit 20 displays a tag over the electronic book image in the same way as described above.

Further, upon a tag on the electronic book image being instructed, the control unit 20 also displays related comments (i.e., related comments input by the other user) added to that tag, and so forth.

Further, the control unit 20 can perform highlighted display of other desired portions selected by other users in the same way, in response to switching of the display of the electronic book image (switching of pages), and can also display tags and related comments.

Thus, the control unit 20 can tell the user what desired portions other users are selecting in the electronic book in which the user has selected a desired portion.

Particularly, at this time, if the information sharing device 14 has accumulated book related data relating to the same electronic book which has been translated into various languages, and if recognizable that these are of the same book, the control unit 20 can make notification of the perspectives and the like of readers from other countries with other languages.

Now, the control unit 20 can enable selection of a desired portion in an electronic book image to be communicated and reflected among an own information display terminal 12 and one or multiple other information display terminals 11 and 12, which have obtained the same electronic book.

In this case, the control unit 20 sets the address of the one or multiple other information display terminals 11 and 12 which are to be the other party of communication at this time, in accordance with predetermined operations of the user.

Also, the control unit 20 reads out electronic book data from the storage unit 25 which is the same as the electronic book displayed on the information display terminals 11 and 12 which are to be the other party of communication, and sends this to the display control unit 26.

Accordingly, the display control unit 26 generates electronic book image data based on the electronic book data, and sends the generated electronic book image to the display unit 21, thereby displaying the electronic book image on the display unit 21.

In the event that a desired portion is instructed on the electronic book image in this state, the control unit 20 performs the series of identifying and registering desired portions from instruction-estimated portions, detecting of keywords and generating of tags, registration of these and correlation thereof, and so froth, in the same way as described above in cooperation with the circuit portions.

Upon such a series of processing ending, the control unit 20 searches and acquires book related data relating to the desired portion selected at that time, by way of the searching unit 66. The control unit 20 then sends the book related data to the transmission unit 23.

At this time, the transmission unit 23 adds the addresses of the other information display terminals 11 and 12 set earlier, to the book related data provided from the control unit 20. The transmission unit 23 transmits the book related data to which the addresses have been added to the information sharing device 14 via the network 13, along with the user registration information.

At this time, the information sharing device 14 receives the book related data and user registration information transmitted from the information display terminal 11, and also transmits this book related data to the other information display terminals 11 and 12, following the addresses added thereto.

Thus, the control unit 20 can notify the other information display terminals 11 and 12 of the desired portion selected by the user, and also the other keywords and tags and the like related to this desired portion, by the book related data.

On the other hand, upon book related data being transmitted from the information display terminals 11 and 12 via the information sharing device 14 in accordance with selection of the desired portion by another user, the reception unit 24 receives this and sends to the control unit 20.

Upon being provided with book related data from the reception unit 24, the control unit 20 determines whether or not the page of the electronic book image currently displayed on the display unit 21 and the page of the electronic book image from which the desired portion has been selected by another user match, based on the book related data.

As a result, in the event that the page of the electronic book image currently displayed on the display unit 21 and the page of the electronic book image from which the desired portion has been selected by another user match, the control unit 20 generates highlighted display control data for performing highlighted display of the desired portion based on the book related data. The control unit 20 then sends the highlighted display control data to the display control unit 26.

Accordingly, the display control unit 26 performs highlighted display of the desired portion selected by the other user in the electronic book image currently being displayed on the display unit 21.

Also, at this time, upon the desired portion selected by another user being instructed on the electronic book image, the control unit 20 displays a tag on the electronic book image in the same way as described above.

Further, upon a tag being instructed on the electronic book image, the control unit 20 also displays related comments and the like added to that tag (i.e., related comments input by the other user).

That is to say, even if the page of the electronic book image currently being displayed on the display unit 21 and the page of the electronic book image regarding which the other user has selected a desired portion differ, the control unit 20 performs the same determination processing at the time of switching the electronic book image to be displayed.

Accordingly, in the event of displaying the same electronic book image on the display unit 21 as the electronic book image regarding which the other user has selected a desired portion, the control unit 20 performs highlighted display of the desired portion.

Figure 34:
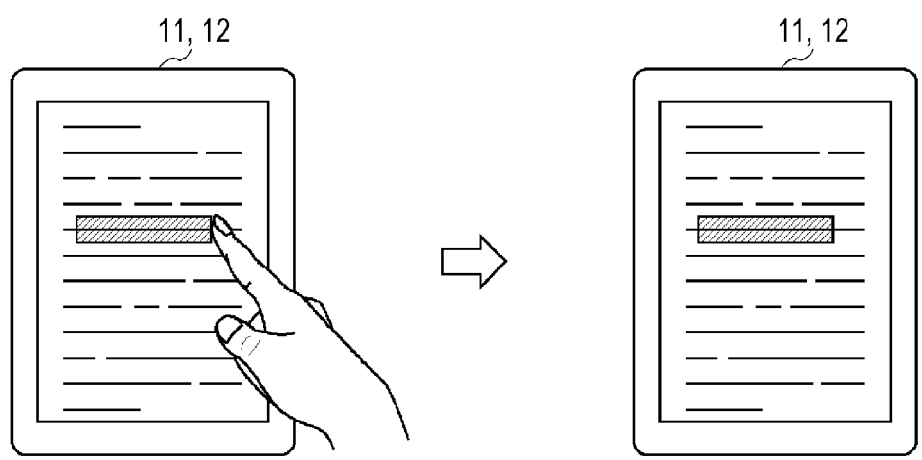
FIG. 34 is a schematic drawing for describing reflecting selection of a desired portion among information display terminals.

Thus, as shown in FIG. 34, the control unit 20 can reflect selection of desired portions in electronic book images of the same electronic book at the own information display terminal 12 and other one or multiple information display terminals 11 and 12 in almost real-time.

The control unit 20 allows the function to be used of mutually reflecting such desired portions at the time of displaying an electronic book which is a learning material, thereby enabling teaching each other of how to study or differences in perspectives and the like, thereby fully making use of the functions.

Now, upon obtaining book related data from the information sharing device 14 or other information display terminals 11 or 12 as described above, the control unit 20 stores the book related data in the storage unit 25.

Accordingly, after storing the book related data in the storage unit 25, in the event that a desired portion is selected by another user in the text of the electronic book image, the control unit 20 can perform highlighted display of the desired portion based on the book related data.

However, in the event that a predetermined portion exists in the text of one electronic book image, regarding which both the user and another user have selected, the control unit 20 simply performing highlighted display of these may make it difficult to distinguish who has selected the desired portion.

Accordingly, in the event that display of a highlighted display menu image is requested by the user by a predetermined operation in the state of the electronic book image displayed, the control unit 20 reads out highlighted display menu image data stored beforehand from the storage unit 25 and sends this to the display control unit 26.

Figure 35:
FIG. 35 is a schematic drawing for describing display of an display-display menu image.

The display control unit 26 then synthesizes the highlighted display menu image data provided from the control unit 20 with the electronic book image data generated at that time, and sends to the display unit 21. Thus, as shown in FIG. 35, a highlighted display menu image 82 is displayed superimposed on a portion of the electronic book image 81 on the display unit 21, as shown in FIG. 35.

In this case, the highlighted display menu image 82 is provided with various buttons of classifying the desired portion based on attributes of the desired portion and changing the display state of the highlighted display of the desired portion according to the classification thereof.

That is to say, the highlighted display menu image 82 is provided with an automatically-generated tag usage changing button 83 for classifying desired portions regarding which automatically generated tags have been added by the tags, so as to change the display state of highlighted display by each tag.

Also provided to the highlighted display menu image 82 is a user-set tag usage changing button 84 for classifying desired portions regarding which user-selected tags have been added by the tags, so as to change the display state of highlighted display by each tag.

Further provided to the highlighted display menu image 82 is a person usage changing button 85 for classifying the desired portions by the person who has selected the desired portion and changing the display state of highlighted display by each person.

Moreover provided to the highlighted display menu image 82 is a importance usage changing button 86 for classifying the desired portions by importance, and changing the display state of the highlighted display in accordance with the importance thereof.

Accordingly, in the event that the user instructs the person usage changing button 85 within the highlighted display menu image 82 by a tapping operation, the control unit 20 classifies the desired portions throughout the electronic book which is the object of display at this time, by the person who has made the selection thereof. The control unit 20 then performs settings so as to change the display state of the highlighted display of the desired portions for each person.

Accordingly, even in the event that desired portions selected by the user and desired portions selected by other users coexist within the electronic book image 81 being displayed, the control unit 20 can allow these to be easily distinguished.

Also, in the event that the user instructs the automatically-generated tag usage changing button 83 within the highlighted display menu image 82 by a tapping operation, the control unit 20 classifies the desired portions throughout the electronic book which is the object of display at this time, by the meanings of the automatically generated tags. The control unit 20 then performs settings so as to change the display state of the highlighted display of the desired portions for meaning indicated by the tags.

Accordingly, even in the event that desired portions with different tags added coexist within the electronic book image 81 being displayed, the control unit 20 can allow these to be easily distinguished.

Also, in the event that the user instructs the user-set tag usage changing button 84 within the highlighted display menu image 82 by a tapping operation, the control unit 20 classifies the desired portions throughout the electronic book which is the object of display at this time, by the types of the tags selected by user (study, small tips, etc.). The control unit 20 then performs settings so as to change the display state of the highlighted display of the desired portions for meaning indicated by the tags.

However, with regard to desired portions to which the user has selected not tags, the control unit 20 performs highlighted display of such portions so as to be different in the display state from any of the desired portions to which tags selected by the user have been added.

Accordingly, even in the event that desired portions added with different tags optionally selected by the user coexist within the electronic book image 81 being displayed, the control unit 20 can allow these to be easily distinguished.

Further, in the event that the user instructs importance usage changing button 86 within the highlighted display menu image 82 by a tapping operation, the control unit 20 detects the appearance frequency of keywords matching keywords included in the desired portion within the full text of the book.

The control unit 20 also detects the number of related book searched by keywords included in the desired portion at this time. Further, the control unit 20 also detects the number of keywords included in the desired portion.

Moreover, the control unit 20 calculates importance of each desired portion (i.e., a value serving as an indicator indicating what the degree of importance this has in the user reading and understanding the electronic book), based on the detection results of each desired portion.

The control unit 20 then classifies the desired portions by the importance thereof, and performs settings such that the display state of the highlighted display is changed by degree of importance for each desired portion.

Accordingly, in the event that multiple desired portions coexist in the electronic book image 81 being displayed, how important each of the desired portions is in the user reading and understanding the electronic book can be easily distinguished.

Incidentally, in the event that the importance usage changing button 86 is instructed by the user, the control unit 20 reads out relation notification image data indicating the relation between the degree of importance and the display state, stored in the storage unit 25 beforehand, and sends this to the display control unit 26.

Upon being provided with the relation notification image data from the control unit 20, the display control unit 26 synthesizes the relation notification image data along with the highlighted display menu image data on the electronic book image data, and sends this to the display unit 21.

Figure 36:
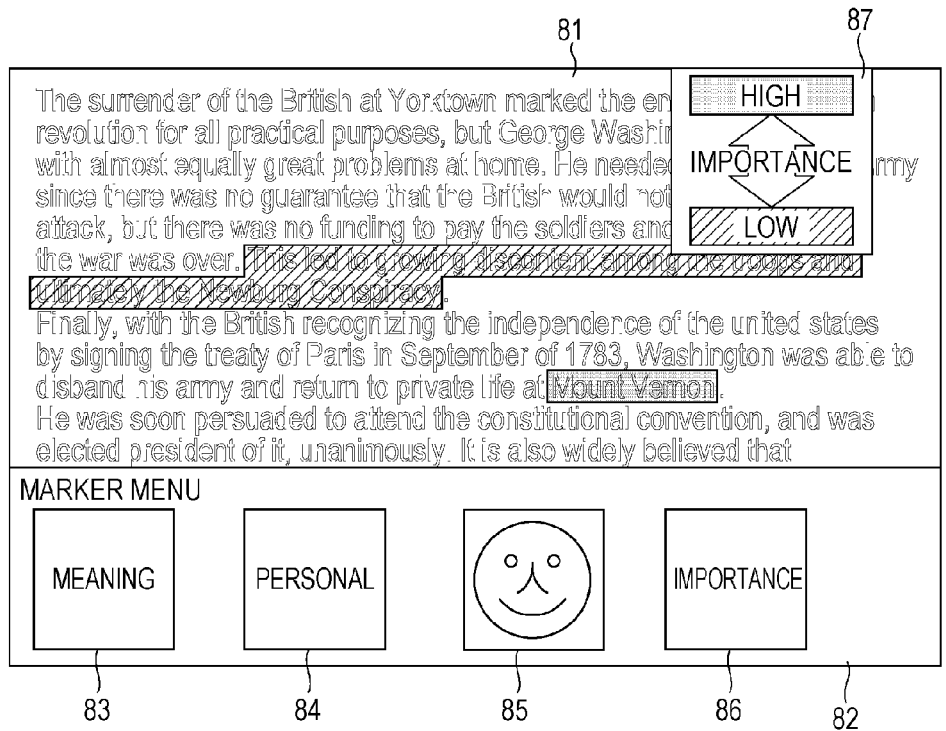
FIG. 36 is a schematic drawing for describing display of a relation notifying image.

Accordingly, as shown in FIG. 36, the display control unit 26 superimposes the highlighted display menu image 82 on a portion of the electronic book image 81 at the display unit 21, and also superimposes a relation notification image 87 on another part of the electronic book image 81.

Accordingly, the control unit 20 can cause accurate recognition of which desired portion has high importance, and which desired portion has low importance, by this relation notification image at this time.

Now, in the event of being requested by the user to generate a test problem based on the desired portion, in the state of the display state of the highlighted display being changed in accordance with the desired portion for example, the control unit 20 detects the score of keywords included in the desired portions for each desired portion by way of the searching unit 66.

Also, the control unit 20 identifies keywords with a score equal to or above a predetermined score that has been set beforehand. Note that in the following description, the identified keywords will also be referred to as "identified keywords".

The control unit 20 then generates concealing data for concealing the identified keyword in each desired portion with a particular text string indicating that this is a test problem in which the identified keyword is to be answered.

Also, the control unit 20 compares the degree of importance of the desired portion with a pre-selected predetermined value. In the event of detecting a desired portion regarding which the degree of importance is equal to or higher than the predetermined value (the degree of importance is high) as a result thereof, the control unit 20 selects one or more words similar to at least a part of the identified keyword of the detected desired portion, based on word dictionary data stored in the storage unit 25 beforehand.

The control unit 20 also generates a text string in which at least part of the identified keyword has been replaced with the selected word. Further, the control unit 20 generates choice presentation image data indicating choices including the identified keyword, and one or multiple text strings in which at least part of the identified keyword has been replaced with another word.

Upon generating concealing data and choice presentation image data for the test problem in this way, the control unit 20 sends these to the display control unit 26 along with position information indicating the placement position within the text and the display position on the electronic book image thereof, to the display control unit 26.

Upon being provided with the concealing data and choice presentation image data for the test problem along with the position information from the control unit 20, the display control unit 26 modifies the electronic book image based on the concealing data, presentation image data, and position information, and sends this to the display unit 21.

Figure 37:
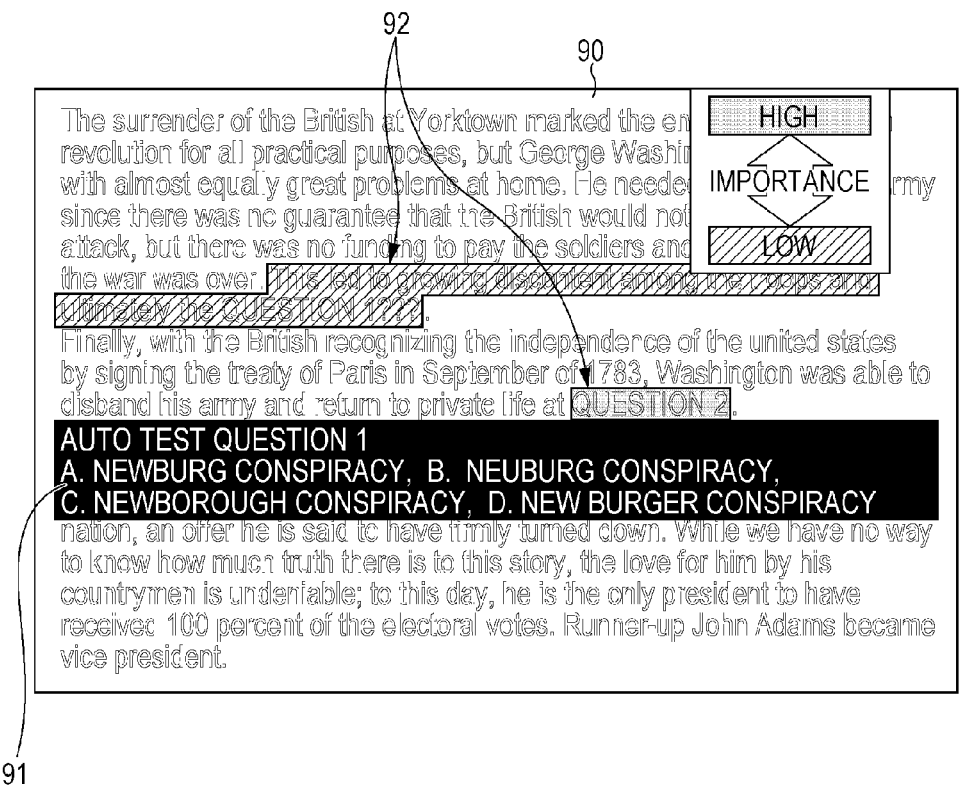
FIG. 37 is a schematic drawing for describing display of a test question generated according to importance of a desired portion.

Accordingly, along with displaying an electronic book image 90 modified for a test problem such as shown in FIG. 37 on the display unit 21, the display control unit 26 displays a choice presentation image 91 on a predetermined position on the electronic book image 90.

Now, in order to have an identified keyword at a desired portion answered for example, the selecting unit electronic book image 90 modified for the test problem has the identified keyword concealed with a text string 92 such as "QUESTION 1??", indicating a test problem.

Also, a choice presentation image 91 for selecting the identified keyword for the desired portion from multiple choices is superimposed on the electronic book image 90 modified for the test problem, near the desired portion with high importance, for example.

Thus, the control unit 20 can use the electronic book image 90 to automatically generate test problems to be presented to the user and the test problems solved by the user. Particularly, by the control unit 20 carrying out the test problem automatic generating function for automatically generating and presenting such test problems at the time of displaying an electronic book which is a learning material, the function can be fully taken advantage of.

Now, in the event that the user has permitted display of advertisements at the time of displaying an electronic book image including a desired portion in the text for example, the control unit 20 searches for keywords included in the desired portion by way of the searching unit 66, and reads these out from the storage unit 25.

The control unit 20 then generates advertisement request data storing the keywords and requesting advertisements, which is sent to the transmission unit 23. At this time, the transmission unit 23 transmits the advertisement request data provided from the control unit 20 to an advertisement presenting device (not shown) via the network 13.

Now, the advertisement presenting device stores multiple types of advertisement image data in a manner correlated with keywords each representing the contents of the advertisements. Accordingly, upon receiving the advertisement request data transmitted from the information display terminal 11, the advertisement presenting device selects advertisement image data corresponding to the keyword from multiple advertisement image data, based on the keywords stored in the advertisement request data. The advertisement presentation data then returns the selected advertisement image data to the information display terminal 11 via the network 13.

At this time, at the information display terminal 11 the reception unit 24 receives advertisement image data transmitted from the advertisement presenting device and sends this to the control unit 20. Upon being provided with the advertisement image data from the reception unit 24, the control unit 20 sends the advertisement image data to the display control unit 26.

Accordingly, the display control unit 26 synthesizes the advertisement image data provided from the control unit 20 with the electronic book image and thus displays an advertisement image based on the advertisement image data on a portion of the electronic book image at the display unit 21 in a superimposed manner.

Thus, the control unit 20 can present the user with advertisements relating to the desired portion by way of advertisement images on the electronic book image, in cooperation with an advertisement presenting device.

Figure 38:
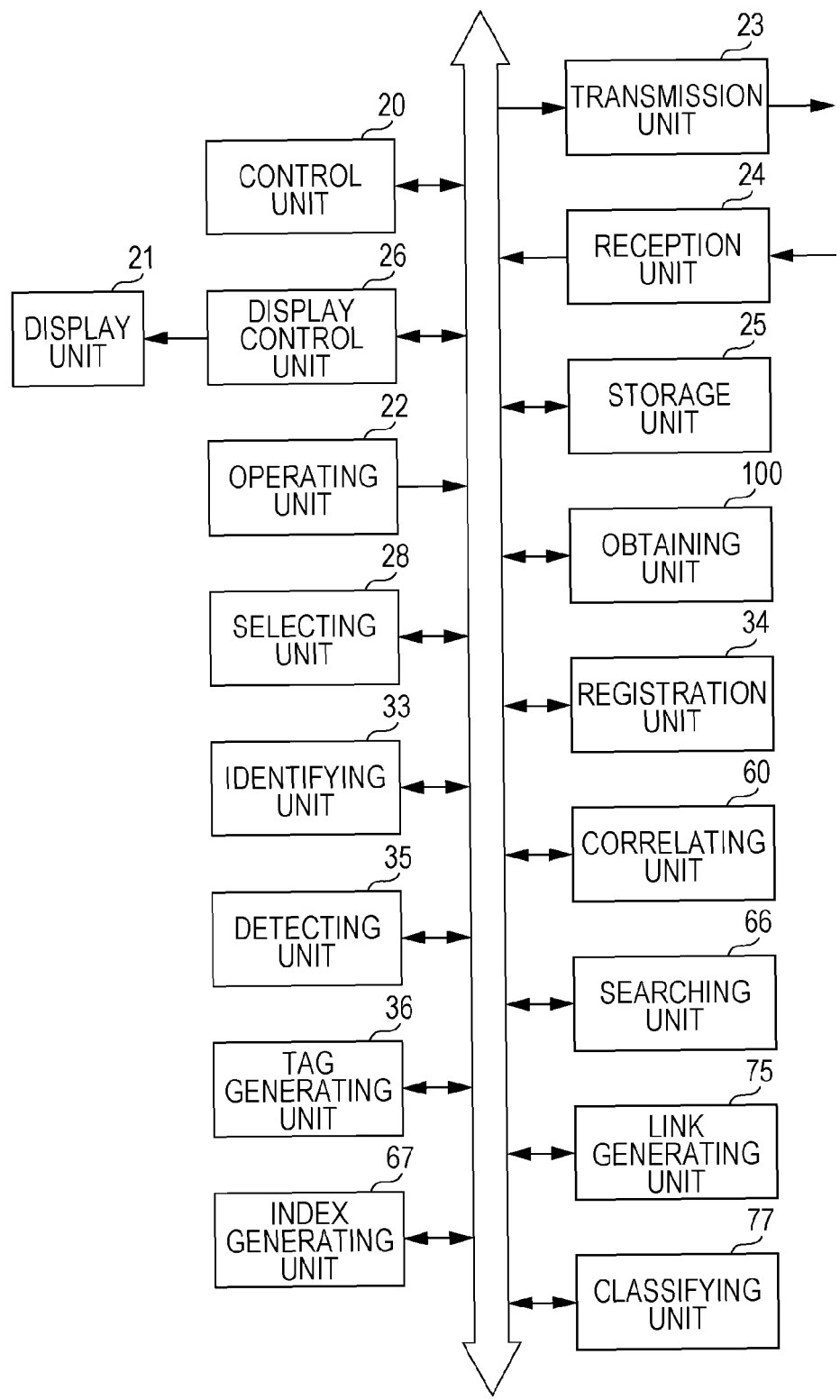
FIG. 38 is a block diagram illustrating a circuit configuration according to a function circuit block of an information display terminal.

2-3. Hardware Configuration According to Other Information Display Terminal Function Circuit Block Next, description will be made regarding a hardware configuration according to a function circuit block of the other information display terminal 12 of the two types of information display terminals 11 and 12, with reference to FIG. 38 shown by appending the same reference numeral to a portion corresponding to FIG. 3.

The information display terminal 12 is configured in the same way as with the above one information display terminal 11 except that no natural language processing block is provided, and the configuration of the obtaining unit 100 differs accordingly.

In this case, upon instruction-estimated portion data to be analyzed being provided from the selecting unit 28 along with book attribute data, the obtaining unit 100 temporarily holds these. Also, at this time, the obtaining unit 100 stores the instruction-estimated portion data to be analyzed, generates analysis request data for requesting analyzing of this instruction-estimated portion data from the information sharing device 14, and sends to the transmission unit 23.

Accordingly, the transmission unit 23 transmits the analysis result data provided from the obtaining unit 100 to the information sharing device 14 via the network 13. At this time, upon receiving the analysis request data transmitted from the information display terminal 12, the information sharing device 14 subjects instruction-estimated portion data stored in the analysis request data to natural language processing, and analyzes this in the same way as with the above natural language processing block 30.

The information sharing device 14 then returns estimated portion analysis result data indicating the analysis result of the instruction-estimated portion data thereof to the information display terminal 12 via the network 13. Accordingly, at this time, the reception unit 24 receives the estimated portion analysis result data transmitted from the information sharing device 14, and sends this received estimated portion analysis result data to the obtaining unit 100.

Upon the estimated portion analysis result data being provided from the reception unit 24, the obtaining unit 100 sends this estimated portion analysis result data to the identifying unit 33 along with the temporarily held instruction-estimated portion data and book attribute data.

In this way, the obtaining unit 100 executes basically the same processing as with the above obtaining unit 29 of the information display terminal 11 except for performing processing so as to request analysis of the instruction-estimated portion data to be analyzed and all of the text data from the information sharing device 14.

2-4. Hardware Configuration According to Function Circuit Block of Information Sharing Device Next, description will be made regarding a hardware configuration according to a function circuit block of the information sharing device 14, with reference to FIG. 39.

Figure 39:
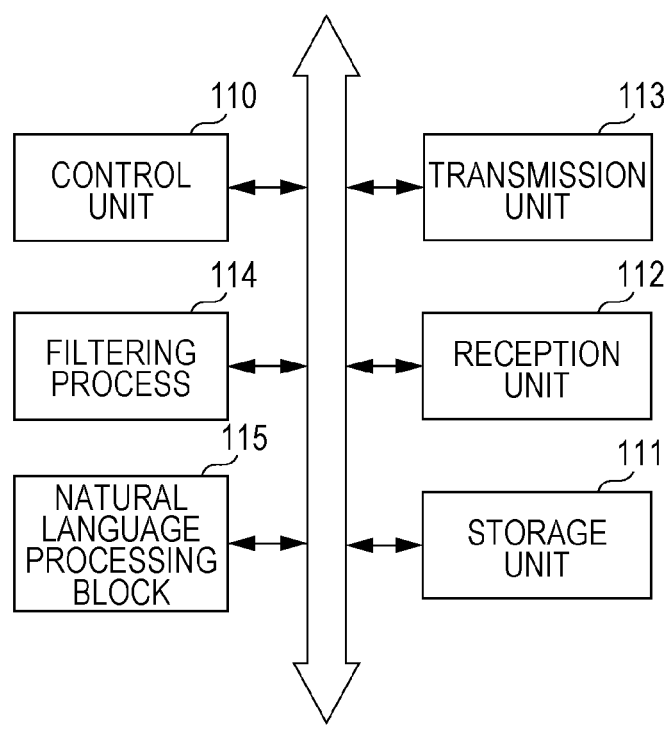
FIG. 39 is a block diagram illustrating a circuit configuration according to a function circuit block of an information sharing device.

As shown in FIG. 39, the other information sharing device 14 includes a control unit 110 for controlling the entirety information sharing device 14. Also, the information sharing device 14 includes a storage unit 111, and the electronic book data of multiple electronic books is stored in this storage unit 111, for example.

Note that the control unit 110 transmits user registration information, such as the name and nickname of a user who requests user registration, the addresses of the information display terminals 11 and 12 which this user uses, and so forth, to the storage unit 111, and stores therein, thereby performing user registration of this user. Thus, the control unit 110 allows the registered user to use the information sharing device 14.

In this state, upon obtaining request data being transmitted from the information display terminals 11 and 12 via the network 13, the reception unit 112 receives the obtaining request data thereof and sends to the control unit 110.

Upon the obtaining request data being provided from the reception unit 112, the control unit 110 reads out the electronic book data of an electronic book requested by the user from the storage unit 111, and also sends this readout electronic book data to a transmission unit 113.

The transmission unit 113 transmits the electronic book data provided from the control unit 110 to the information display terminals 11 and 12 which have requested obtaining of the electronic book, via the network 13. Thus, the control unit 110 can provide the electronic book data to the information display terminals 11 and 12.

Also, upon book-related data and user registration information being transmitted from the information display terminals 11 and 12 via the network 13, the reception unit 112 receives the book-related data and user registration information thereof, and sends to the control unit 110.

At this time, the control unit 110 sends the book-related data and user registration information provided from the reception unit 112 to the storage unit 111, thereby storing book-related data and user registration information in this storage unit 111 in a correlated manner.

In this way, the control unit 110 accumulates information relating to a desired portion selected within the text of an electronic book by each of multiple users, and various types of information relating to this electronic book as book-related data in a state manageable for each user.

Further, upon introduction request data being transmitted from the information display terminals 11 and 12 via the network 13, the reception unit 112 receives the introduction request data thereof, and sends to a filtering processing unit 114 via the control unit 110.

Upon the introduction request data being provided from the reception unit 112, the filtering processing unit 114 extracts user registration information from this introduction request data. The filtering processing unit 114 then reads out book-related data correlated with the user registration information thereof (i.e., of the introduction requesting user) from the storage unit 111.

Also, the filtering processing unit 114 reads out the book-related data of another user different from the introduction requesting user that the user registration information thereof indicates from the storage unit 111. The filtering processing unit 114 then executes collaborative filtering processing using the book-related data of the introduction requesting user, and the electronic book data of another user.

Thus, the filtering processing unit 114 identifies the other user who obtained the same electronic book as with the introduction requesting user. Also, the filtering processing unit 114 narrows down from the determined other users thereof the other users who have preference similar to the preference of the introduction requesting user, and also obtained an electronic book different from the electronic book of the introduction requesting user.

The filtering processing unit 114 then generates user introduction data indicating the narrowed-down other users thereof, and sends the generated user introduction data to the transmission unit 113. Accordingly, the transmission unit 113 transmits the user introduction data thereof to the information display terminals 11 and 12 of the introduction requesting user via the network 13. Thus, the filtering processing unit 114 can introduce another user having similar preference to the introduction requesting user.

Also, upon other user notification data being transmitted from the information display terminals 11 and 12 via the network 13, the reception unit 112 receives the other user notification data thereof, and sends to the filtering processing unit 114 via the control unit 110.

Upon the other user notification data being provided from the reception unit 112, the filtering processing unit 114 identifies the other user that this other user notification data indicates with the introduction requesting user. Also, the filtering processing unit 114 reads out book-related data between the determined other user and the introduction requesting user from the storage unit 111.

The filtering processing unit 114 then generates, based on the book-related data between the determined other user and the introduction requesting user, book introduction data for introducing single or multiple electronic books which the introduction requesting user has not obtained out of the electronic books which this other user has obtained.

The filtering processing unit 114 then sends the book introduction data thereof to the transmission unit 113. Thus, the transmission unit 113 transmits the book introduction data thereof to the information display terminals 11 and 12 of the introduction requesting user via the network 13.

Thus, the filtering processing unit 114 can introduce to the introduction requesting user an electronic book which this introduction requesting user has not obtained but another user having similar preference has obtained.

Further, upon desired portion information request data being transmitted from the information display terminals 11 and 12 via the network 13, the reception unit 112 receives the desired portion information request data thereof, and transmits to the control unit 110.

Upon the desired portion information request data being provided from the reception unit 112, the control unit 110 extracts book identification information and user registration information stored in this desired portion information request data.

Also, based on the book identification information and user registration information thereof, the control unit 110 searches and reads out one or multiple book-related data of the electronic book identified by the book identification information thereof out of the book-related data of the other user, from the storage unit 111. The control unit 110 then sends the single or plurality of book-related data thereof to the transmission unit 113.

The transmission unit 113 transmits the signal or plurality of book-related data provided from the control unit 110 to the information display terminals 11 and 12 via the network 13. Thus, the control unit 110 can notify the user how another user selects a desired portion from the electronic book where the user herself/himself has selected a desired portion.

Now, in the event that the book-related data has been received by the reception unit 112, the control unit 110 stores and accumulates this book-related data in the storage unit 111 as described above, but in the event that an address has been added to the book-related data thereof, also sends this book-related data to the transmission unit 113.

At this time, the transmission unit 113 transmits the book-related data provided from the control unit 110, in accordance with an address added to this data, to the information display terminals 11 and 12 that this address indicates, via the network 13.

Thus, in the event that a desired portion has been selected among users between the multiple information display terminals 11 and 12, the control unit 20 can reflect the desired portion selection thereof for sharing.

In FIG. 39, information sharing device 14 may also include natural language processing block 115. In an exemplary embodiment, natural language processing block 115 may have a functionality similar to that describe above in reference to natural language processing block 30 of FIG. 3.

2-5. Highlighted Display Processing Procedures

Next, description will be made regarding highlighted display processing procedures RT1 wherein the control units 20 of the information display terminals 11 and 12 display, in accordance with selection of a desired portion within the text of an electronic book, this desired portion in a highlighted manner, with reference to FIGS. 40 through 45.

Figure 40:
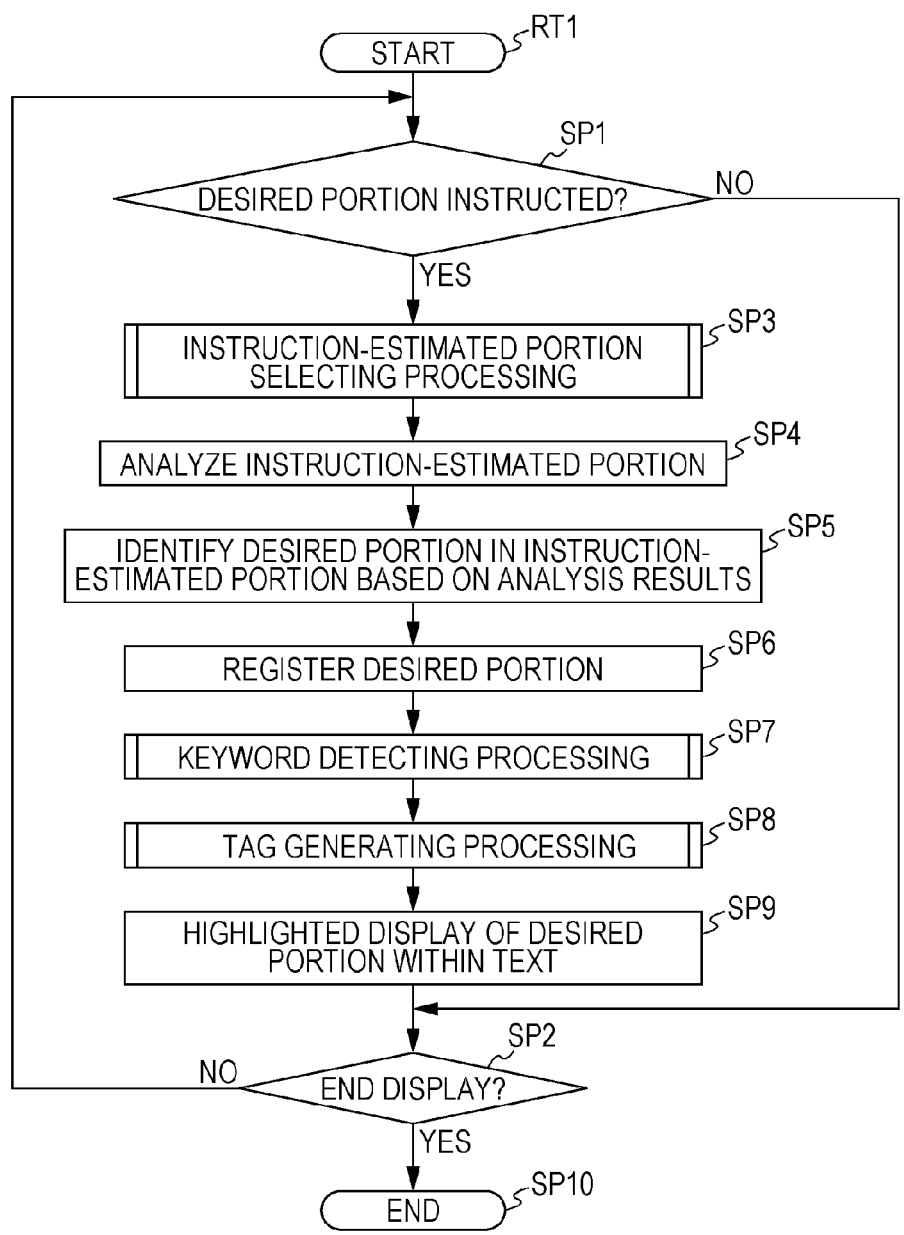
FIG. 40 is a flowchart illustrating highlighted display processing procedures.

For example, upon displaying an electronic book image on the display unit 21 in accordance with the display request of an electronic book, the control unit 20 starts the highlighted display processing procedures RT1 shown in FIG. 40 along with each circuit unit.

Upon starting the highlighted display processing procedures RT1, the control unit 20 determines whether or not a desired portion has been instructed within the text of the electronic book image being displayed on the display unit 21.

A negative result being obtained in this step SP1 means that the text of the electronic book image is being read by the user, for example. Upon obtaining such a negative result in this step SP1, the control unit 20 proceeds to step SP2.

In step SP2, the control unit 20 determines whether to end display of the electronic book. In the event that a negative result has been obtained in this step SP2, this means that the text of the electronic book image is still being read by the user, for example. Upon obtaining such a negative result in step SP2, the control unit 20 returns to step SP1.

Thus, the control unit 20 cyclically repeatedly executes the processing in steps SP1 and SP2 while the electronic book image is displayed. The control unit 20 then awaits that, with the electronic book image being displayed, a desired portion within the text has been specified, and also that display of the electronic book is requested to be completed.

Now, a positive result being obtained in step SP1 means that the user who is reading the text of the electronic book being displayed has specified a desired portion of interest by a sliding operation.

Upon such a positive result being obtained in step SP1, the control unit 20 generates region-correlated text data based on the electronic book data, and sends this generated region-correlated text data to the selecting unit 28 along with the determination result of the type of the sliding operation, and touch position information.

Accordingly, in step SP3, the selecting unit 28 executes instruction-estimated portion selection processing for selecting an instruction-estimated portion specified by the user from the text of an electronic book that the region-correlated text data indicates based on the determination result of the type of the sliding operation, and the touch position information.

Thus, the selecting unit 28 selects an instruction-estimated portion from the text, generates instruction-estimated portion data indicating the selected result thereof, and also sends this generated instruction-estimated portion data to the obtaining unit 29.

Next, in step SP4, the obtaining unit 29 uses the natural language processing block 30 or information sharing device 14 to obtain the analysis result by the natural language processing of the instruction-estimated portion data as estimated portion analysis result data, and transmits to the identifying unit 33.

Next, in step SP5, the identifying unit 33 identifies, based on the analysis result of the instruction-estimated portion obtained based on the estimated portion analysis result data, a desired portion in this instruction-estimated portion.

Also, the identifying unit 33 generates desired potion data indicting the determined desired portion thereof, and also generates desired portion analysis result data indicating the analysis result of the desired portion based on the estimated portion analysis result data.

The identifying unit 33 then sends the desired portion data thereof to the registering unit 34, and also sends this desired portion data to the detecting unit 35 along with the desired portion analysis result data.

Thus, in step SP6, the registering unit 34 registers the desired portion selected by the user at this time in the desired portion registration table DOT of the storage unit 25 based on the desired portion data.

Also, in step SP7, the detecting unit 35 executes keyword detection processing for detecting, based on the analysis result of the desired portion obtained based on the desired portion analysis result data, a keyword from the desired portion based on the desired portion data. Thus, the detecting unit 35 sends keyword detection data indicating the detection result of the keyword detected from the desired portion to the tag generating unit 36.

Further, in step SP8, the tag generating unit 36 executes tag generation processing for generating the tag of the desired portion based on the keyword detection data. Thus, the tag generating unit 36 generates the tag of the desired portion.

In step SP9, in response to identification of the desired portion according to instruction of a desired portion, detection of a keyword, and completion of tag generation, the control unit 20 performs highlighted display of the desired portion selected at this time within the text of the electronic book image being displayed, and proceeds to the next step SP2.

In this way, each time the desired portion within the text of the electronic book image is specified by the user, the control unit 20 sequentially executes the processing in step SP3 through step SP9 together with each circuit unit.

A positive result being obtained in step SP2 means that completion of display of the electronic book has been requested by the user. Upon obtaining such a positive result in step SP2, the control unit 20 proceeds to the next step SP10, and ends this highlighted display processing procedures RT1.

Figure 41:
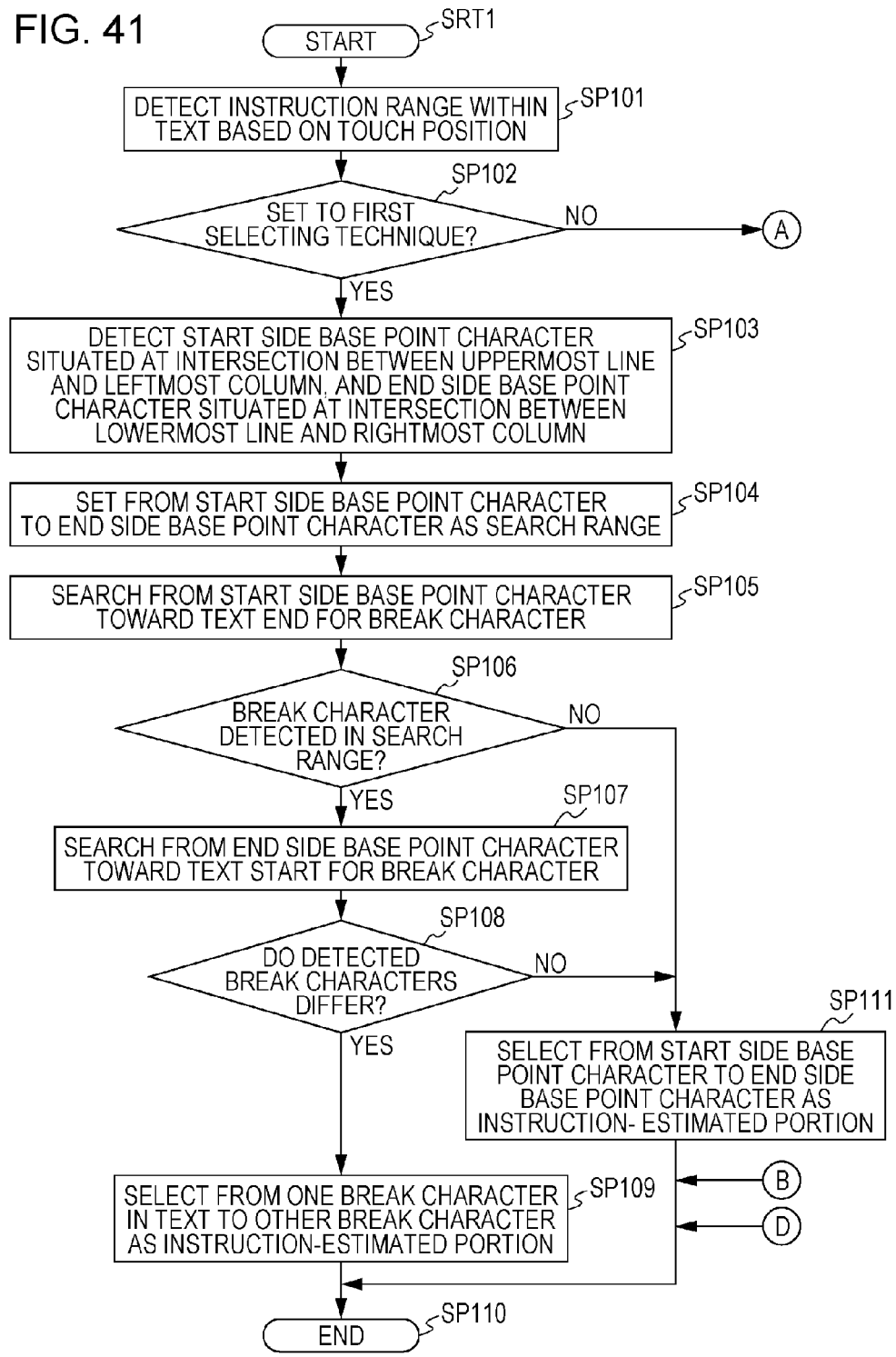
FIG. 41 is a flowchart illustrating an instruction-estimated portion selection processing subroutine.
Figure 42:
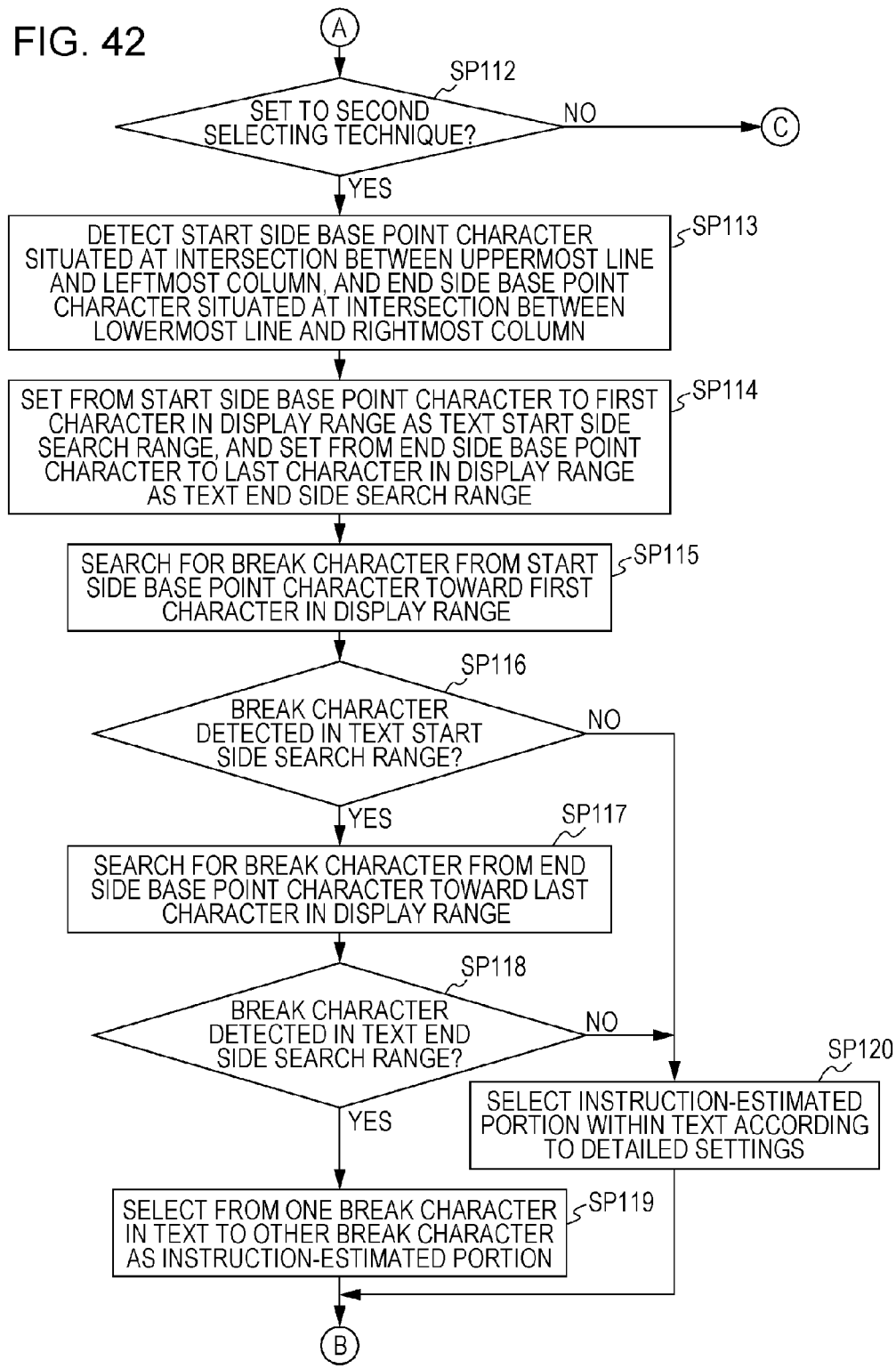
FIG. 42 is a flowchart illustrating an instruction-estimated portion selection processing subroutine.
Figure 43:
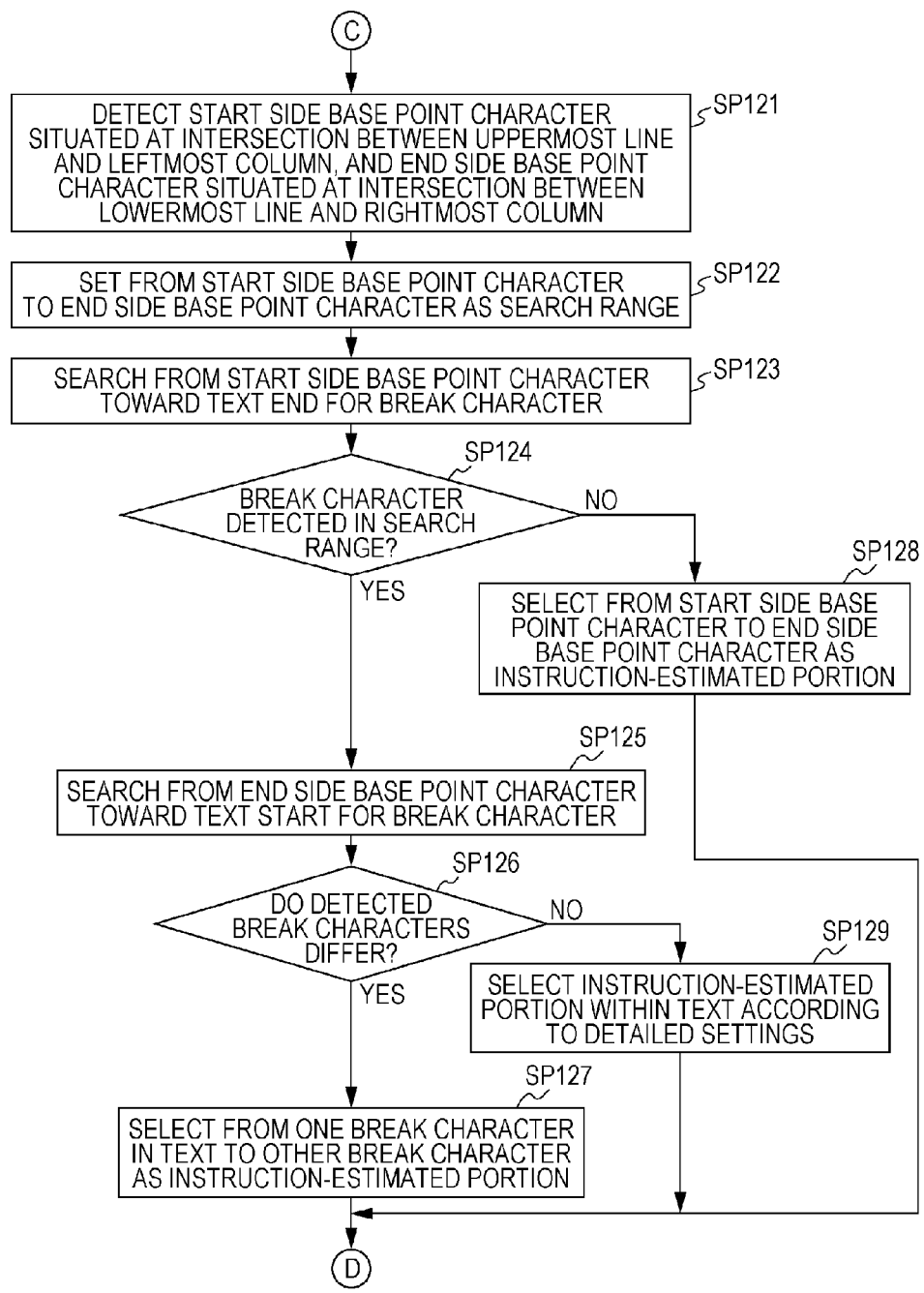
FIG. 43 is a flowchart illustrating an instruction-estimated portion selection processing subroutine.

Note that, with the above highlighted display processing procedures RT1, upon proceeding from step SP1 to step SP2, the selecting unit 28 starts an instruction-estimated portion selection processing subroutine SRT1 shown in FIGS. 41 through 43.

Upon starting the instruction-estimated portion selection processing subroutine SRT1, in step SP101 the selecting unit 28 detects an instruction range within the text of the electronic book image based on the type of the sliding operation and the touch position when the desired portion is specified, and proceeds to the next step SP102.

In step SP102, the selecting unit 28 determines whether or not the current selection technique of an instruction-estimated portion is set to the first selection technique. Obtaining a positive result in this step SP102 means that the user tends to instruct the desired portion within the text wider than the actual width. Upon obtaining such a positive result in step SP102, the selecting unit 28 proceeds to the next step SP103.

In step SP103, the selecting unit 28 detects the start side base point character situated at the intersection between the uppermost one line and the leftmost one column in the character string within the instruction range. Also, the selecting unit 28 also detects the end side base point character situated at the intersection between the lowermost one line and the rightmost one column in the character string within the instruction range, and proceeds to the next step SP104.

In step SP104, the selecting unit 28 sets from the start side base point character to the end side base point character in the text of the electronic book image as the search range, and proceeds to the next step SP105.

In step SP105, the selecting unit 28 searches a break character from the start side base point character toward the sentence end while sequentially determining the type of a character thereof, and proceeds to the next step SP106.

In step SP106, the selecting unit 28 determines whether or not a break character has been detected within the search range. At this time, the selecting unit 28 has detected a break character within the search range, and upon obtaining a positive result, proceeds to the next step SP107.

In step SP107, the selecting unit 28 searches a break character from the end side base point character toward the start of the sentence while sequentially determining the type of a character thereof, and upon detecting a break character, proceeds to the next step SP108.

In step SP108, the selecting unit 28 determines whether or not the break character detected from the search from the start side base point character, and the break character detected from the search from the end side base point character differ. Obtaining a positive result in this step SP108 means, for example, that at least one paragraph or sentence is included in the search range. Upon obtaining such a positive result in step SP108, the selecting unit 28 proceeds to the next step SP109.

In step SP109, the selecting unit 28 selects a character string from one of the break characters to the other break character detected within the search range out of the text as the instruction-estimated portion, and proceeds to the next step SP110. Thus, in step SP110, the selecting unit 28 ends this instruction-estimated portion selection processing subroutine SRT1.

Note that, upon obtaining a negative result without detecting a break character within the search range in step SP106, the selecting unit 28 proceeds to step SP111.

Also, obtaining a negative result in step SP108 means, for example, that only one break character serving as a break of sentences or paragraphs is included in the search range. Upon obtaining such a negative result in step SP108, in this case as well, the selecting unit 28 proceeds to step SP111.

In step SP111, the selecting unit 28 selects a character string from the start side base point character to the end side base point character out of the text as the instruction-estimated portion, and proceeds to the next step SP110. Thus, in step SP110, the selecting unit 28 ends this instruction-estimated portion selection processing subroutine SRT1.

Note that, obtaining a negative result in step SP102 means that the user tends to instruct the desired portion within the text narrower than the actual width, or the way in which the user gives instructions tends to vary. Upon obtaining such a negative result in step SP102, the selecting unit 28 proceeds to step SP112, as described in FIG. 42.

In step SP112, the selecting unit 28 determines whether or not the current selection technique of an instruction-estimated portion is set to the second selection technique. Obtaining a positive result in step this SP112 means that the user tends to instruct the desired portion within the text narrower than the actual width. Upon obtaining such a positive result in step SP112, the selecting unit 28 proceeds to the next step SP113.

In step SP113, the selecting unit 28 detects the start side base point character situated at the intersection between the uppermost one line and the leftmost one column in the character string within the instruction range. Also, the selecting unit 28 also detects the end side base point character situated at the intersection between the lowermost one line and the rightmost one column in the character string within the instruction range, and proceeds to the next step SP114.

In step SP114, the selecting unit 28 sets from the start side base point character to the first character of the display range in the text of the electronic book image as the start side search range. Also, selecting unit 28 sets from the end side base point character to the end character of the display range in the text of the electronic book image as the end side search range, and proceeds to the next step SP115.

In step SP115, the selecting unit 28 searches a break character from the start side base point character toward the first character in the display range while sequentially determining the type of character thereof, and proceeds to the next step SP116.

In step SP116, the selecting unit 28 determines whether or not a break character has been detected within the start side search range. At this time, the selecting unit 28 has detected a break character within the start side search range, and upon obtaining a positive result, proceeds to the next step SP117.

In step SP117, the selecting unit 28 searches a break character from the end side base point character toward the end character in the display range while sequentially determining the type of a character thereof, and proceeds to the next step SP118.

In step SP118, the selecting unit 28 determines whether or not a break character has been detected within the end side search range. At this time, the selecting unit 28 has detected a break character within the end side search range, and upon obtaining a positive result, proceeds to the next step SP119.

In step SP119, the selecting unit 28 selects a character string from the break character detected within the start side search range to the break character detected within the end side search range as the instruction-estimated portion in the text, and proceeds to step SP110. Thus, in step SP110, the selecting unit 28 ends this instruction-estimated portion selection processing subroutine SRT1.

Note that, upon obtaining a negative result without detecting a break character within the start side search range in step SP116, the selecting unit 28 proceeds to step SP120.

Also, upon obtaining a negative result without detecting a break character within the end side search range in step SP118, in this case as well, the selecting unit 28 proceeds to step SP120.

In step SP120, the selecting unit 28 selects a predetermined range of character string from the text as the instruction-estimated portion according to the detailed settings of the second selection technique, and proceeds to step SP110. Thus, in step SP110, the selecting unit 28 ends this instruction-estimated portion selection processing subroutine SRT1.

Note that, obtaining a negative result in step SP112 means that the way in which the user gives instructions as to the desired portion within the text tends to vary, and in light of this, the selection technique of an instruction-estimated portion is set to the third selection technique. Upon obtaining such a negative result in step SP112, the selecting unit 28 proceeds to step SP121, as described in FIG. 43.

In step SP121, the selecting unit 28 detects the start side base point character situated at the intersection between the uppermost one line and the leftmost one column in the character string within the instruction range. Also, the selecting unit 28 detects the end side base point character situated at the intersection between the lowermost one row and the rightmost one column in the character string within the instruction range, and proceeds to the next step SP122.

In step SP122, the selecting unit 28 sets from the start side base point character to the end side base point character in the text of the electronic book image as the search range, and proceeds to the next step SP123.

In step SP123, the selecting unit 28 searches a break character from the start side base point character toward the sentence end side while sequentially determining the type of a character thereof, and proceeds to the next step SP124.

In step SP124, the selecting unit 28 determines whether or not a break character has been detected within the search range. At this time, the selecting unit 28 has detected a break character within the search range, and upon obtaining a positive result, proceeds to the next step SP125.

In step SP125, the selecting unit 28 performs detection so as to search for a break character from the end side base point character toward the sentence start side while sequentially determining the type of a character thereof, and proceeds to the next step SP126.

In step SP126, the selecting unit 28 determines whether or not the break character detected from the search from the start side base point character, and the break character detected from the search from the end side base point character differ. Obtaining a positive result in this step SP126 means, for example, that at least one paragraph or sentence is included in the search range. Upon obtaining such a positive result in step SP126, the selecting unit 28 proceeds to the next step SP127.

In step SP127, the selecting unit 28 selects a character string from one of the break characters to the other break character detected within the search range out of the text as the instruction-estimated portion, and proceeds to the next step SP110. Thus, in step SP110, the selecting unit 28 ends this instruction-estimated portion selection processing subroutine SRT1.

Note that, upon obtaining a negative result without detecting a break character within the search range in step SP124, the selecting unit 28 proceeds to step SP128. At this time, in step SP128, the selecting unit 28 selects a character string from the start side base point character to the end side base point character as the instruction-estimated portion in the text, and proceeds to the next step SP110. Thus, in step SP110, the selecting unit 28 ends this instruction-estimated portion selection processing subroutine SRT1.

Also, obtaining a negative result in step SP126 means, for example, that only one break character serving as a break of sentences or paragraphs is included in the search range. Upon obtaining such a negative result in step SP126, the selecting unit 28 proceeds to step SP129.

In step SP129, the selecting unit 28 selects a predetermined range of character string from the text as the instruction-estimated portion according to the detailed settings of the third selection technique, and proceeds to step SP110. Thus, in step SP110, the selecting unit 28 ends this instruction-estimated portion selection processing subroutine SRT1.

Figure 44:
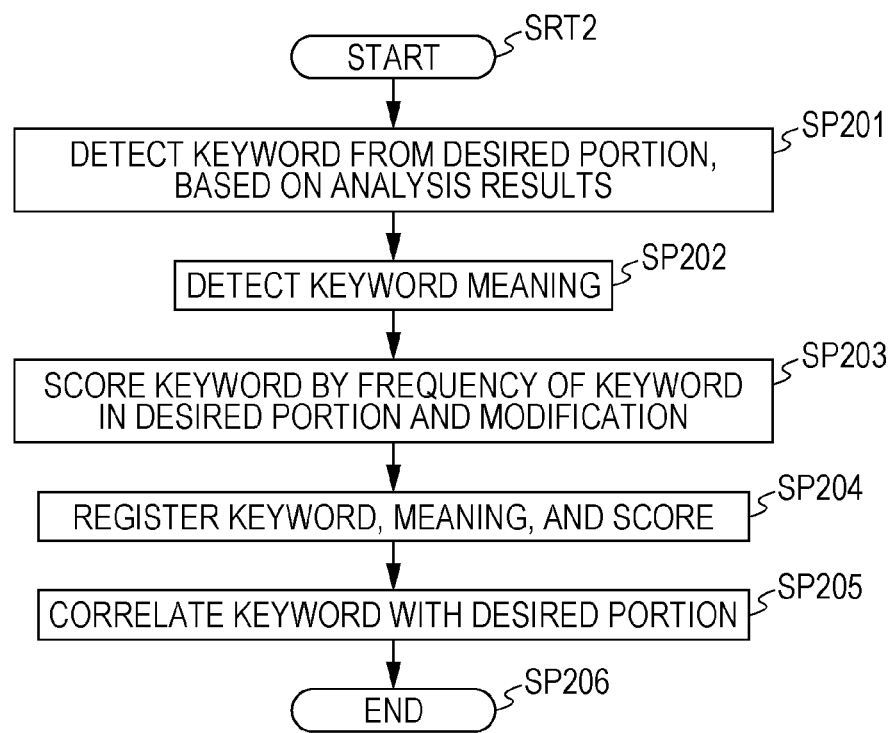
FIG. 44 is a flowchart illustrating a keyword detection processing subroutine.

Also, with the above highlighted display processing procedures RT1, upon proceeding from step SP6 to step SP7, the detecting unit 35 starts the keyword detection processing subroutine SRT2 shown in FIG. 44.

Upon starting such keyword detection processing subroutine SRT2, in step SP201 the detecting unit 35 detects, based on the analysis result of the desired portion, a keyword from this desired portion, and proceeds to the next step SP202.

In step SP202, the detecting unit 35 detects the meaning of the keyword based on the analysis result of the desired portion, and proceeds to the next step SP203.

In step SP203, the detecting unit 35 scores this keyword based on the appearance frequency and modification of the keyword within the desired portion.

In step SP204, the registering unit 34 registers the keyword, meaning, and score detected by the detecting unit 35 in the keyword registration table DT3 of the storage unit 25.

Also, in step SP205, the correlating unit 60 takes advantage of the keyword correlation table DT5 of the storage unit 25 to correlate a keyword registered by the registering unit 34 with the desired portion. Thus, the detecting unit 35 proceeds to the next step SP206, and ends the keyword detection processing subroutine SRT2.

Figure 45:
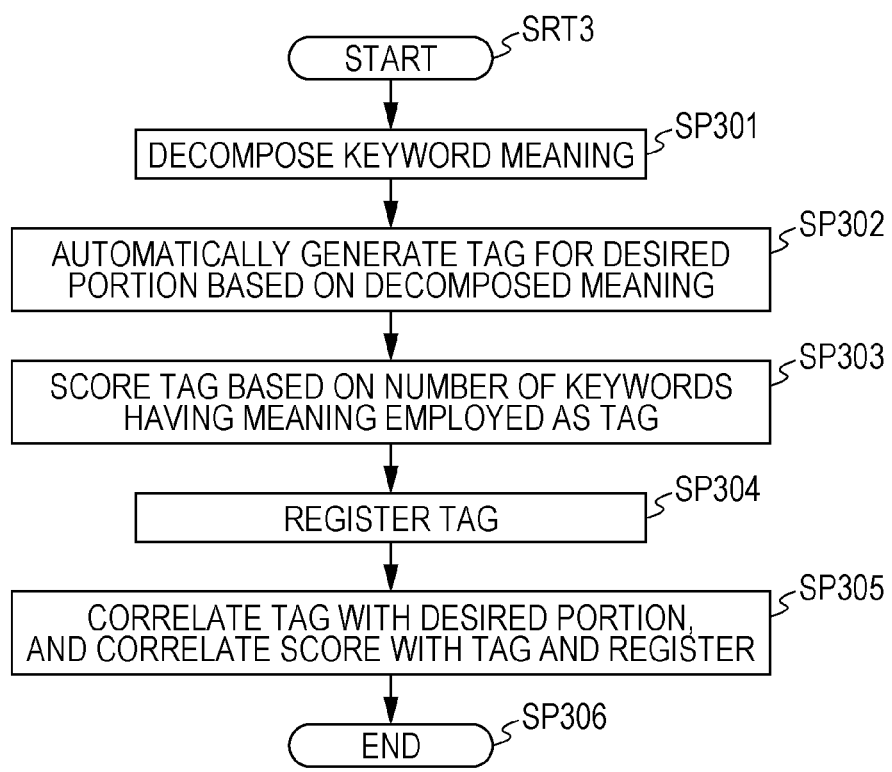
FIG. 45 is a flowchart illustrating a tag generation processing subroutine.

Further, with the above highlighted display processing procedures RT1, upon proceeding from step SP7 to step SP8, the tag generating unit 36 starts the tag generation processing subroutine SRT3 shown in FIG. 45.

Upon starting such tag generation processing subroutine SRT3, in step SP301 the tag generating unit 36 decomposes the meaning of the keyword detected by the detecting unit 35, and proceeds to the next step SP302.

In step SP302, the tag generating unit 36 automatically generates, base on the decomposed meaning, a tag of the desired portion, and proceeds to the next step SP303.

In step SP303, based on the number of keywords having meaning employed as the tag, the tag generating unit 36 scores this tag.

In step SP304, the registering unit 34 registers the tag generated by the tag generating unit 36 in the tag registration table DT4 of the storage unit 25.

Also, in step SP305, the correlating unit 60 takes advantage of the tag correlation table DT6 of the storage unit 25 to correlate the tag registered by the registering unit 34 with the desired portion, and also registers the score of the tag in a manner correlated with this tag. Thus, the tag generating unit 36 proceeds to the next step SP306, and ends the tag generation processing subroutine SRT3.

2-6. Information Introduction Processing Procedures

Figure 46:
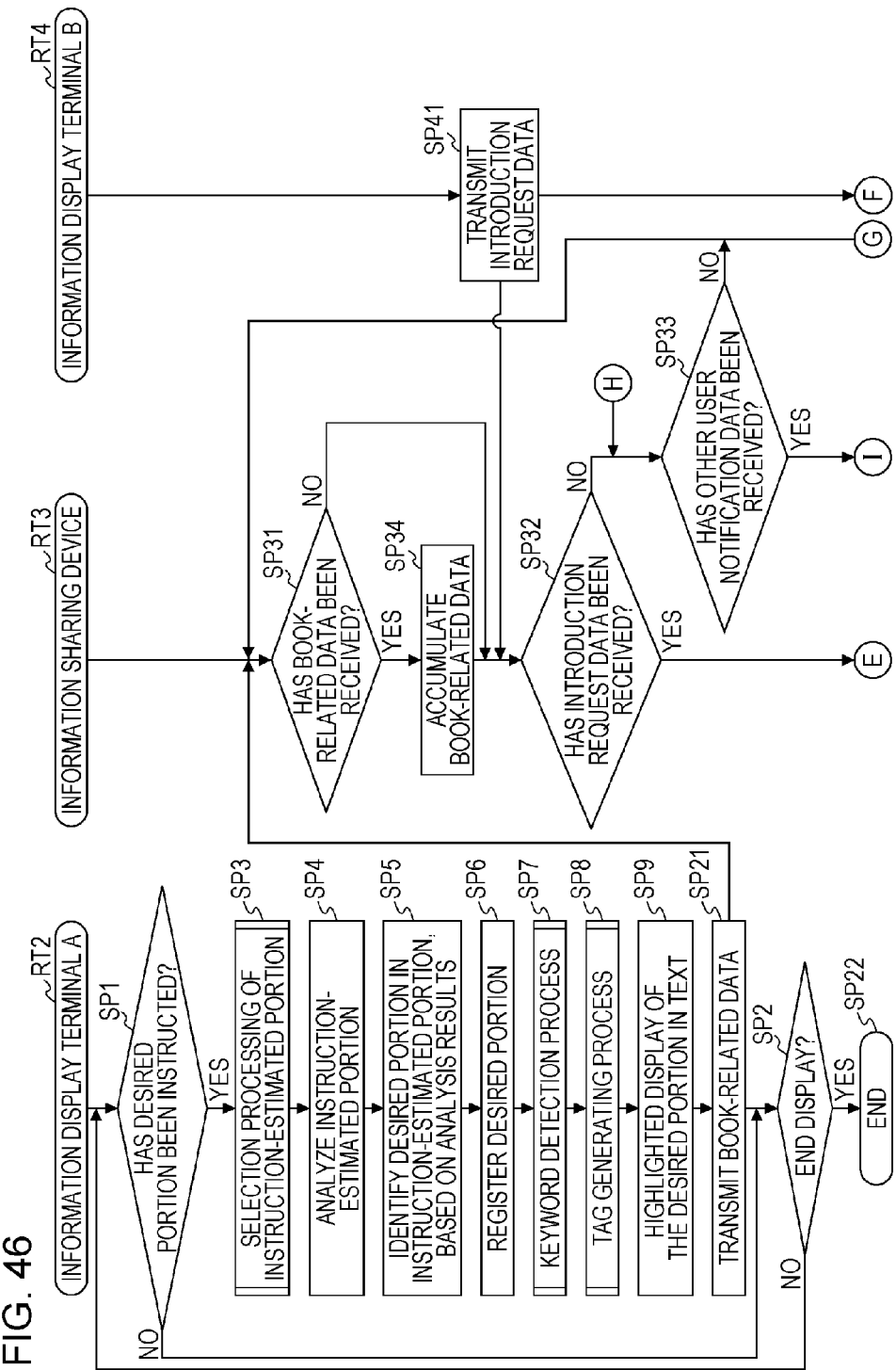
FIG. 46 is a flowchart illustrating information introduction processing procedures.
Figure 47:
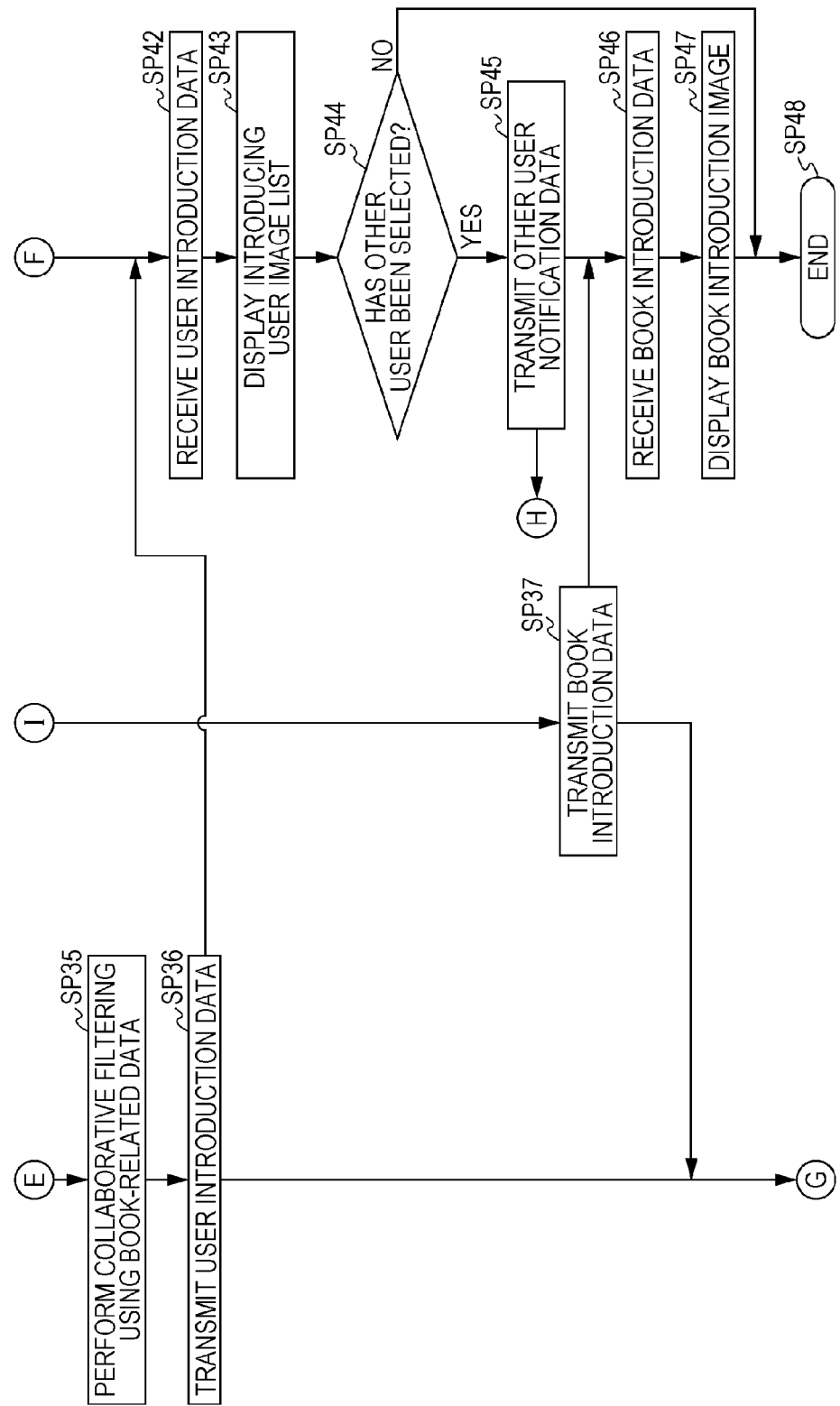
FIG. 47 is a flowchart illustrating information introduction processing procedures.

Next, description will be made regarding the information introduction processing procedures that the multiple information display terminals 11 and 12, and the information sharing device 14 execute, with reference to FIGS. 46 and 47 shown by appending the same reference numeral to a portion corresponding to FIG. 40.

At this time, upon transmission of book-related data for each selection of the desired portion being requested along with a request for display of an electronic book by the user for example, the control units 20 of the multiple information display terminals 11 and 12 start the data providing processing procedures RT2 shown in FIG. 46 together with each circuit unit.

At this time, upon starting such data providing processing procedures RT2, the control units 20 of the multiple information display terminals 11 and 12 execute the processing in steps SP1 and SP2 to await that the desire portion is specified within the text of an electronic book image being displayed.

Upon the desire portion being specified within the text of the electronic book image being displayed, the control units 20 sequentially execute the processing in steps SP3 through SP9, and proceed to the next step SP21.

In step SP21, the control units 20 search book-related data relating to the desired portion selected at this time via the searching unit 66. Also, the control units 20 transmit the searched book-related data from the transmission unit 23 to the information sharing device 14 via the network 13 along with the user registration information, and proceed to the next step SP2.

In this way, the control units 20 transmit, each time the desired portion is specified within the text of the electronic book image being displayed for example, book-related data relating to the desired portion thereof to the information sharing device 14.

For example, upon end of display of the electronic book being requested, the control units 20 proceed to step SP22, and end such data providing processing procedures RT2.

On the other hand, the control unit 110 of the information sharing device 14 has started the user introduction processing procedures RT3 shown in FIGS. 46 and 47 at this time. Upon starting such user introduction processing procedures RT3, in step SP31 the control unit 110 of the information sharing device 14 determines whether or not the book-related data has been transmitted from the information display terminals 11 and 12, and this has been received.

As a result thereof, upon obtaining a negative result due to that no book-related data has been transmitted from the information display terminals 11 and 12 in step SP31, the control unit 110 of the information sharing device 14 proceeds to step SP32.

Also, in step SP32, the control unit 110 of the information sharing device 14 determines whether or not the introduction request data has been transmitted from the information display terminals 11 and 12, and this has been received. As a result thereof, upon obtaining a negative result due to that no introduction request data has been transmitted from the information display terminals 11 and 12 in step SP32, the control unit 110 of the information sharing device 14 proceeds to step SP33.

Further, in step SP33, the control unit 110 of the information sharing device 14 determines whether or not the other user notification data has been transmitted from the information display terminals 11 and 12, and this has been received. As a result thereof, upon obtaining a negative result due to that no other user notification data has been transmitted from the information display terminals 11 and 12 in step SP33, the control unit 110 of the information sharing device 14 returns to step SP31.

Subsequently, the control unit 110 of the information sharing device 14 cyclically repeatedly executes the processing in steps SP31 through SP33 until book-related data, introduction request data, and other user notification data are received.

In this way, the control unit 110 of the information sharing device 14 awaits reception of book-related data, introduction request data, and other user notification data transmitted from the information display terminals 11 and 12.

In step SP31, the control unit 110 of the information sharing device 14 receives the book-related data and user registration information transmitted from the information display terminals 11 and 12 at the reception unit 112, and upon obtaining a positive result, proceeds to the next step SP34.

In step SP34, the control unit 110 of the information sharing device 14 stores the book-related data and user registration information received at this time in a correlated manner to the storage unit 111, and proceeds to the next step SP32.

In this way, each time book-related data and user registration information are transmitted from the information display terminals 11 and 12, the control unit 110 of the information sharing device 14 receives and stores these to the storage unit 111, thereby accumulating the book-related data in a manageable state for each user.

Note that in the event that the user has requested reception of introduction of another user having preference similar to his/her preference, the control units 20 of the information display terminals 11 and 12 start the information reception processing procedures RT4 shown in FIGS. 46 and 47.

Upon starting information reception processing procedures RT4, in step SP41 the control units 20 of the information display terminals 11 and 12 generate introduction request data, and transmit from the transmission unit 23 to the information sharing device 14 via the network 13.

At this time, the control unit 110 of the information sharing device 14 awaits reception of the introduction request data, and upon obtaining a positive result according to reception of the introduction request data thereof in step SP32, proceeds to step SP35, as described in FIG. 47.

In step SP35, the filtering processing unit 114 of the information sharing device 14 uses book-related data between the introduction requesting user and another user to execute collaborative filtering processing, and proceeds to the next step SP36.

In step SP36, the filtering processing unit 114 of the information sharing device 14 generates user introduction data indicating another user which will be introduced to the introduction requesting user, based on the result of the collaborative filtering processing thereof. The filtering processing unit 114 of the information sharing device 14 then returns the user introduction data thereof from the transmission unit 113 to the information display terminals 11 and 12 via the network 13.

At this time, in step SP42, the reception units 24 of the information display terminals 11 and 12 receive the user introduction data transmitted from the information sharing device 14, and sends to the control unit 20.

Accordingly, in step SP43, the control units 20 of the information display terminals 11 and 12 display a user introduction list image on the display unit 21 via the display control unit 26 based on the user introduction data thereof, and proceed to the next step SP44.

In step SP44, the control units 20 of the information display terminals 11 and 12 determine whether or not any one of the users has been selected by the introduction requesting user on the user introduction list image. As a result thereof, upon obtaining a positive result by another user being selected on the user introduction list image in step SP44, the control units 20 of the information display terminals 11 and 12 proceed to the next step SP45.

In step SP45, the control units 20 of the information display terminals 11 and 12 transmit other user notification data indicating another user selected by the introduction requesting user to the information sharing device 14 from the transmission unit 23 via the network 13.

At this time, upon obtaining a positive result by receiving the other user notification data transmitted from the information display terminals 11 and 12 in step SP33, the control unit 110 of the information sharing device 14 proceeds to the next step SP37.

In step SP37, the filtering processing unit 114 of the information sharing device 14 generates book introduction data for introducing single or multiple electronic books out of the electronic books obtained by another user having preference similar to the preference of the introduction requesting user, based on the other user notification data.

The filtering processing unit 114 of the information sharing device 14 transmits the book introduction data thereof to the information display terminals 11 and 12 from the transmission unit 113 via the network 13, and returns to step SP31.

At this time, in step SP46, the control units 20 of the information display terminals 11 and 12 receive the book introduction data transmitted from the information sharing device 14 at the reception unit 24, and proceeds to the next step SP47.

In step SP47, the control units 20 of the information display terminals 11 and 12 display a book introduction image on the display unit 21 via the display control unit 26 based on the book introduction data thereof, and proceed to the next step SP48. Thus, in step SP48, the control units 20 of the information display terminals 11 and 12 end such introduction reception processing procedures RT4.

In this way, upon receiving the introduction request data transmitted from the information display terminals 11 and 12 while accumulating the book-related data transmitted from the information display terminals 11 and 12, the control unit 110 of the information sharing device 14 introduces another user having similar preference to the introduction requesting user.

Also, in the event of having received the book introduction data transmitted from the information display terminals 11 and 12 with introduction of another user as a trigger, the control unit 110 of the information sharing device 14 can introduce an electronic book obtained by another user having preference similar to the preference of the introduction requesting user.

2-7. Information Sharing Processing Procedures

Figure 48:
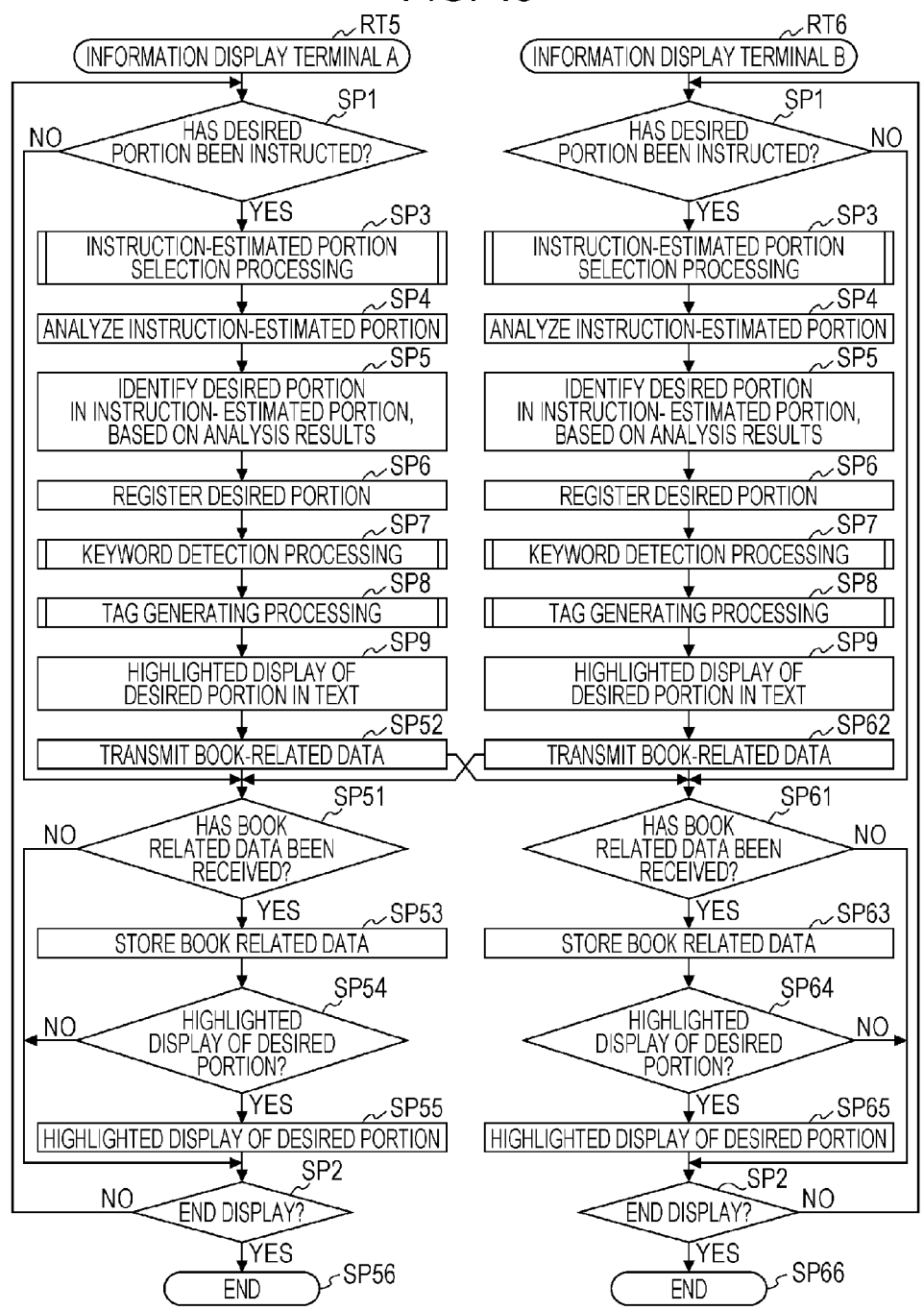
FIG. 48 is a flowchart illustrating sharing processing procedures.

Next, description will be made regarding information sharing processing procedures RT5 and RT6 for mutually reflecting desired portions selected among users at the multiple information display terminals 11 and 12, with reference to FIG. 48 shown by appending the same reference numeral to a portion corresponding to FIG. 40.

However, hereafter, description will be made regarding a case where the information display terminals 11 and 12 directly communicate without involvement of the information sharing device 14, thereby sharing information.

At this time, the control unit 20 of one of the information display terminals 11 and 12 starts, upon information being requested so as to be shared with the other of the information display terminals 11 and 12 along with a display request of an electronic book by the user, the information sharing processing procedures RT5 shown in FIG. 48.

Upon starting such information sharing processing procedures RT5, in step SP1 the control unit 20 of one of the information display terminals 11 and 12 determines whether or not the desired portion has been specified within the text of an electronic book image being displayed.

Obtaining a negative result in this step SP1 means, for example, that the text of the electronic book image is being read by the user. Upon obtaining such a negative result in step SP1, the control unit 20 of one of the information display terminals 11 and 12 proceeds to step SP51.

In step SP51, the control unit 20 of one of the information display terminals 11 and 12 determines whether or not the book-related data transmitted from the other of information display terminals 11 and 12 according to selection of the desired portion of the same electronic book has been received.

Obtaining a negative result in step SP51 means, for example, that the text of the electronic book image being displayed is being read by the user even at the other of information display terminals 11 and 12. Upon obtaining such a negative result in step SP51, the control unit 20 of one of the information display terminals 11 and 12 proceeds to step SP2.

In step SP2, the control unit 20 of one of the information display terminals 11 and 12 determines whether to end display of the electronic book. Obtaining a negative result in this step SP2 also means, for example, that the text of the electronic book image being displayed is being read by the user. Accordingly, upon obtaining such a negative result in step SP2, the control unit 20 of one of the information display terminals 11 and 12 returns to step SP1.

Thus, hereafter, the control unit 20 of one of the information display terminals 11 and 12 cyclically repeatedly executes the processing in steps SP1, SP51, and SP2 until a positive result is obtained in steps SP1, SP51, and SP2.

In this way, the control unit 20 of one of the information display terminals 11 and 12 awaits that the desired portion is specified within the text of the electronic book image, the book-related data transmitted from the other of the information display terminals 11 and 12 is received, and further, end of display of the electronic book is requested.

Upon a positive result being obtained in step SP1 by the desired portion being specified within the text of the electronic book image being displayed, the control unit 20 of one of the information display terminals 11 and 12 sequentially executes the processing in steps SP3 through SP9, and proceeds to the next step SP52.

In step SP52, the control unit 20 of one of the information display terminals 11 and 12 searches book-related data relating to the desired portion selected at this time via the searching unit 66. The control unit 20 of one of the information display terminals 11 and 12 then transmits the book-related data thereof from the transmission unit 23 to the other of the information display terminals 11 and 12, and proceeds to the next step SP51.

At this time, the control unit 20 of the other of the information display terminals 11 and 12 also starts, upon information being requested so as to be shared with one of the information display terminals 11 and 12 along with a display request of an electronic book by the user, the information sharing processing procedures RT6 shown in FIG. 48.

Upon starting such information sharing processing procedures RT6, in step SP1 the control unit 20 of the other of the information display terminals 11 and 12 determines whether or not the desired portion has been specified within the text of an electronic book image being displayed.

Obtaining a negative result in this step SP1 means, for example, that the text of the electronic book image is being read by the user. Upon obtaining such a negative result in step SP1, the control unit 20 of the other of the information display terminals 11 and 12 proceeds to step SP61.

In step SP61, the control unit 20 of the other of the information display terminals 11 and 12 determines whether or not the book-related data transmitted from one of information display terminals 11 and 12 according to selection of the desired portion of the same electronic book has been received.

A negative result being obtained in this step SP61 means, for example, that the text of the electronic book image being displayed is being read by the user even at one of information display terminals 11 and 12. Upon obtaining such a negative result in step SP61, the control unit 20 of the other of the information display terminals 11 and 12 proceeds to step SP2.

In step SP2, the control unit 20 of the other of the information display terminals 11 and 12 determines whether to end display of the electronic book. Obtaining a negative result in step this SP2 also means, for example, that the text of the electronic book image being displayed is being read by the user. Accordingly, upon obtaining such a negative result in step SP2, the control unit 20 of the other of the information display terminals 11 and 12 returns to step SP1.

Thus, hereafter, the control unit 20 of the other of the information display terminals 11 and 12 cyclically repeatedly executes the processing in steps SP1, SP61, and SP2 until a positive result is obtained in steps SP1, SP61, and SP2.

In this way, the control unit 20 of the other of the information display terminals 11 and 12 awaits that the desired portion is specified within the text of the electronic book image, the book-related data transmitted from one of the information display terminals 11 and 12 is received, and further, end of display of the electronic book is requested.

Upon a positive result being obtained in step SP61 by the book-related data transmitted from one of the information display terminals 11 and 12 being received at the reception unit 24, the control unit 20 of the other of the information display terminals 11 and 12 proceeds to the next step SP63.

In step SP63, the control unit 20 of the other of the information display terminals 11 and 12 stores the book-related data thereof in the storage unit 25, and proceeds to the next step SP64.

In step SP64, the control unit 20 of the other of the information display terminals 11 and 12 determines whether to perform highlighted display of the desired portion selected at one of the information display terminals 11 and 12.

Obtaining a positive result in this step SP64 means that the same page of the same electronic book is currently displayed at both of one and the other of the information display terminals 11 and 12.

Upon obtaining such a positive result in step SP64, the control unit 20 of the other of the information display terminals 11 and 12 proceeds to the next step SP65.

In step SP65, the control unit 20 of the other of the information display terminals 11 and 12 performs highlighted display of the desired portion selected at one of the information display terminals 11 and 12 within the text of the electronic book image being displayed, based on the book-related data obtained at this time, and proceeds to the next step SP2.

However, obtaining a negative result in step SP64 means that a different page of the same electronic book is currently displayed at both of one and the other of the information display terminals 11 and 12.

Upon obtaining such a negative result in step SP64, the control unit 20 of the other of the information display terminals 11 and 12 proceeds to step SP2.

Upon obtaining a negative result again in step SP2, the control unit 20 of the other of the information display terminals 11 and 12 returns to step SP1.

Upon a positive result being obtained in step SP1 by the desired portion being specified within the text of the electronic book image being displayed, the control unit 20 of the other of the information display terminals 11 and 12 sequentially executes the processing in steps SP3 through SP9, and proceeds to the next step SP62.

In step SP62, the control unit 20 of the other of the information display terminals 11 and 12 searches book-related data relating to the desired portion selected at this time via the searching unit 66. The control unit 20 of the other of the information display terminals 11 and 12 then transmits the book-related data from the transmission unit 23 to one of the information display terminals 11 and 12, and proceeds to the next step SP61.

At this time, upon obtaining a positive result in step SP51 by the book-related data transmitted from the other of the information display terminals 11 and 12 being received at the reception unit 24, the control unit 20 of the other of the information display terminals 11 and 12 proceeds to the next step SP53.

In step SP53, the control unit 20 of one of the information display terminals 11 and 12 stores the book-related data thereof in the storage unit 25, and proceeds to the next step SP54.

In step SP54, the control unit 20 of one of the information display terminals 11 and 12 determines whether to perform highlighted display of the desired portion selected at the other of the information display terminals 11 and 12.

Obtaining a positive result in this step SP54 means that the same page of the same electronic book is currently displayed at both of one and the other of the information display terminals 11 and 12.

Upon obtaining such a positive result in step SP54, the control unit 20 of one of the information display terminals 11 and 12 proceeds to the next step SP55.

In step SP55, the control unit 20 of one of the information display terminals 11 and 12 performs highlighted display of the desired portion selected at the other of the information display terminals 11 and 12 within the text of the electronic book image being displayed, based on the book-related data obtained at this time, and proceeds to the next step SP2.

However, obtaining a negative result in step SP54 means that a different page of the same electronic book is currently displayed at both of one and the other of the information display terminals 11 and 12.

Upon obtaining such a negative result in step SP54, the control unit 20 of one of the information display terminals 11 and 12 proceeds to step SP2.

Upon obtaining a negative result again in step SP2, the control unit 20 of one of the information display terminals 11 and 12 returns to step SP1.

In this way, the control units 20 of one and the other of the information display terminals 11 and 12 repeatedly execute the processing in steps SP1 through SP9, and SP51 through SP55, and the processing in steps SP1 through SP9, and SP61 through SP65.

Thus, each time the desired portions are mutually selected in a state in which the electronic book image of the same electronic book is displayed, the control units 20 of one and the other of the information display terminals 11 and 12 can transmit and share book-related data relating to the selected desired portions thereof.

Obtaining a positive result in step SP2, means that end of display of the electronic book has been requested by the user. Upon obtaining such a positive result in step SP2, the control unit 20 of one of the information display terminals 11 and 12 proceeds to the next step SP56, and ends this information sharing processing procedures RT5.

Also, upon obtaining such a positive result in step SP2, the control unit 20 of the other of the information display terminals 11 and 12 proceeds to the next step SP66, and ends this information sharing processing procedures RT6.

2-8. Operations and Advantages of First Exemplary Embodiment

With the above arrangement, at the time of displaying the electronic book image of an electronic book on the display unit 21, upon the desired portion being specified within the text of this electronic book image, the information display terminals 11 and 12 select an instruction-estimated portion within this text based on the instruction position thereof.

Also, the information display terminals 11 and 12 subject the instruction-estimated portion thereof to natural language processing, and determines, based on the obtained processing results (i.e., analysis results), the desired portion in this instruction-estimated portion. Further, the information display terminals 11 and 12 transmit book-related data including information relating to the desired portion thereof to other information display terminals 11 and 12.

Accordingly, the information display terminals 11 and 12 can readily tell the desired portion selected from the text of an electronic book to another user. Also, the information display terminals 11 and 12 can receive introduction of another user having preference similar to the preference of the user based on the desired portion thereof.

According the above arrangement, with the information display terminals 11 and 12, upon the desired portion being specified within the text of the electronic book, based on the specified position thereof, the instruction-estimated portion is selected and subjected to natural language processing, and based on the processing result thereof, the desired portion is determined in this instruction-estimated portion, and book-related data including information relating to this determined desired portion is transmitted to other information display terminals 11 and 12. Thus, the information display terminals 11 and 12 can readily tell the desired portion selected from the text of an electronic book to another user. Accordingly, the information display terminals 11 and 12 can dramatically improve usability.

Also, upon receiving the desired portion transmitted from other information display terminals 11 and 12 which display the same electronic book while displaying the electronic book of a learning material, the information display terminals 11 and 12 perform highlighted display of this received desired portion in the text of the electronic book being displayed.

Accordingly, the information display terminals 11 and 12 can readily tell which portion within the text another user is interested in, how this other user advances learning, and so forth.

Further, at this time, the information display terminals 11 and 12 transmit related comments correlated with the desired portion, and also the related comments correlated with the desired portion are received by another user, so how for each to proceed with learning, items to remember carefully, and so forth can be taught to each other in a more exact manner.

Further, the information display terminals 11 and 12 transmit the book-related data including information relating to the desired portion to the information sharing device 14 for accumulation, and transmit introduction request data for requesting introduction of another user to this information sharing device 14.

Thus, the information display terminals 11 and 12 can search another user having preference similar to the preference of the user through a book from the information sharing device 14, and can receive introduction thereof.

Further, upon obtaining of information relating to the desired portion that another user has selected in the electronic book where the desired portion has been selected, being requested by the user, the information display terminals 11 and 12 transmit desired portion information request data to the information sharing device 14.

The information display terminals 11 and 12 then receives the book-related data of another user returned from the information sharing device 14, and performs highlighted display of the desired portion selected by the other user within the text of the electronic book that this book-related data indicates.

Thus, the information display terminals 11 and 12 can readily tell the user what kind of perspective the other user who is reading the electronic book has. Specifically, the information display terminals 11 and 12 can readily tell the perspectives of various readers to the user along with the information sharing device 14.

3. Second Exemplary Embodiment

3-1. Configuration of Information Display System

Figure 49:
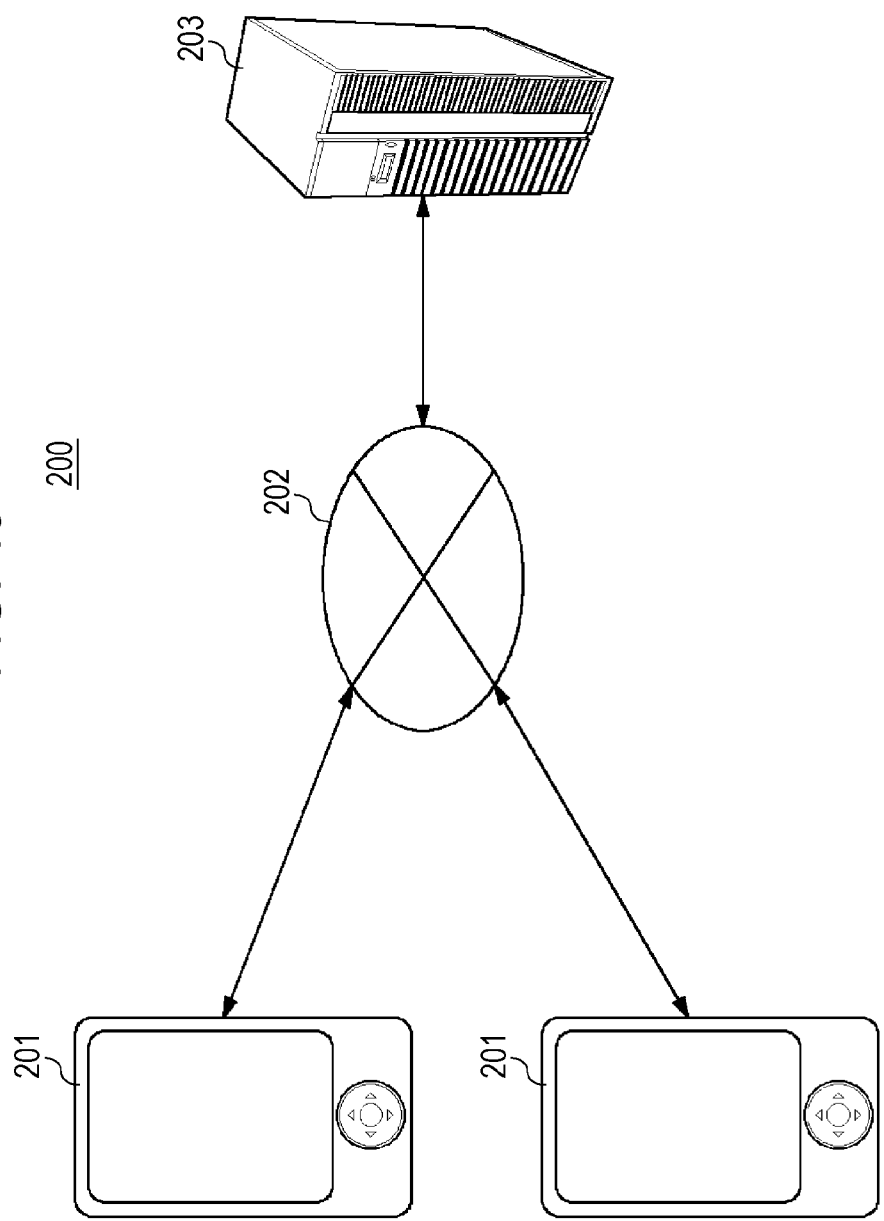
FIG. 49 is a block diagram illustrating the configuration of an information display system according to a second exemplary embodiment.

In FIG. 49, reference numeral 200 denotes an information display system according to the second exemplary embodiment as a whole. The information display system 200 is configured so that multiple information display terminals 201 having a communication terminal configuration which are specific examples of the above information processing device 1 can communicate with an information sharing device 203 having a server configuration via a network 202 such as the Internet or a LAN (Local Area Network) or the like.

Figure 50:
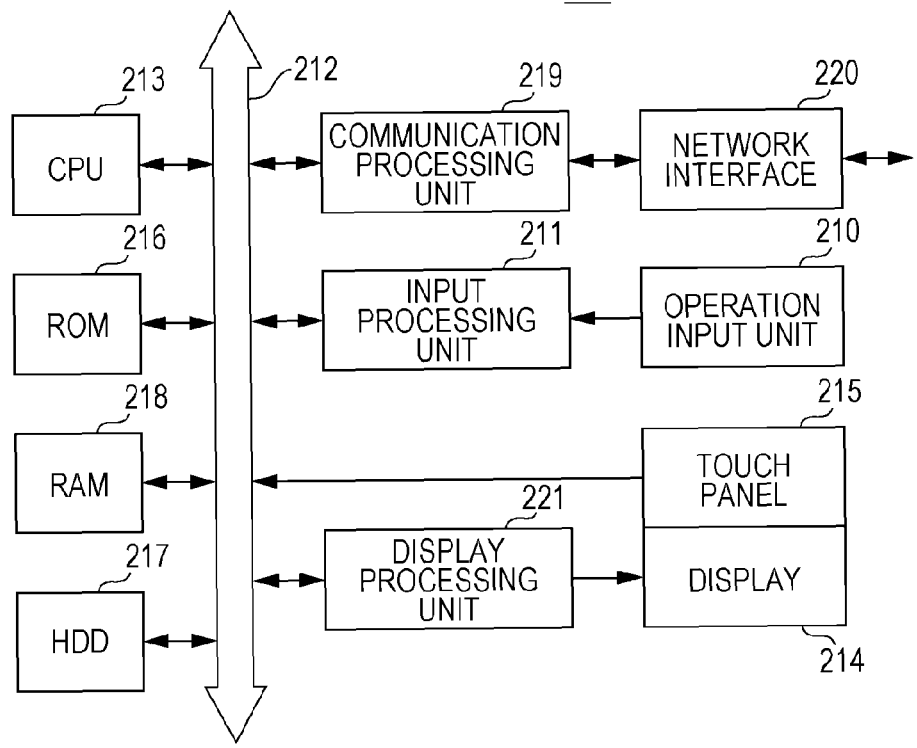
FIG. 50 is a block diagram illustrating a circuit configuration according to a hardware circuit block of an information display terminal.

3-2. Hardware Configuration According to Hardware Circuit Block of Information Display Terminal Next, a hardware circuit configuration according to the hardware circuit block of the information display terminal 201 will be described with reference to FIG. 50.

Upon an operation input unit 210 made up of various types of operating keys provided to the casing surface or remote controller of the information display terminal 201 being operated by the user, the information display terminal 201 recognizes this at the operation input unit 210, and sends an operation input signal according to an operation to an input processing unit 211.

The input processing unit 211 subjects the supplied operation input signal to predetermined processing to convert this operation input signal into an operation command, and sends to a central processing unit (CPU) 213 via a bus 212.

Also, a touch panel 215 is provided to the display surface of a display 214 of the information display terminal 201. Upon a touch operation (i.e., such as tap operation, flick operation, or sliding operation) of the surface of the touch panel 215 being performed, in response to this, the touch panel 215 detects the touch position by the touch operation, and notifies the central processing unit 213 of this via the bus 212.

The central processing unit 213 reads various types of programs, such as the basic program, application programs, and so forth stored beforehand in ROM (Read Only Memory) 216 or hard disk drive 217 via the bus 212, into RAM (Random Access Memory) 218.

The central processing unit 213 controls the entirety in accordance with various types of programs loaded onto the RAM 218, and also executes predetermined arithmetic processing, the operation command provided from the input processing unit 211, and various types of processing according to a touch position on the surface of the touch panel 215.

Thus, the central processing unit 213 connects to the network via a communication processing unit 219 and a network interface 220 in order, whereby the central processing unit 213 can access the information sharing device 203, an electronic book providing device, and so forth over this network 202.

Upon obtaining of the electronic book data of an electronic book being requested by the user via the operation input unit 210 or touch panel 215, in response to this, the central processing unit 213 accesses the information sharing device 203 or electronic book providing device or the like to request the electronic book data.

As a result thereof, upon the electronic book data being transmitted from the information sharing device 203 or electronic book providing device or the like via the network 202, the central processing unit 213 receives this electronic book data at the network interface 220 and communication processing unit 219, and loads this. The central processing unit 213 sends such electronic book data to the hard disk drive 217, and stores therein.

Also, upon display of an electronic book being requested by the user via the operation input unit 210 or touch panel 215, in response to this, the central processing unit 213 reads out the electronic book data from the hard disk drive 217. The central processing unit 213 then sends the electronic book data thereof to a display processing unit 221, thereby displaying the electronic book based on the electronic book data on the display 214.

Note that, with the information display terminal 201, as described above, the central processing unit 213 basically executes various types of processing in accordance with various types of programs stored in the ROM 216 or hard disk drive 217, and also controls each piece of hardware.

Therefore, with the information display terminal 201, various types of programs to be stored in the ROM 216 or hard disk drive 217 are selected as appropriate according to the functions of the information display terminals 11 and 12 having a hardware configuration according to the function circuit block described above regarding FIGS. 3 and 38.

Specifically, with the information display terminal 201, various types of programs are selected as appropriate such as an information processing program for executing the above highlighted display processing procedures RT1, data providing processing procedures RT2, introduction reception processing procedures RT4, or information sharing processing procedures RT5 and RT6.

Thus, with the information display terminal 201, the central processing unit 213 can serve in the same way as with the above control unit 20, selecting unit 28, obtaining units 29 and 100, natural language processing block 30, identifying unit 33, registering unit 34, detecting unit 35, and tag generating unit 36.

Also, with the information display terminal 201, the central processing unit 213 can serve in the same way as with the above correlating unit 60, searching unit 66, index generating unit 67, link generating unit 75, and classifying unit 77.

Further, with the information display terminal 201, the operation input unit 210, input processing unit 211, and touch panel 215 can serve in the same way as with the above operating unit 22, and also the hard disk drive 217 can serve in the same way as with the above storage unit 25.

Further, with the information display terminal 201, the communication processing unit 219 and network interface 220 can serve in the same way as with the above transmission unit 23 and reception unit 24.

Further, with the information display terminal 201, the display processing unit 221 can serve in the same way as with the above display control unit 26, and also the display 214 can serve as with the above display unit 21.

Accordingly, with the information display terminal 201, various types of programs to be stored in the ROM 216 or hard disk drive 217 are selected as appropriate according to the functions of the information display terminals 11 and 12, whereby the above highlighted display processing procedures RT1, data providing processing procedures RT2, introduction reception processing procedures RT4, and information sharing processing procedures RT5 and RT6 can be executed in the same way as with the information display terminals 11 and 12. Accordingly, the information display terminal 201 can yield the same advantages as with the information display terminals 11 and 12 according to the first exemplary embodiment described above.

Note that, with the information display terminal 201, the information processing program may be stored beforehand in the ROM 216 or hard disk drive 217. Also, with the information display terminal 201, a program storage medium in which the information processing program is stored may be used for installing this information processing program.

Further, with the information display terminal 201, a cable or wireless communication medium, such as a local area network, the internet, digital satellite broadcast, or the like, may be used for externally installing the information processing program.

Also, a computer-readable storage medium for enabling the information processing program to be installed in the information display terminal 201 so as to be executable may be realized with a package medium, for example, such as a flexible disk.

Further, a computer-readable storage medium for enabling the information processing program to be installed in the information display terminal 201 so as to be executable may be realized with a package medium such as CD-ROM (Compact Disc-Read Only Memory).

Further, a computer-readable storage medium for enabling the information processing program to be installed in the information display terminal 201 so as to be executable may be realized with a package medium such as DVD (Digital Versatile Disc) or the like.

Further, such a computer-readable storage medium may be realized with semiconductor memory or a magnetic disk or the like in which various types of programs are temporarily or eternally stored, other than a package medium.

Also, a cable or wireless communication medium, such as a local area network, the internet, digital satellite broadcast, or the like, may be used as a tool for storing the information processing program in such a computer-readable storage medium.

Further, the information processing program may be stored in a computer-readable storage medium via various types of communication interfaces such as a router, modem, or the like.

Figure 51:
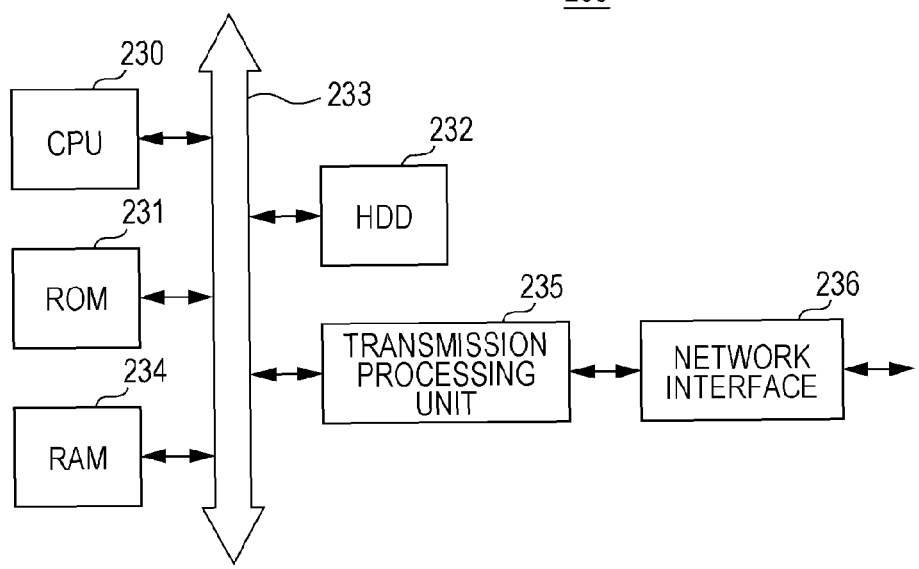
FIG. 51 is a block diagram illustrating a circuit configuration according to a hardware circuit block of an information sharing device.

3-3. Hardware Configuration According to Hardware Circuit Block of Information Sharing Device Next, a hardware circuit configuration according to the hardware circuit block of the information sharing device 203 will be described with reference to FIG. 51.

With the information sharing device 203, a central processing unit 230 reads various types of programs such as the basic program, application programs, and so forth stored beforehand in ROM 231 or a hard disk drive 232 into RAM 234 via a bus 233. The central processing unit 230 controls the entirety in accordance with various types of programs loaded on the RAM 234, and also executes various types of processing.

Thus, the central processing unit 230 stores electronic book data in the hard disk drive 232. Upon the electronic book data being requested from the information display terminal 201, in response to this, the central processing unit 230 reads out the electronic book data from the hard disk drive 232.

Thus, the central processing unit 230 transmits the read electronic book data thereof to the information display terminal 201 by way of the network 202 via the communication processing unit 235 and network interface 236 in order.

Note that, with the information sharing device 203, as described above, the central processing unit 230 basically executes various types of processing in accordance with various types of programs stored in the ROM 231 or hard disk drive 232, and also controls each piece of hardware.

Therefore, with the information sharing device 203, various types of programs to be stored in the ROM 231 or hard disk drive 232 are selected as appropriate according to the function of the information sharing device 14 having a hardware configuration according to the function circuit block described above regarding FIG. 39.

That is to say, with the information sharing device 203, various types of programs to be stored in the ROM 231 or hard disk drive 232 are selected as appropriate such as the information processing program for executing the above user introduction processing procedures RT3.

Thus, with the information sharing device 203, the central processing unit 230 can serve in the same way as with the above control unit 110 and filtering processing unit 114. Also, with the information sharing device 203, the hard disk drive 232 can serve in the same way as with the above storage unit 111.

Further, with the information sharing device 203, the communication processing unit 235 and network interface 236 can serve in the same way as with the above transmission unit 113 and reception unit 112.

Accordingly, with the information sharing device 203, various types of programs to be stored in the ROM 231 or hard disk drive 232 are selected as appropriate according to the function of the information sharing device 14, whereby the above user introduction processing procedures RT3 can be executed in the same way as with the information sharing device 14. Accordingly, the information sharing device 203 can obtain the same advantages as with the above information sharing device 14 according to the first exemplary embodiment.

Note that, with the information sharing device 203, the information processing program may be stored beforehand in the ROM 231 or hard disk drive 232. Also, with the information sharing device 203, a program storage medium in which the information processing program is stored may be used for installing this information processing program.

Further, with the information sharing device 203, a cable or wireless communication medium, such as a local area network, the internet, digital satellite broadcast, or the like, may be used for externally installing the information processing program.

Also, a computer-readable storage medium for enabling the information processing program to be installed in the information sharing device 203 so as to be executable may be realized with a package medium, for example, such as a flexible disk, CD-ROM, DVD, or the like.

Further, such a computer-readable storage medium may be realized with semiconductor memory or a magnetic disk or the like in which various types of programs are temporarily or eternally stored, other than a package medium.

Also, a cable or wireless communication medium, such as a local area network, the internet, digital satellite broadcast, or the like, may be used as a tool for storing the information processing program in such a computer-readable storage medium.

Further, the information processing program may be stored in a computer-readable storage medium via various types of communication interface such a router, modem, or the like.

4. Modifications

4-1. Modification 1

Note that, with the above first and second exemplary embodiments, description has been made regarding a case where the desired portion is selected from the text of an electronic book, and also the same structured words or the same-meaning words or the like are searched.

However, the present disclosure is not restricted to this, and an arrangement may be made wherein, other than the text of an electronic book, characters included in a photo image or illustration image within the electronic book thereof or the like are extracted, the desired portion is selected from this extracted characters, and also the same structured words or the same-meaning words or the like are searched.

4-2. Modification 2

Also, with the above first and second exemplary embodiments, description has been made regarding a case where at the time of the desired portion being specified, an instruction-estimated portion is selected using a break character within a text.

However, the present disclosure is not restricted to this, and an arrangement may be made wherein at the time of the desired portion being specified, a search range is subjected to natural language processing, and based on the processing results thereof, an instruction-estimated portion is selected. According to such an arrangement as well, an instruction-estimated portion can accurately be selected in the same way as with the above cases.

4-3. Modification 3

Further, with the above first and second exemplary embodiments, description has been made regarding a case where the desired portion within a text is specified via the touch panel.

However, the present disclosure is not restricted to this, and an arrangement may be made wherein the desired portion is specified so as to move the cursor above a text via a pointing device such as a joystick or mouse or the like, or keyboard.

4-4. Modification 4

Further, with the above first and second exemplary embodiments, description has been made regarding a case where according to the importance of the desired portion, or a person who has specified this desired portion, or the like, the display state of the highlighted display of this desired portion is changed.

However, the present disclosure is not restricted to this, and an arrangement may be made wherein date at the time of specifying the desired portion is held as instruction history, and based on the instruction history, the display state of the highlighted display of this desired portion is changed in accordance with the instructed period.

4-5. Modification 5

Further, with the above first and second exemplary embodiments, description has been made regarding a case where upon the desired portion specified within a text being identified, based on a keyword detected from this desired portion, related information such as a website is searched using a searching device.

However, the present disclosure is not restricted to this, and an arrangement may be made wherein upon the desired portion specified within a text being identified, based on a keyword detected from this desired portion, a related electronic book is searched out of electronic books which the user has not obtained yet using a searching device.

Also, with the present disclosure, at this time, instead of an electronic book being simply searched, a portion relating to the desired portion may be further searched and presented within the full text of the searched electronic book.

4-6. Modification 6

Further, with the above first and second exemplary embodiments, description has been made regarding a case where related comments input by the user are correlated with the tag of the desired portion as the related information of this desired portion.

However, the present disclosure is not restricted to this, and an arrangement may be made wherein a moving image is correlated with the tag of the desired portion as the related information of this desired portion, and this moving image is played at the time of the tag being specified.

Note that a moving image to be correlated with the tag may also be stored in the storage units 25 of the information display terminals 11 and 12, or may also be provided for streaming playback via the network 13.

4-7. Modification 7

Further, with the above first and second exemplary embodiments, description has been made regarding a case where based on a keyword included in the desired portion, the same structured words and the same-meaning words are searched from the full text of a book, and the index and link list of these are generated.

However, the present disclosure is not restricted to this, and the index and link list of paragraphs and phrases and so forth including the same structured words and the same-meaning words may be generated.

Specifically, with the present disclosure, upon the same structured words being found from the full text of a book based on a keyword included in the desired portion, based on the processing results of the natural language processing as to the full text of the book, and a break character, and so forth, paragraphs and phrases and so forth including the found same structured words are identified within the full text of the book as related portions.

Also, with the present disclosure, upon the same-meaning words found detected from the full text of a book based on a keyword included in the desired portion, based on the processing results of the natural language processing as to the full text of the book, and a break character, and so forth, paragraphs and phrases and so forth including the found same-meaning words are identified within the full text of the book as related portions.

With the present disclosure, according to the index generating unit 67, the index of the identified related portions including the same structured words is generated, and also the index of the identified related portions including the same-meaning words is generated.

Also, with the present disclosure, according to the link generating unit 75, the link list of the identified related portions including the same structured words is generated, and also the link list of the identified related portions including the same-meaning words is generated.

Moreover, with the present disclosure, upon the same structured word, same-meaning word, or related portion itself being specified using the index thereof, a text including this related portion is displayed, and also the related portion thereof is subjected to highlighted display.

Also, with the present disclosure, in the event that the same structured word, same-meaning word, or related portion itself has been specified on a text, a text including this related portion is displayed, and also the related portion thereof is subjected to highlighted display, using the link list thereof.

According to such an arrangement, with the present disclosure, in the event of the index or link list being used, related portions relating to the desired portion in the full text of the book can be presented as paragraphs or phrases or the like instead simple words.

Accordingly, with the present disclosure, portions relating to the desired portion in the full text of a book can be readily recognized without specially causing the user to read a certain range including the same structured word or same-meaning word for confirmation.

Note that, with the above first and second exemplary embodiments, the same structured word and the same-meaning word are subjected to highlighted display in a different display state according to an attribute whether the structure is the same as with the keyword, and the meaning is the same as with the keyword.

Therefore, with the present disclosure, related portions can also be subjected to highlighted display in a different display state according to the attribute thereof (i.e., which of the same structured word and the same-meaning word is included). Thus, with the present disclosure, the level of relation with the desired portion can be readily determined regarding related portions.

Also, with the present disclosure, instead of simply performing highlighted display of the desired portion when displaying a text including the related portion based on the index or link list, when the electronic book image to be displayed is switched according to user operations, determination is automatically made whether or not the related portion is included in the text of the electronic book image after switching of display based on the index or link list.

Also, with the present disclosure, an arrangement may be made wherein when the related portion is included in the text of the electronic book image after switching of display, the related portion thereof is subjected to highlighted display.

4-8. Modification 8

Further, with the above first and second exemplary embodiments, description has been made regarding a case where the information processing device according to the present disclosure has been applied to the information display terminals 11, 12, and 201 described above regarding FIGS. 1 through 51.

However, the present disclosure is not restricted to this, and the information processing device can be applied to an information processing device, such as computers, cellular phones, PDA (Personal Digital Assistance), handheld game machines, and so forth.

4-9. Modification 9

Further, with the above first and second exemplary embodiments, description has been made regarding a case where the selecting units 2, 28, and the central processing unit 213 described above regarding FIGS. 1 through 51 are applied as selecting units for selecting at least a part of text making up a content.

However, the present disclosure is not restricted to this, and can also be broadly applied to selecting units having various types of configurations, such as a selecting circuit having a hardware circuit configuration for selecting at least a part of text making up a content, a microprocessor, a DSP (Digital Signal Processor), or the like.

4-10. Modification 10

Further, with the above first and second exemplary embodiments, description has been made regarding a case where the obtaining units 3, 29, and 100, and the central processing unit 213 described above regarding FIGS. 1 through 51 are applied as obtaining units for obtaining the processing results of the natural language processing as to a part of a text selected by a selecting unit.

However, the present disclosure is not restricted to this, and can also be broadly applied to obtaining units having various types of configurations, such as an obtaining circuit having a hardware circuit configuration for obtaining the processing results of the natural language processing as to a part of a text selected by a selecting unit, a microprocessor, a DSP, or the like.

4-11. Modification 11

Further, with the above first and second exemplary embodiments, description has been made regarding a case where the identifying units 4 and 33, and the central processing unit 213 described above regarding FIGS. 1 through 51 are applied as identifying units for identifying a predetermined portion of a text based on the processing results obtained by an obtaining unit.

However, the present disclosure is not restricted to this, and can also be broadly applied to identifying units having various types of configurations, such as an identifying circuit having a hardware circuit configuration for identifying a predetermined portion of a text based on the processing results obtained by an obtaining unit, a microprocessor, a DSP, or the like, in addition.

4-12. Modification 12

Further, with the above first and second exemplary embodiments, description has been made regarding a case where the transmission units 5 and 23, communication processing unit 219, and network interface 220 described above regarding FIGS. 1 through 51 are applied as transmission units for transmitting a predetermined portion of a text identified by an identifying unit to an external device.

However, the present disclosure is not restricted to this, and can also be broadly applied to transmission units having various types of configuration, in accordance with communication systems with external devices.

4-13. Modification 13

Further, with the above first and second exemplary embodiments, description has been made regarding a case where the reception unit 24, communication processing unit 219, and network interface 220 described above regarding FIGS. 1 through 51 are applied as a reception unit for receiving a predetermined portion of a text transmitted from an external device.

However, the present disclosure is not restricted to this, and can also be broadly applied to reception units having various types of configurations in accordance with communication systems with external devices.

4-14. Modification 14

Further, with the above first and second exemplary embodiments, description has been made regarding a case where the display control unit 26 and display processing unit 221 described above regarding FIGS. 1 through 51 are applied as display control units for performing control so as to display a predetermined portion of a text received by a reception unit.

However, the present disclosure is not restricted to this, and can also be broadly applied to display control units having various types of configurations, such as a display control circuit having a hardware circuit configuration for performing control so as to display a predetermined portion of a text received by a reception unit, a microprocessor, a DSP, or the like.

4-15. Modification 15

Further, with the above first and second exemplary embodiments, description has been made regarding a case where the correlating unit 60 and the central processing unit 213 described above regarding FIGS. 1 through 51 are applied as correlating units for correlating a predetermined portion with comments.

However, the present disclosure is not restricted to this, and can also be broadly applied to correlating units having various types of configurations, such as a correlating circuit having a hardware circuit configuration for correlating a predetermined portion with comments, a microprocessor, a DSP, or the like.

As mentioned above, while the exemplary embodiments have been described with reference to an arrangement using the English language, the present disclosure is not restricted to English, and may be applied to any language which can be displayed as a character string, including those which can be written vertically from top to bottom, those which can be written from the right to the left, and so forth. In these cases, some of the particular technique described in the exemplary embodiments might not hold, but the idea pertaining to the present disclosure does.

Figure 52A:
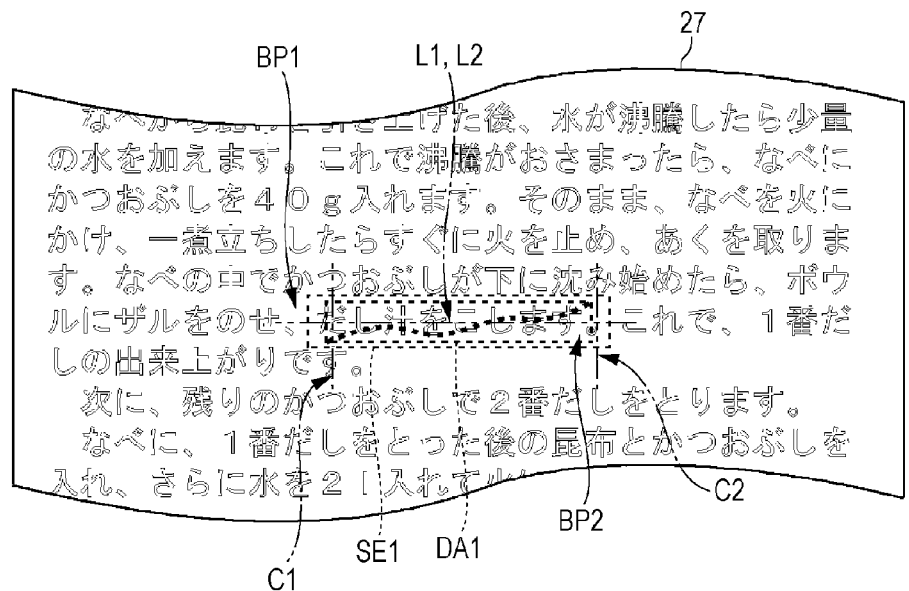
FIGS. 52A and 52B are schematic drawings for describing detection of a search range in another language.
Figure 52B:
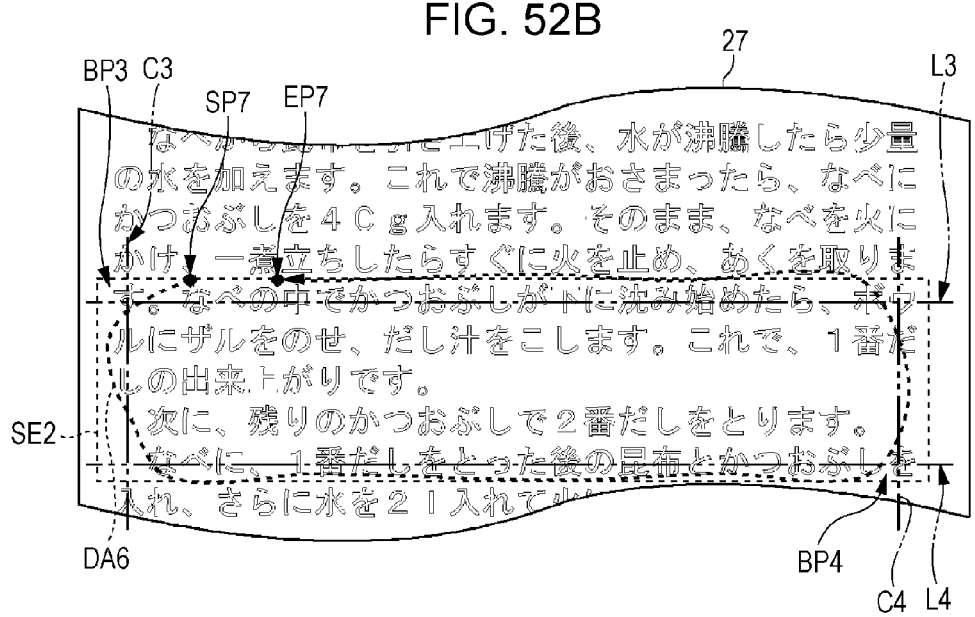

For example, FIGS. 52A and 52B are drawings exemplifying application of an exemplary embodiment of the present disclosure to the Japanese language. While the English language, and most Indo-European languages use spaces between words, the so-called CJK (Chinese, Japanese, Korean) languages usually do not. Accordingly, while a space would not serve as a sentence break character in English, it very well could in Japanese. This is to say, while the way in which a break character is written may differ from one language to another, and while the sentence might be written from another direction as compared to English, the principle of searching for a break character in one direction in a line or sentence or the other is the same. This holds true for all other aspects of processing text, and natural language processing will, as a matter of course, be performed in accordance with the grammatical rules of that particular language.

The present application contains subject matter related to that disclosed in Japanese Priority Patent Application JP 2010-166328 filed in the Japan Patent Office on Jul. 23, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a display capable of displaying content;
a selecting unit configured to receive touch input from a first user, the touch input comprising a tracing indicative of a region of the display, and to determine a selection of the displayed content based at least in part on the touch input from the first user;
an obtaining unit configured to obtain data corresponding to the selection, the data comprising text data including a plurality of words;
an identification unit configured to identify an important keyword from the plurality of words; and
a control unit configured to:
generate a command to transmit the keyword to a device;
receive, from the first user, information identifying a second user, the second user being an intended recipient of the keyword;
generate a command to transmit the keyword and the received information to the device, the device being configured to transmit the keyword to the second user; and
determine whether to perform highlighting on the device based on the keyword and when the same display content is being displayed for both the first user and the second user at the same time.

2. The information processing apparatus of claim 1, wherein the displayed content comprises at least a first portion of an electronic document.

3. The information processing apparatus of claim 2, wherein the obtaining unit is further configured to receive information associated with the electronic document and information associated with the selection.

4. The information processing apparatus of claim 3, wherein:
the document information comprises a location of the displayed content within the electronic document; and
the selection information comprises at least one of (i) a type of user activation associated with the selection or (ii) a plurality of activation positions associated with the type of user activation.

5. The information processing apparatus of claim 4, wherein the obtaining unit is further configured to:
determine a second portion of the electronic document that includes the selection, based on at least the document information; and
obtain the text data corresponding to the selection from within the second portion, based on at least the selection information.

6. The information processing apparatus of claim 1, wherein a storage unit is further configured to store the text data in a document database.

7. The information processing apparatus of claim 1, wherein the identification unit is further configured to decompose the text data into a plurality of morphemes.

8. The information processing apparatus of claim 7, wherein the identification unit is further configured to:
receive morpheme data from a storage unit; and
decompose the text data into the plurality of morphemes, based on at least the morpheme data.

9. The information processing apparatus of claim 7, wherein the identification unit is further configured to:
determine grammatical roles corresponding to the morphemes; and
assign the morphemes to corresponding ones of a plurality of word classes, based on at least the determined grammatical roles.

10. The information processing apparatus of claim 9, wherein the identification unit is further configured to receive contextual information associated with the text data.

11. The information processing apparatus of claim 10, wherein the identification unit is further configured to identify a first subset of the morphemes based on at least the contextual information, the first morpheme subset being relevant to the text data.

12. The information processing apparatus of claim 11, wherein:
the identification unit is further configured to identify a second subset of the morphemes based on at least the contextual information, the second morpheme subset being irrelevant to the text data; and
the second morpheme subset comprises at least one of (i) a linguistic element that lacks a lexical definition or (ii) a morpheme having a meaning that is irrelevant to the obtained text data.

13. The information processing apparatus of claim 11, wherein the identification unit is further configured to:
select the keyword from the first morpheme subset;
determine, based on the contextual information, a keyword meaning associated with the keyword; and
compute a frequency at which the keyword occurs within the text data.

14. The information processing apparatus of claim 13, wherein the identification unit is further configured to assign a score to the keyword, based on at least the computed frequency.

15. The information processing apparatus of claim 14, wherein the storage unit is further configured to store, in the keyword database, at least one of the keyword meaning of the keyword, the score assigned to the keyword, a location of the keyword within the electronic document, or a portion of the obtained text data that includes the keyword.

16. The information processing apparatus of claim 2, wherein:
the control unit is further configured to generate a command to transmit at least one of information associated with the electronic document or information associated with the selection to the device.

17. The information processing apparatus of claim 1, further comprising a transmission unit configured to:
receive the command from the control unit; and
transmit the keyword to the device, in response to the received command.

18. A computer-implemented method for processing information, comprising:
displaying content on a display;
receiving touch input from a first user, the touch input comprising a tracing indicative of a region of the display;
determining a selection of the displayed content based at least in part on the touch input;
obtaining data corresponding to the selection, the data comprising text data including a plurality of words;
identifying, using a processor, an important keyword from the plurality of words;
generating a command to transmit the keyword to a device;
receiving, from the first user, information identifying a second user, the second user being an intended recipient of the keyword;
generating a command to transmit the keyword and the received information to the device, the device being configured to transmit the keyword to the second user; and
determining whether to perform highlighting on the device based on the keyword and when the same display content is being displayed for both the first user and the second user at the same time.

19. A non-transitory, computer-readable storage medium storing a program that, when executed by a processor, causes the processor to perform a method for processing information, comprising:
displaying content on a display;
receiving touch input from a first user, the touch input comprising a tracing indicative of a region of the display;
determining a selection of the displayed content based at least in part on the touch input;
obtaining data corresponding to the selection, the data comprising text data including a plurality of words;
identifying an important keyword from the plurality of words;
generating a command to transmit the keyword to a device;
receiving, from the first user, information identifying a second user, the second user being an intended recipient of the keyword;
generating a command to transmit the keyword and the received information to the device, the device being configured to transmit the keyword to the second user; and
determining whether to perform highlighting on the device based on the keyword and when the same display content is being displayed for both the first user and the second user at the same time.

* * * * *